US007072794B2

(12) United States Patent
Wittkowski

(10) Patent No.: US 7,072,794 B2
(45) Date of Patent: Jul. 4, 2006

(54) STATISTICAL METHODS FOR MULTIVARIATE ORDINAL DATA WHICH ARE USED FOR DATA BASE DRIVEN DECISION SUPPORT

(75) Inventor: Knut M. Wittkowski, New York, NY (US)

(73) Assignee: Rockefeller University, New York, NY (US)

( * ) Notice: Subject to any disclaimer, the term of this patent is extended or adjusted under 35 U.S.C. 154(b) by 616 days.

(21) Appl. No.: 10/230,019

(22) Filed: Aug. 28, 2002

(65) Prior Publication Data

US 2003/0182281 A1    Sep. 25, 2003

Related U.S. Application Data

(60) Provisional application No. 60/315,474, filed on Aug. 28, 2001.

(51) Int. Cl.
*G06F 17/18* (2006.01)
(52) U.S. Cl. .................................. 702/179; 128/923
(58) Field of Classification Search ................ 702/19, 702/30–32, 129–181; 706/20, 21; 128/923, 128/924
See application file for complete search history.

(56) References Cited

U.S. PATENT DOCUMENTS

2004/0087532 A1*  5/2004  Banchereau et al. .......... 514/44

OTHER PUBLICATIONS

"Multi-locus interactions predict risk for pot -PTCA restenosis: an approach to the genetic analysis of common complex disease"; *The Pharmacogenomics Journal (2002)* 2; pp. 197-201; Zee et al.; Dec. 6, 2001.
"The protective effect of condoms and nonoxynol-9 against HIV infection"; *Am J Public Health* 88(4); pp. 590-596; 972; 108-110; Wittkowski et al; Dec. 12, 1997.
"Reporting sexual risk behavior for HIV: a practical risk index and a method for improving risk indices"; *AM J public Health* 88(4); pp. 671-674; Susser et al.; date unknown.
"Polymerase chain reaction monitoring reduces the incidence of cytomegalovirus disease and the duration and side effects of antiviral therapy after bone marrow transplantation"; *Blood*; vol. 86, No. 7; pp. 2815-2820; Einsele et al.; Oct. 1, 1995.

(Continued)

*Primary Examiner*—Marc S. Hoff
(74) *Attorney, Agent, or Firm*—Michael D. Rechtin; Foley & Lardner LLP

(57) ABSTRACT

A method of analysis including an intrinsically valid class of statistical methods for dealing with multivariate ordinal data. A decision support system that can (1) provide automated decision support in a transparent fashion (2) optionally be controlled by a decision maker, (3) provide for an evidence acquisition concept, including automatically increasing the content of an underlying database, and (4) provide a computationally efficient interactive distributed environment. The method is exemplified in the context of assisted diagnostic support.

23 Claims, 22 Drawing Sheets

OTHER PUBLICATIONS

"A new procedure to assess individual risk of exposure to schistosomiasis cercariae"; *Infectious Disease*; pp. 167-174; Talaat et al.; date unknown.

"Use of proteomic patterns in serum to identify ovarian cancer"; *The Lancet*; vol. 359; pp. 572-577, Petricoin, III, et al.; Feb. 16, 2002.

* cited by examiner

| ID | OBS | ARRAY OF PAIRWISE ORDERINGS | $\#_<$ | $\#_>$ | USTAT SCORE | USTAT ICW |
|---|---|---|---|---|---|---|
| A | 1 4 | 0  1  1  1  1  1  1 | 6 | 0 | 3.00 | 1.00 |
| B | 1 3 | -1  0  ?  1  1  1  1 | 4 | 1 | 1.50 | 0.91 |
| C | 0 4 | -1  ?  0  ?  1  1  1 | 3 | 1 | 1.00 | 0.82 |
| D | 1 0 | -1  -1  ?  0  ?  ?  1 | 1 | 2 | -0.50 | 0.71 |
| E | 0 2 | -1  -1  -1  ?  0  ?  1 | 1 | 3 | -1.00 | 0.91 |
| F | 0 2 | -1  -1  -1  ?  ?  0  1 | 1 | 3 | -1.00 | 0.82 |
| G | 0 0 | -1  -1  -1  -1  -1  -1  0 | 0 | 6 | -3.00 | 1.00 |
|   |     | 1  1  0  1  0  0  0 |   |   |      |      |
|   |     | 4  3  4  0  2  2  0 |   |   |      |      |

FIG. 2

| ID | LATTICE OF OBSERVATIONS | $\#_<+1$ | $7-\#_>$ | COMPATIBLE RANKINGS | MrgL SCORE | MrgL ICW |
|---|---|---|---|---|---|---|
| A | 1;4 | 7 | 7 | 7 7 7 7 7 7 7 7 7 7 7 7 7 7 | 3.00 | 1.00 |
| B | 1;3 | 5 | 6 | 6 6 5 5 6 6 5 5 6 6 6 6 5 5 | 1.57 | 0.94 |
| C | 0;4 | 4 | 6 | 5 5 6 6 5 5 6 6 4 4 5 5 6 6 | 1.29 | 0.89 |
| D | 1;0 | 2 | 5 | 3 3 3 3 4 4 4 4 5 5 2 2 2 2 | -0.71 | 0.76 |
| E | 0;2 | 2 | 4 | 4 2 4 2 3 2 3 2 3 2 4 3 4 3 | -1.07 | 0.85 |
| F | 0;2 | 2 | 4 | 2 4 2 4 2 3 2 3 2 3 3 4 3 4 | -1.07 | 0.85 |
| G | 0;0 | 1 | 1 | 1 1 1 1 1 1 1 1 1 1 1 1 1 1 | -3.00 | 1.00 |

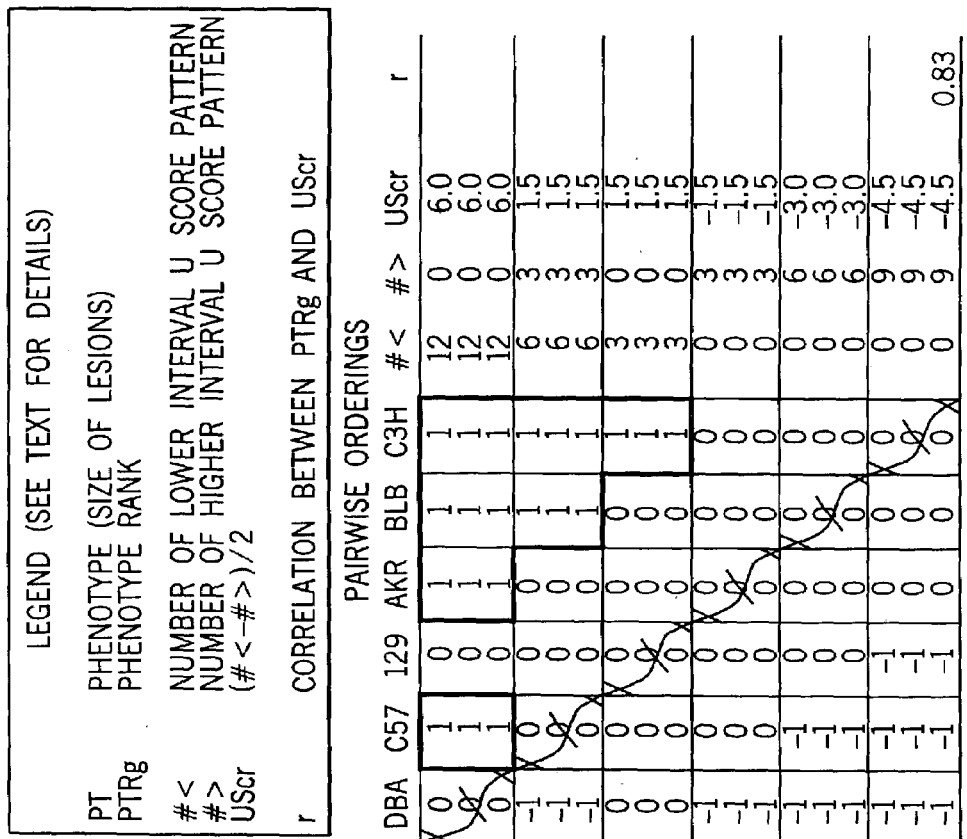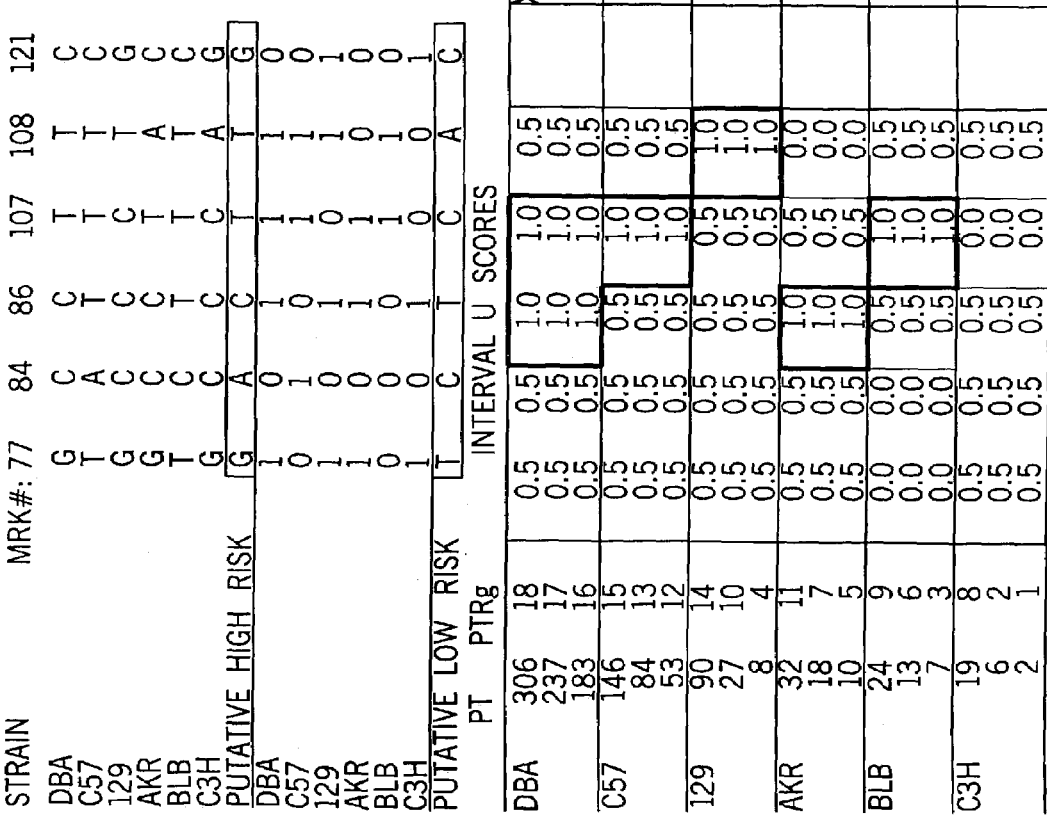
FIG. 10

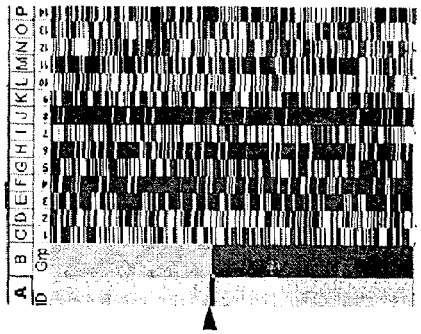
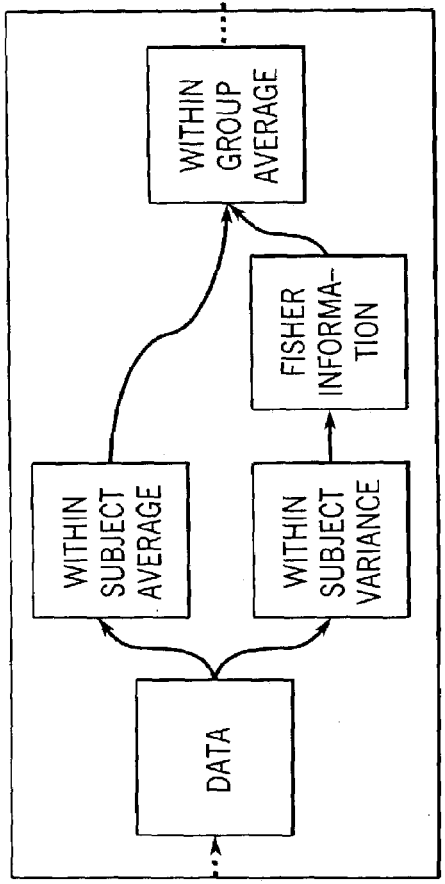
FIG. 13
FIG. 14

```
LE1:  Grp1:  {=SUM( (Data!C$2     :C$438<=Data!C     2)  *  (Data!D$2     :D$438<=Data!D2     )  )}  ...
      Grp2:  {=SUM( (Data!C$2     :C$438<=Data!C440)       *  (Data!D$2     :D$438<=Data!D440)  )}  ...

LE2:  Grp1:  {=SUM( (Data!C$440:C$781<=Data!C2    )  *  (Data!D$440:D$781<=Data!D2    )  )}  ...
      Grp2:  {=SUM( (Data!C$440:C$781<=Data!C438)  *  (Data!D$440:D$781<=Data!D438)  )}  ...

GE1:  Grp1:  {=SUM( (Data!C$2     :C$438>=Data!C     2)  *  (Data!D$2     :D$438>=Data!D2     )  )}  ...
      Grp2:  {=SUM( (Data!C$2     :C$438>=Data!C440)       *  (Data!D$2     :D$438>=Data!D440)  )}  ...

GE2:  Grp1:  {=SUM( (Data!C$440:C$781>=Data!C2    )  *  (Data!D$440:D$781>=Data!D2    )  )}  ...
      Grp2:  {=SUM( (Data!C$440:C$781>=Data!C438)  *  (Data!D$440:D$781>=Data!D438)  )}  ...

EQ1:  Grp1:  {=SUM( (Data!C$2     :C$438  =Data!C     2)  *  (Data!D$2     =Data!D2     )  )}  ...
      Grp2:  {=SUM( (Data!C$2     :C$438  =Data!C438)       *  (Data!D$2     =Data!D438)  )}  ...

EQ2:  Grp1:  {=SUM( (Data!C$440:C$781  =Data!C2    )  *  (Data!D$440:D$781 =Data!D2    )  )}  ...
      Grp2:  {=SUM( (Data!C$440:C$781  =Data!C438)  *  (Data!D$440:D$781 =Data!D438)  )}  ...

XT1:  Grp1:  {=SUM( (Data!C$2     :C$438  =Data!C     2)  *  (Data!D$438 =Data!D2     )
                                                                       *  (Data!C2     = Data!D2     )  )}  ...
      Grp2:  {=SUM( (Data!C$2     :C$438  =Data!C438)       *  (Data!D$438 =Data!D438)
                                                                       *  (Data!C438 = Data!D438)  )}  ...

XT2:  Grp1:  {=SUM( (Data!C$440:C$781  =Data!C2    )  *  (Data!D$440:D$781 =Data!D2    )
                                                                       *  (Data!C2     = Data!D2     )  )}  ...
      Grp2:  {=SUM( (Data!C$440:C$781  =Data!C438)  *  (Data!D$440:D$781 =Data!D438)
                                                                       *  (Data!C438 = Data!D438)  )}  ...

ICW:  Grp1:  =SQRT((LE2!D2     +GE2!D2    -2*LE2!D2     +XT2!D2     )/Count(B2     :B438))  ...
      Grp2:  =SQRT((LE1!D440+GE1!D440-2*LE1!D440+XT1!D2    )/Count(B440:B781))  ...

Uscr: Grp1:  =((LE1!D2     +LE2!D2    )-(GE1!D2     +GE2!D2    ))/(Count(B2:B438)+Count(B440:781))  ...
      Grp2:  =((LE1!D440+LE2!D440)-(GE1!D440+GE2!D440))/(Count(B2:B438)+Count(B440:781))  ...

Diff: =SUMPRODUCT(D440:D781;ICW!D440:D781)/SUM(ICW!D440:D781)
      -SUMPRODUCT(D2     :D438;ICW!D2     :D438)/SUM(ICW!D2     :D438)
```

FIG. 15

STATISTICAL METHODS FOR MULTIVARIATE ORDINAL DATA WHICH ARE USED FOR DATA BASE DRIVEN DECISION SUPPORT

Incorporated herein by reference and submitted on CD-Rom is a computer software program entitled "MrgLCode" which was created on Aug. 21, 2002 and is 444 KB in size.

This application claims the benefit of Provisional Application No. 60/315,474, filed Sep. 28, 2001.

A portion of this work was supported a General Clinical Research Center grant (M01-RR00102) from the National Center for Research Resources at the National Institutes of Health.

FIELD OF INVENTION

The invention is generally concerned with a statistical method for dealing with inexact ordinal data consisting of one or more variables and a concept for a class of decision support environments, some of them interactive, made possible by the statistical method.

BACKGROUND OF THE INVENTION

The first statistical methods for ordinal point data were developed between 1935 and 1955. These methods have subsequently been extended to cover special cases of interval and approximate data (some of these methods were based on conventional U-statistics (UStat) and also the well known Marginal Likelihood (MrgL) principle). The most recent work has pointed to the necessity of estimating information content (IC) for approximate, interval and multivariate point data. The first results had a limited range of applications and were rarely used, due to deficiencies in the theory and lack of computationally efficient algorithms.

Shortcomings of Currently Available Statistical Methods when Used with Ordinal Data Most statistical analysis programs are based on the linear model, mainly because of its computational simplicity. When applied to multivariate data, application of the linear model comprises the use of linear combinations of the variables (e.g. 10 times expression of gene A plus 2 times expression of gene B minus the logarithm of the expression of gene C). With biological, psychological, and genomic applications the relationship between the measurement (body temperature, IQ, gene expression) and its meaning (fever, social status, immunity) are usually merely ordinal. An increase in body temperature (observed variable) by two degrees from 35° C. to 37° C., for instance, is usually an irrelevant change in fever (latent factor), while an increase from 41° C. to 43° C. means that a person dies. One of the problems in dealing with ordinal data, however, is that the magnitude of a difference between the values of variables has no meaning. Thus, "distance" cannot simply be defined as the absolute value of a difference or ratio, as in the linear model. Because, it is not clear if a linear combination is meaningful at all, even after applying some transformations, the nature of which is also unknown, the use of linear models is questionable at best.

A different class of approaches comprises the use of models for categorical data, where date are interpreted on a nominal scale, i.e., where any order between categories is ignored. Examples are colors, races, but also disease codes. For these models to be applicable, however, continuous variables need to be discretized, which introduces arbitrariness. Moreover, the loss of information on the order of the categories is clearly undesirable in many applications.

The lack of alternative methods has led to linear model methods also being applied to ordinal data, essentially comprised of combining ordinal outcomes by means of linear combinations (weighted averages). External "validation" is then used to justify an otherwise conceptually invalid approach. For such "validation", however, one needs an independent population with the latent factor known as a ("gold standard"), against which the different linear score functions can be compared. (The term "population" is used here to describe classes of entities identified by some common characteristics in general and not limited to human or animal populations.) External validation, also poses several technical problems. The comparison of many possible linear score functions can be very time consuming. The data from entities with similar characteristics and known conditions may first need to be collected. Moreover, if the population considered is relatively "unique", similar entities can be difficult to find. Finally, there may be no "gold standard" against which the score function(s) can be immediately validated.

Methods for multivariate ordinal data, ideally should be somewhere in the middle between linear models for interval scaled data and categorical models for nominally scaled data. They should not assume a specific form of the relationship between each of the observed variables and the latent factor, but they should recognize the fact that "more is better" (or worse, for that matter).

The MrgL method is the first approach known to successfully cover this "middle ground". The MrgL approach was introduced in about 1973 for use with censored data, a special case of inexact data. The Gehan/Prentice/Savage test and the Kaplan-Meyer estimate for survival are widely used applications. In 1992, it was shown that this approach could be generalized to more than two variables and other metrics than those for interval censored data. Subsequently, early versions of the MrgL approach have been applied to assess side effects, to determine risk factors, to evaluate prevention strategies, and to measure immunogenicity. In addition, the MrgL approach has been demonstrated to allow results to be "augmented" for external, or secondary variables, in cases where information exists that might have some relevance (e.g., cost), although it should not be allowed to overwrite evidence contained in the primary variables (treatment effectiveness or side-effects).

In its present form, however, the MrgL approach is not practically useful. It is crucial to give more weight to observations with higher information content ("precision"). Within the linear model, the Fisher information is generally used to achieve this. For replications (unstructured, exchangeable observations), the Fisher information is 1.0 divided by the variance among the replications. With inexact ordinal data, similar differences in information content exist. Observations are more informative, if their ordinal relation to other observations is better defined. Thus, data that are "identical" may be more informative than data that are merely "similar". While the lack of such differentiation has recently been resolved for the special case of the most simple test for ordinal data (the sign test) and acknowledged for the known Wilcoxon-Mann-Whitney test, a more general solution how to deal with inexact data is still lacking. The outline of such a solution has been initially described, allowing inexact observations to be assigned a lower weight. In some cases, however, the proposed estimates underestimate information content. Some ambiguity may not result in loss of information with regard to the intended method of aggregation. As a result, the method, as it was originally introduced, suffered severe limitations.

Furthermore, the MrgL approach may lead to methods of extreme computational complexity. The rate by which this complexity grows when the number of objects increases outpaces by far the advances in computer technology to be expected within the foreseeable future.

A different approach for the analysis of ordinal data based on u-statistics has been applied to a special case of inexact ordinal data, namely interval censored ordinal data. The UStat approach, however has not been extended to more general multivariate data. Moreover, no UStat method is currently available for estimating information content, even for interval-censored data. Moreover, although this approach is less intense in terms of computations, it is also less efficient, because it does not utilize all information.

Even if a valid information content estimate could be found and the computational difficulties could be overcome, using MrgL, UStat, or other intrinsically valid approaches, several problems resulting from the conceptual complexity of dealing with inexact (multivariate) data would need to be resolved.

First and foremost, trying to decide which objects in a population are most "similar" to a given entity poses additional problems, when "distance" cannot be defined as the absolute value of a difference, because, with ordinal data, "difference" in itself has no straightforward meaning.

Further, when variables are exchangeable (independent identically distributed measurements, e.g., replications), the conventional methods for ordinal variables, which start out with comparing variables individually, cannot be applied. As sums have no meaning for ordinal data the "distribution" of interchangeable observations can also not be characterized by the mean (x) and the standard deviation (SD), as in the linear model.

Finally, the majority of the forgoing methods have dealt with comparing two or more populations, or positioning an entity within a single population, situations where the strategies for analyzing inexact data, i.e. univariate ordinal data or multivariate linear data can be directly generalized. This, however, is not always the case. With the well-known Kruskal-Wallis test, for instance, which compares more than two groups of ordinal data, the results of pair-wise comparisons depend on the observations in other groups. When one tries to determine which of several categories an object belongs to, an even more severe problem arises. With exact data, it is sufficient to compare the object with entities from one population at a time. With inexact data, however, information from the other population(s) could be used to reduce the level of "inexactness" when comparing an object with any of these populations. This problem has never been addressed and, consequently, it has never been suggested how to define the position of a entity in relation to one population by utilizing data from other populations.

Shortcomings of Currently Used Decision Process when Applied to Multivariate Ordinal Data Situations where categories need to be ranked with respect to their exigency based on multivariate results in a test entity are frequent. One example is the decision of a diagnosis in a patient. Traditionally, such decisions are based on comparing the patient's value in each variable individually against a published "normal range" derived from a "standard" population of "controls" (healthy individuals). Frequently, these ranges are determined as the mean $(x)\pm 2$ times the standard deviation (SD) of the empirical distribution among the controls. Depending on which observed variables exceed their normal ranges, the decision maker (the physician) determines that the entity (patient) belongs to a specific category (of disease) in which such observations are expected, often employing subjective criteria to pick one of several categories. There are several inherent problems:

(1) Characterizing empirical distributions by ranges $x\pm 2\times$ SD is valid only if the corresponding theoretical distribution is Gaussian, an assumption which is inappropriate for the majority of variables in fields such as medicine, biology, genetics, and sociology.

(2) A single "standard" reference interval is unlikely to be optimal for all entities.

(3) Addressing specificity only, i.e., ignoring the distribution of a variable among the cases in either category (sensitivity) is not sufficient to even partly automate the decision process.

The above problems are even more relevant in dealing with multivariate data (each variable being point, interval, or distribution). Further:

(4) Looking at a single variable at a time is often not sufficient.

(5) The set of variables to be optimal to determine the relative position of the entity with respect to the reference populations may vary.

(6) As linear combinations cannot be meaningfully utilized to reduce multivariate ordinal data to univariate data, as within the linear model, specific problems exist that have not been addressed.

(7) To determine sensitivity and specificity for a cutoff target, it is not sufficient to compare the test entity with either population (controls and cases) separately, as in the linear model.

Shortcomings of Previously Proposed Decision Support Systems

The complexity of dealing with multivariate data has led to several generations of decision support systems (knowledge based systems, expert systems). Of the first generation, developed in the 1960s, most remained only prototypes. Even the second generation, developed in the 1970s based on recent results in the field of artificial intelligence, have failed to gain widespread acceptance because they merely tried to mimic the human decision process, rather than striving at overcoming its shortcomings by utilizing advances in technology to go beyond the "heuristic" nature of the human decision process. With more information becoming available through "information technology", the inherent problems of intuitive decision making are likely to become even more apparent. The advent of genetic, genomic, and proteomic information, has further complicated the situation by increasing the number of variables relevant to diagnostic decision-making. Simply increasing the computational capacity of conceptually insufficient "expert systems", clearly, cannot overcome the underlying obstacles.

In previous "expert systems", the separation of a general purpose "inference engine" from an unstructured "knowledge base" containing a vast set of "heuristics" and applying it in an iterative fashion, resulted in a lack of transparency, that couldn't be overcome with yet a different component, an "explanation facility". Since the decision maker could not understand the decision process, he also could not control it. The need to acquire knowledge as heuristic rules with subjective "certainty factors" attached, not only contributed to non-transparent decisions, but also made the knowledge acquisition process difficult.

SUMMARY OF THE INVENTION

Statistical Method

An intrinsically valid statistical approach for the analysis of inexact ordinal data consisting of one or more variables is therefore provided, the most preferred approach comprising the steps of:

(1) partially ordering data by determining for all pairs of data the order of a first datum compared to a second datum as (a) superior, (b) inferior, (c) equal, or (d) undecided, wherein for multivariate data (termed "tuple") a partial ordering comprises the first datum "superior" if for each variable the first datum is superior or equal, and for at least one variable, the first datum is superior;

(2) factorizing the partial ordering to eliminate arbitrariness irrelevant for the intended aggregation, the types of arbitrariness comprising "exact ties" and "within-group ties".

(3) generating a score for each datum based on the partial ordering;

(4) estimating the information content for each of the scores with respect to the intended aggregation;

(5) generating a weight for each score based on the information content; and (6) aggregating the scores and weights of all data by means of any conventional statistical method for weighted rank scores, wherein the statistical methods comprise methods for ranking, positioning, comparing, discriminating/regressing, and clustering.

The approach further provides that a datum can be considered "superior" compared to a second datum, if the distance of the datum from a baseline datum is larger than the distance of a second datum from the baseline datum and the two data deviate from the baseline datum in the same direction, although each variable may have a different direction. Still, such a definition does not allow to determine which objects that are closest to a given entity on either "side". The instant approach provides for choosing from strategies to aim at the "middle ground" between nominal and linear models, the strategies comprising (a) to consider a datum "superior" with respect to a baseline datum if it is larger with respect to both the difference and the ratio, or, (b) if these two scale transformations is believed not to cover the "middle ground" to consider a datum "superior" to all data on either side with a lower side-specific rank.

The instant approach further still provides that interchangeable variables comprising common orientation, observational units, measurements units, and the like, are grouped into replications and the partial ordering comprises a first empirical distribution "superior" if at each point on the x-axis the value of a first distribution function is superior or equal, and for at least one point on the x-axis the first distribution function is higher.

The instant approach also provides that information content is estimated after differentiating pairs of data that represent conditions similar enough to be considered identical from those that are merely indistinguishable, the conditions that can be considered identical comprising exact ties and within group ties, and that partial orderings are factorized for data representing conditions that can be considered identical.

The instant approach also provides an aggregation method, in which data from more than one reference populations are utilized to rank an individual within one reference population. The method comprises the steps of (a) computing scores for all entities based on the combined partial ordering of all populations (including the individual) and (b) determining the rank of the individual's score within the scores of either population.

The approach further provides that the scores are generated using u-statistics, the steps comprising: (a) for an entity, counting the number of inferior entities and (b) subtracting the number of inferior entities.

The most preferred approach further provides that the scores are generated according to the MrgL principle, the steps comprising: (a) for an entity computing all rankings compatible with all pairwise partial orderings, wherein the entity being superior is assigned the higher rank; and (b) averaging across the rankings, i.e., computing the score as the average of this entity's rank among all compatible rankings.

Still further the most preferred approach provides that the information content is measured using u-statistics, the steps comprising (a) factorizing the partial ordering and (b) taking the square root of the ratio of the number of decidable pairs divided by the total number of pairs.

Further yet is provided that the information content is measured using the MrgL principle, the steps comprising (a) factorizing the partial ordering and (b) computing the variance across the rankings.

The most preferred approach also provides that the MrgL scores and MrgL IC weights each are augmented, this particular method including in part a conventional methodology.

Still further the approach provides a computationally more efficient method to generate MrgL scores and MrgL IC weights, the steps comprising (a) factorizing rankings to reduce irrelevant complexity (b) early pruning based on UStat results.

Still further the approach uses in part a conventional approach of a "bootstrap" version of this method to generate MrgL scores and ICWeights, which can be trimmed to provide approximate results within a given time limit, the steps comprising: (a) selecting samples of the data set, (b) performing the above method within each sample, (c) assign unfactorized UStat IC weights to the within-sample MrgL scores and IC weights, and (d) integrating results from several samples while giving more weight to within-sample MrgL scores/IC weights if they are more informative based on the unfactorized within sample UStat ICWeights.

In addition, the approach provides for a solution that allows several computers to work in parallel, increasing the accuracy and stability of the approximation without an increase in the time to be spend.

Decision Process

The preferred approach provides further for a decision process wherein different variants of the above described intrinsically valid statistical approach are utilized at different stages and wherein a database of reference entities of known categories and a potentially large set of variables is utilized to provide a decision maker with an ordered list of categories to which the decision maker may assign the entity, (a) restricting a database of reference entities of known categories to an ad-hoc database based on a first subset of variables, termed "characteristics", (b) selecting a set of control categories based on a second subset of variables, termed "control indicators", (c) selecting a set of case categories based on a third subset of variables, termed "case indicators", (d) selecting a separate reference population subset for each of the case categories and at least one reference population for the union of the control categories, (e) selecting a set of variables, termed "discriminators", specific to a selected case category and the selected subset of characteristics, wherein the entity is positioned with respect to the joint case population and control population, (f) determining the entity's score relative to the control population, termed "specificity", and the entity's score relative to the case population, termed "sensitivity"; and, (g) assigning values to entity specific assessment variables, and (h) utilizing sensitivity and specificity as well as entity specific and entity independent assessment variables, the variables comprising consequences of correct and false decisions regarding the entity belonging to a particular category, to order the categories with respect to their overall benefit/risk profile.

The preferred process also provides for situations where a decision maker iteratively interacts with the database of data records from reference entities, where each record potentially has a large set of variables, the steps further comprising: (a) modifying the characteristics by which the ad-hoc database is selected, (b) modifying the indicators by which the categories are defined and the categories themselves, (c) modifying the discriminators by which the position of the entity relative to the reference populations is determined, and (d) modifying the values of entity specific assessment variables.

Further, the preferred process provides for a situation where the decision maker is assisted in modifying characteristics, indicators, categories, discriminators, and assessments.

Still further the preferred process provides for a system that "learns", the steps comprising (a) storing all information being processed provisionally in the main data base, (b) making that information fully available for the decision support process when the suggested category is confirmed or replaced by a final evaluation of the entity revealing the true category, and (c) by using conventional data mining strategies to update internal knowledge bases with deterministic rules (e.g., indicator-category relations, category-descriptor relations).

Further still is provided a method for assisted decision support via a remote portable device.

Further still is provided a method for parallel processing support via an array of computers the areas comprising (a) bootstrapping and (b) data mining.

The preferred approach also provides a process comprising a method for assisted diagnosis of a patient. While most examples provided are in the field of biology and medicine, the preferred approach is not restricted to applications in this field in general or in medical diagnoses in particular. EXAMPLE 1, for instance, demonstrates the use of the preferred approach in sports. The preferred approach is applicable to a wide range of problems, including, but not limited to advising on investments, forcasting thunderstorms, identifying deposits of minerals or oil, face-recognition, detection of fraud or other criminal activities, early warning of terroristic activities or of technical failures in complex systems.

BRIEF DESCRIPTIONS OF DRAWINGS

FIG. 2 illustrates computation of UStat scores and UStat IC weights, without and with factorization;

FIG. 3a and FIG. 3b illustrate the computation of MrgL scores and MrgL IC weights, without factorization (a) and with factorization (b)

FIG. 4a illustrates computation of UStat scores weights when applied to larger data sets and FIG. 4b illustrates computation of MrgL scores based on a lattice structure of the partial ordering when applied to a larger data set and the differences between MrgL scores and UStat scores when applied to larger data sets;

Figure 8:
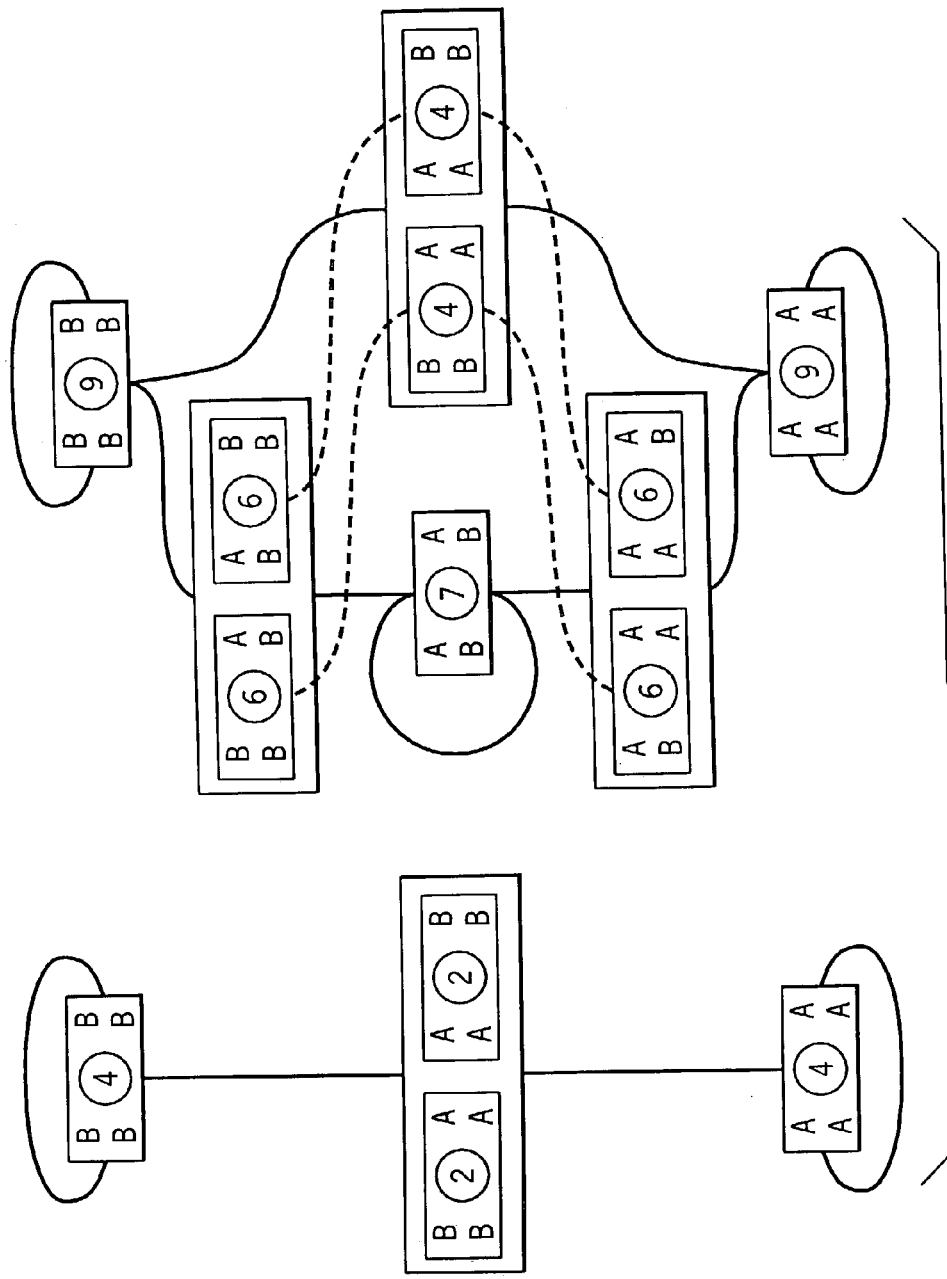

FIG. 8 shows a partial ordering of genetic evidence for the interval between a left marker L and a right marker R to contain a disease gene G, a) inbred strains, b) outbread strains. Numbers indicate the number of notes that are smaller, greater, or exactly tied. Nodes within boxes are comparable only with nodes connected with a dashed line or through the lines connecting the box, but not among each other.

Figure 9:
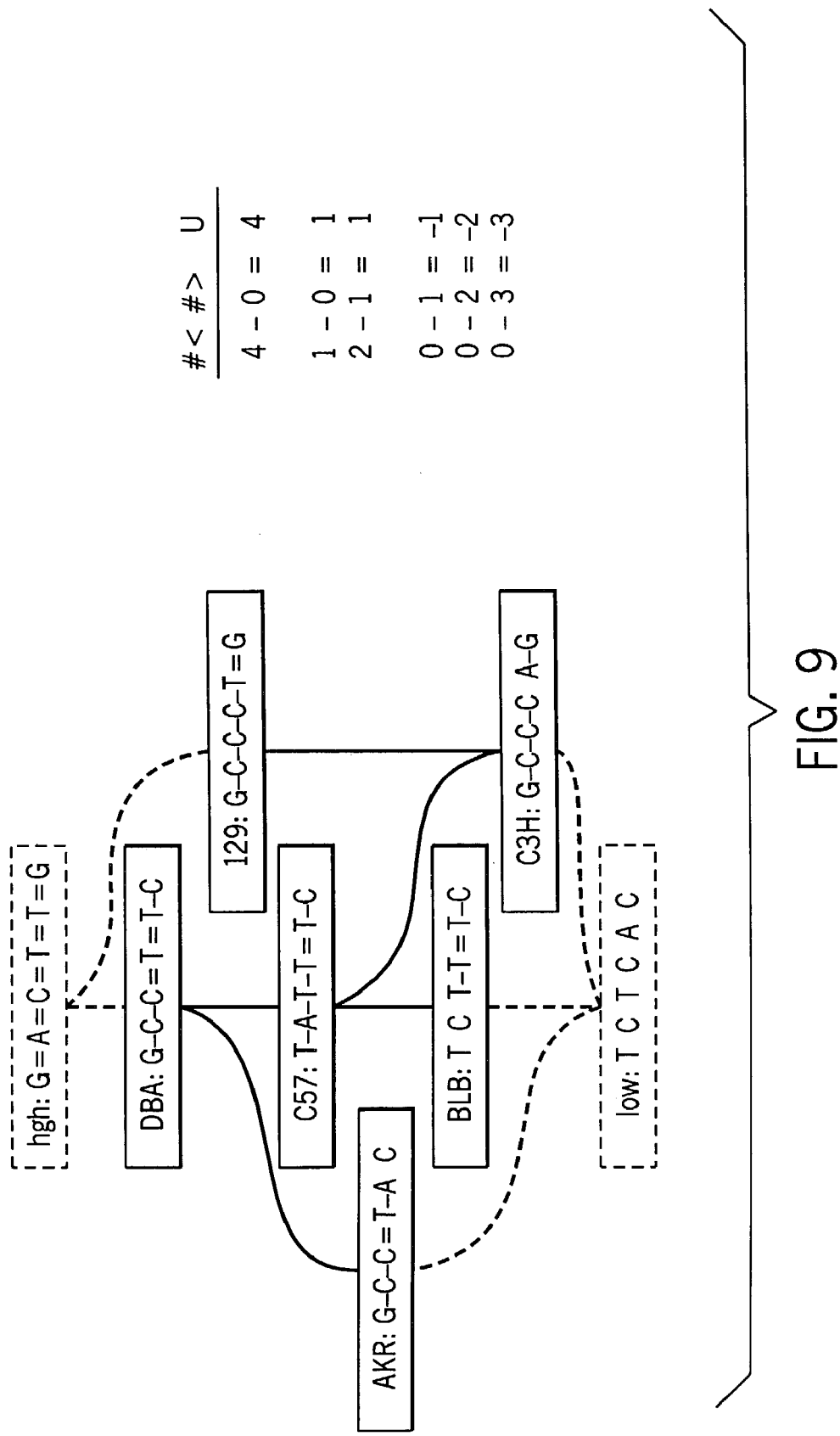

FIG. 9 shows a partial ordering of observed haplotypes between putative extremes (dot-ted) and computation of u statistics. The tuples are ordered by the profiles of strength of between marker evidence ("□": high, "~": intermediate, " ": low)

FIG. 10 shows the spreadsheet implementation of the computational procedure to derive haplotype u scores (FIG. 9) from interval u scores (FIG. 8) and to correlate the haplotype with the phenotype. The code of the associated Visual Basic script is given below at the end of the specifications.

Figure 11:
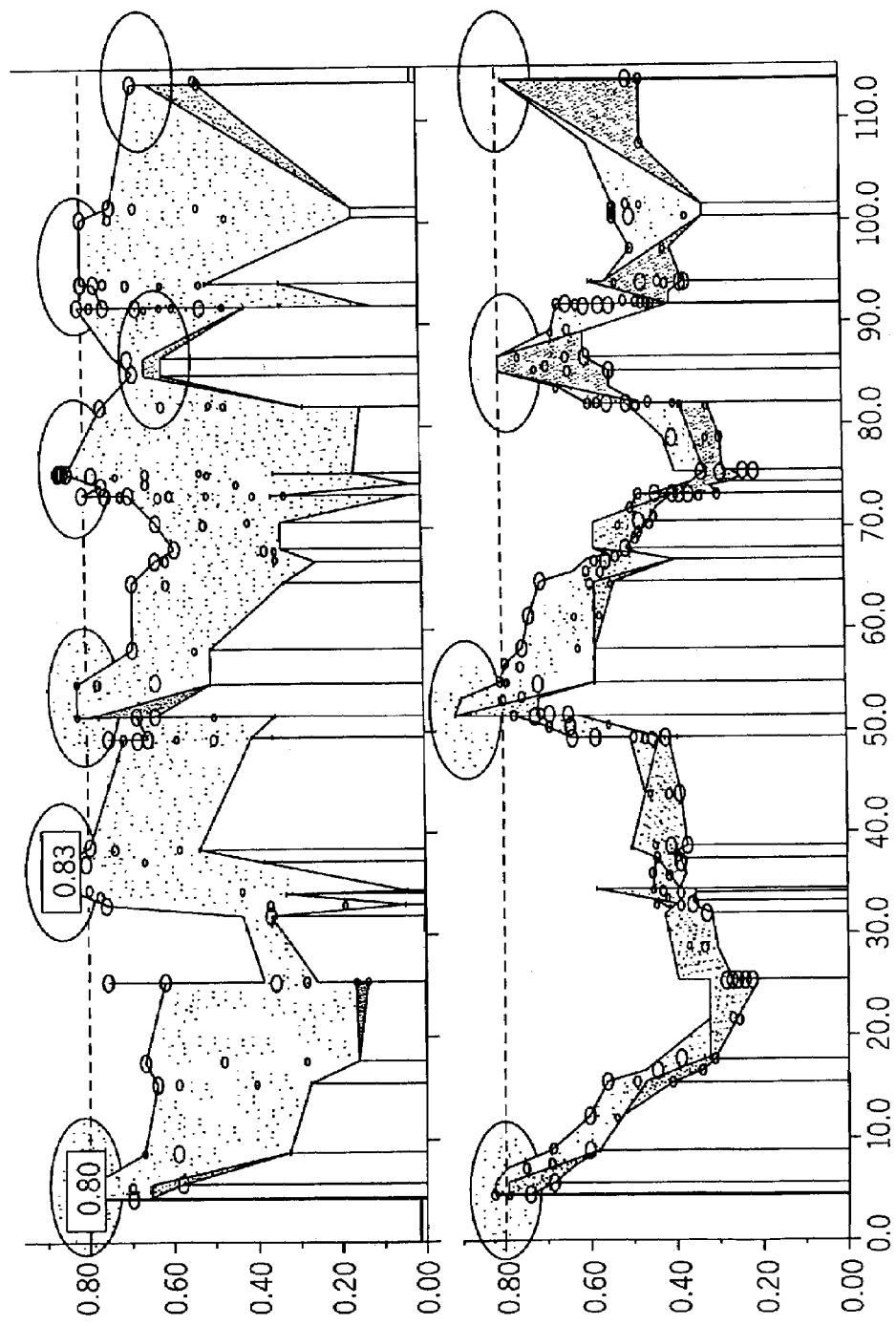

FIG. 11 compares directly in silice in the top part of the drawing vs. "in silico" in the bottom part of the drawing correlation between phenotype and genotype scores on chromosome 1 for bins of 1–10 adjacent informative markers.

Figure 12:
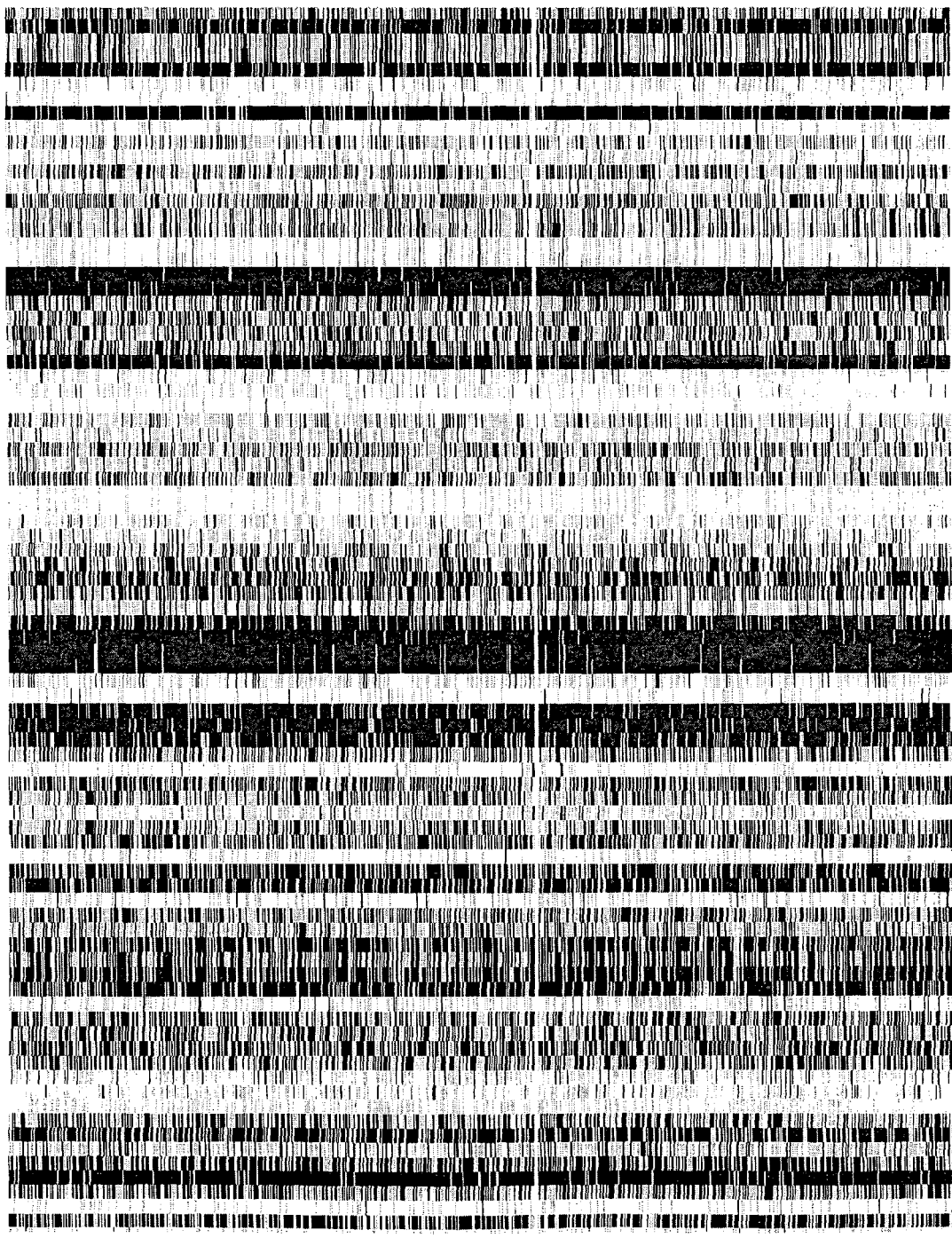
Figure 16A:
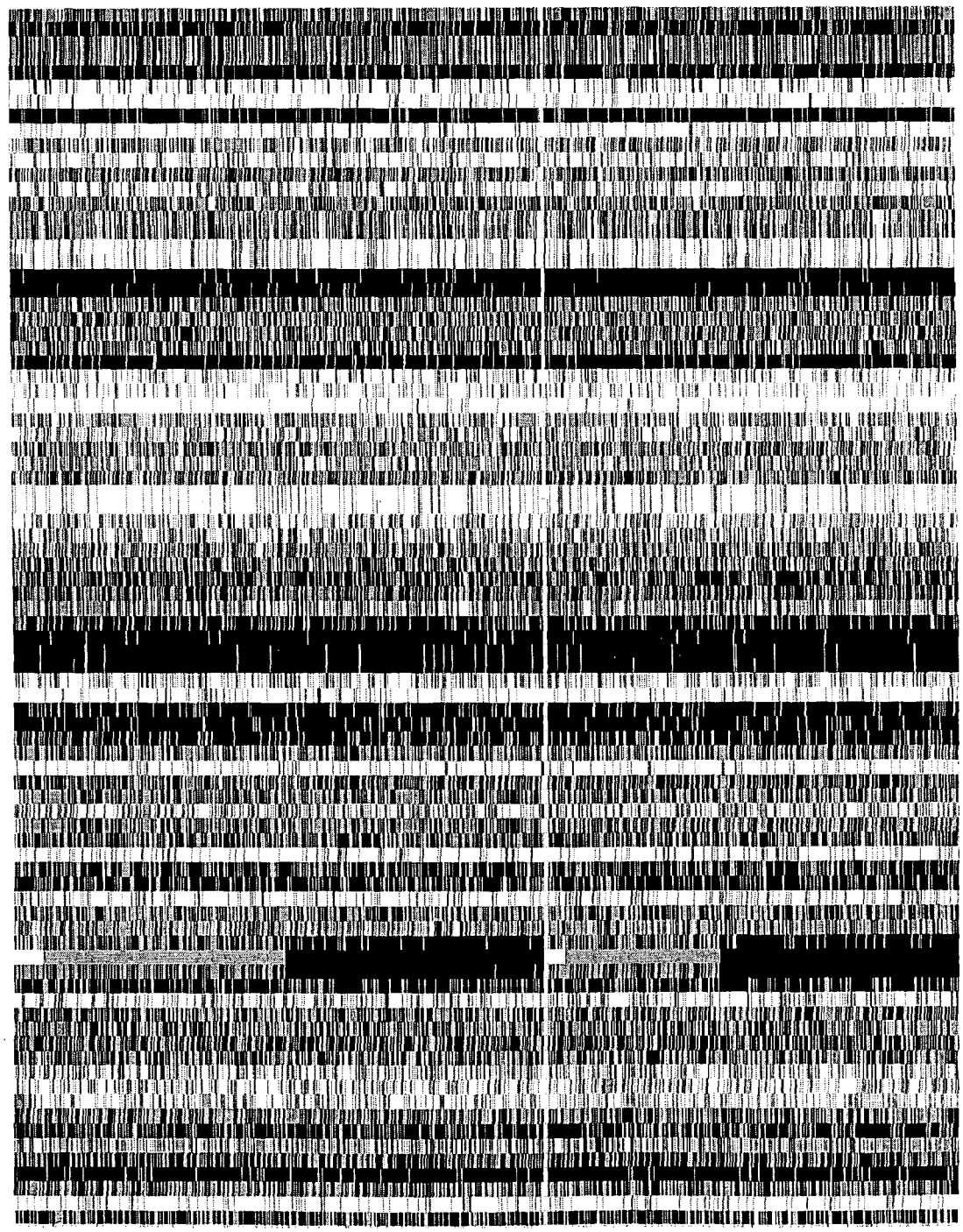
Figure 16B:
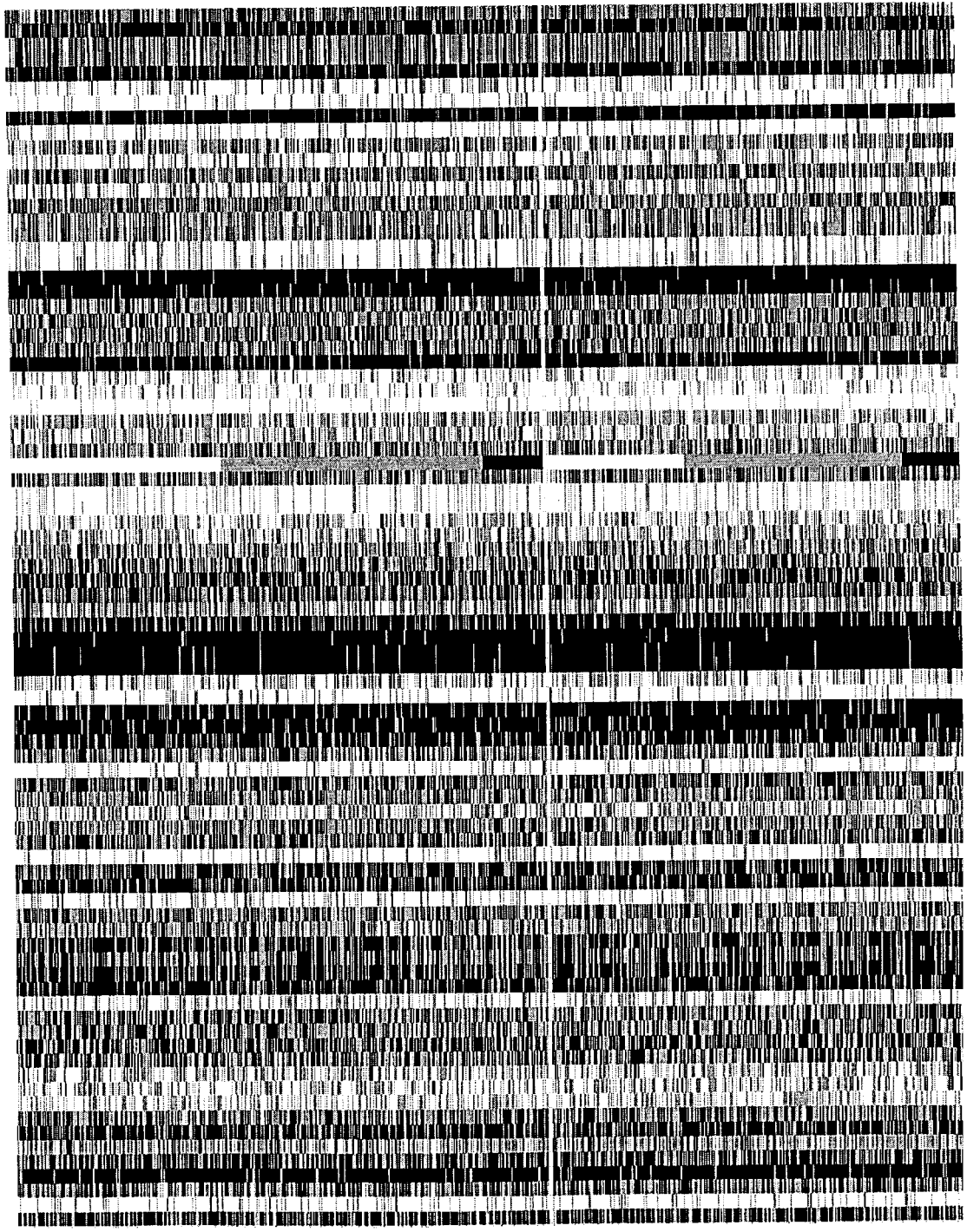
Figure 16C:
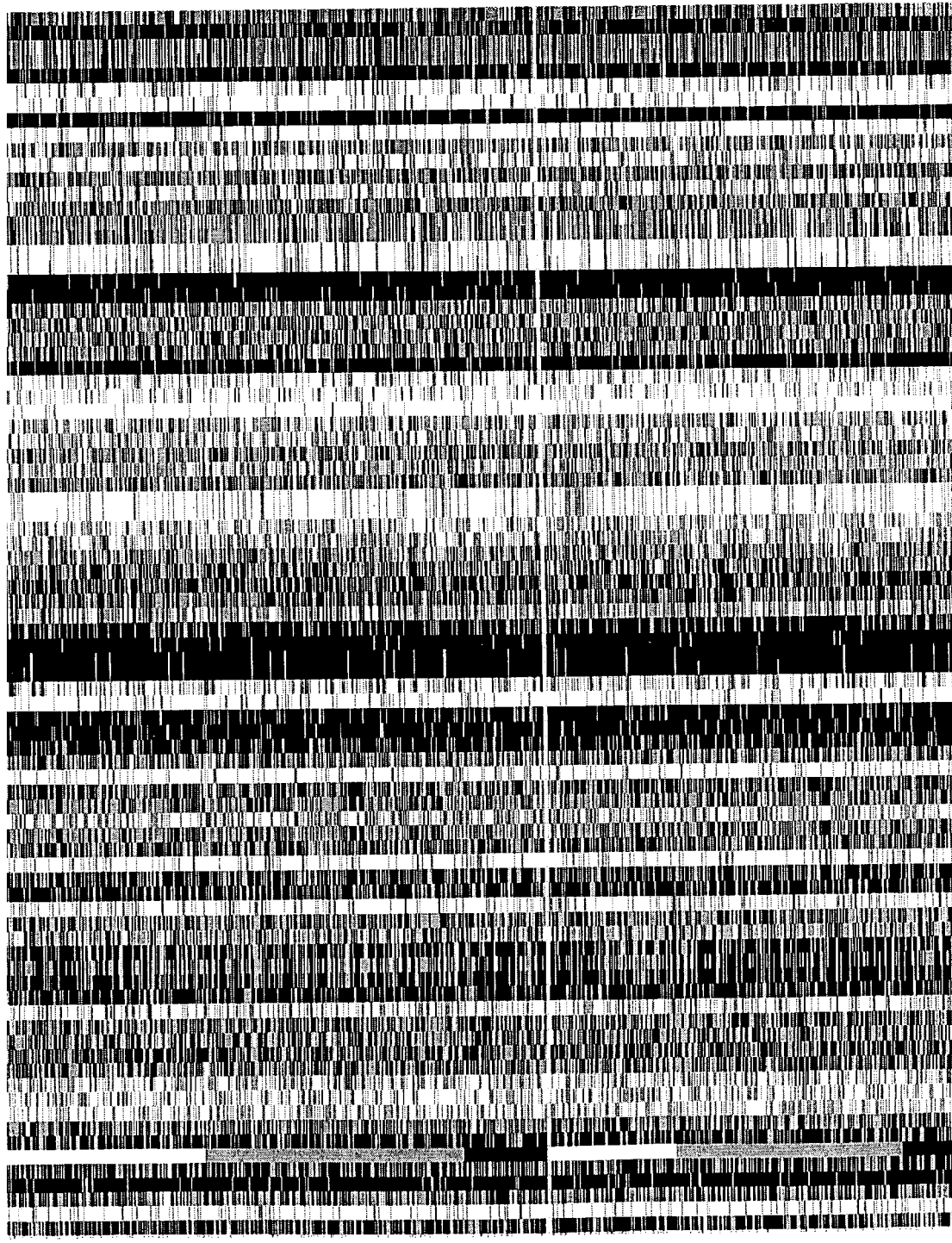
Figure 16D:
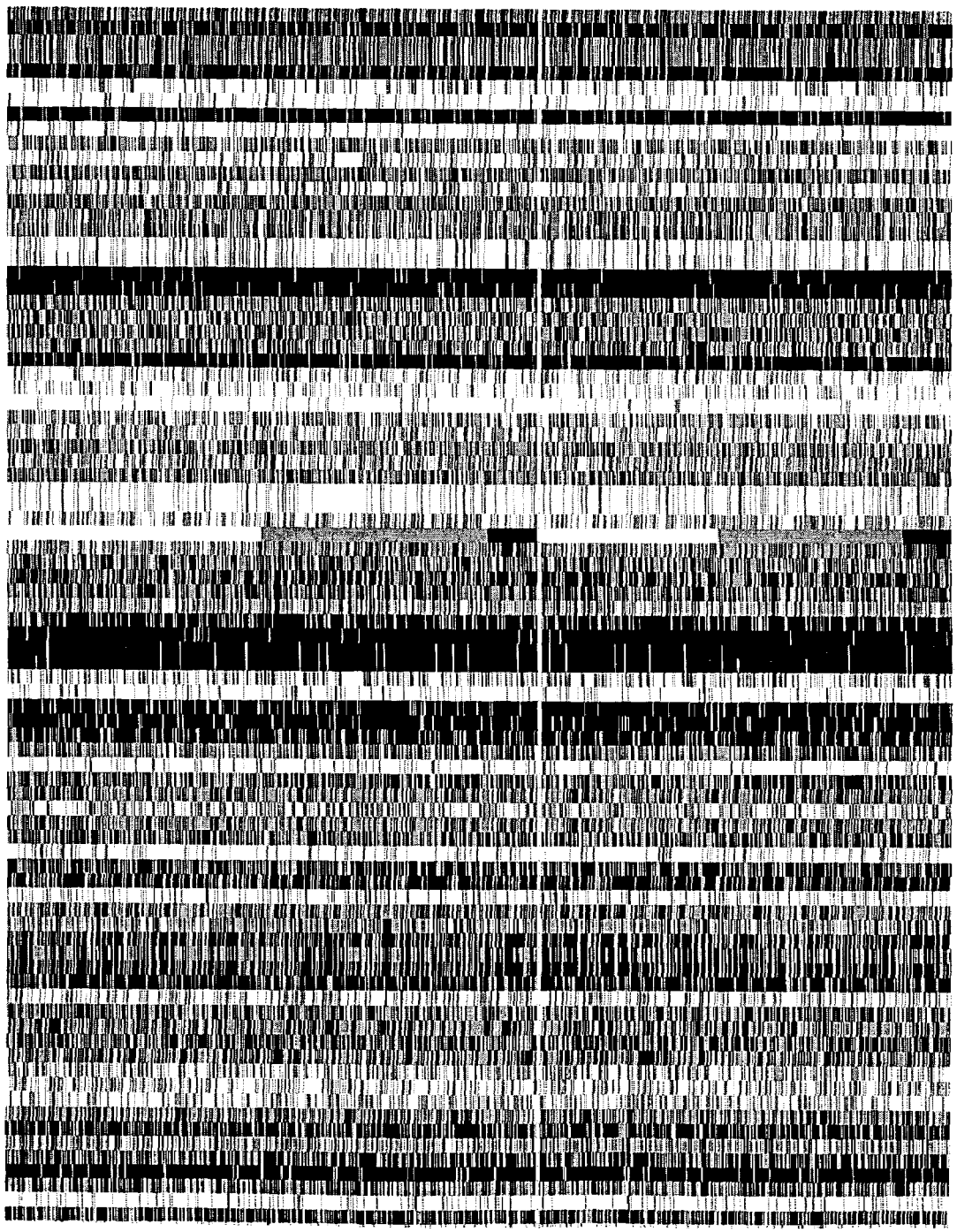

FIG. 12 lists genetic information of patients. Columns of Marker loci are numbered consecutively from 1 (left side) to 84 (right side). The bottom group of patients relapsed developed. The genetic profile for each patient is color coded in shades of grey. The allele predominantly seen among relapsing patients is shown in black, the other allele as white. Thus, if the patient is heterozygous at any given location, the field indicating the corresponding marker location for this patient is coded as grey.

FIG. 13 shows a flow diagram of spreadsheets for identifying genetic intervals relevant for a high risk phenotype. The lower path indicates how Fisher information is used to weight linear scores when several replications are available for each combination of subject and marker. The pictures in the boxes on the left and right are given to convey a visual impression of the computer screens seen by the user when interacting with the system.

FIG. 14 shows a flow diagram of spreadsheets for identifying genetic intervals relevant for a high risk phenotype by means of IC weighted UStat scores. The same context is assumed as in FIG. 13. Different layers are depicted to indicate the option for paralellization, i.e., that different subsets of markers (with one marker overlap, as indicated in the left box) can be analyzed independently, either sequentially to overcome memory space limitations or in parallel to increase speed.

FIG. 15 lists a complete set of relevant spreadsheet formulae for the first interval for the worksheets in FIG. 14. In this spreadsheet design, the group formulae are copied vertically for the number of subjects per group, while the columns are copied horizontally for the number of markers in the data set. Larger sets of markers can be accommodated by increasing the number of multiplicative terms within the argument of the sum array function in sheets LE1 . . . XT2 from 2 or three, respectively, by the number of additional markers.

FIGS. 16a to d show genetic information from FIG. 12 sorted by the four loci with highest difference in average allele code (linear score).

Figure 17:
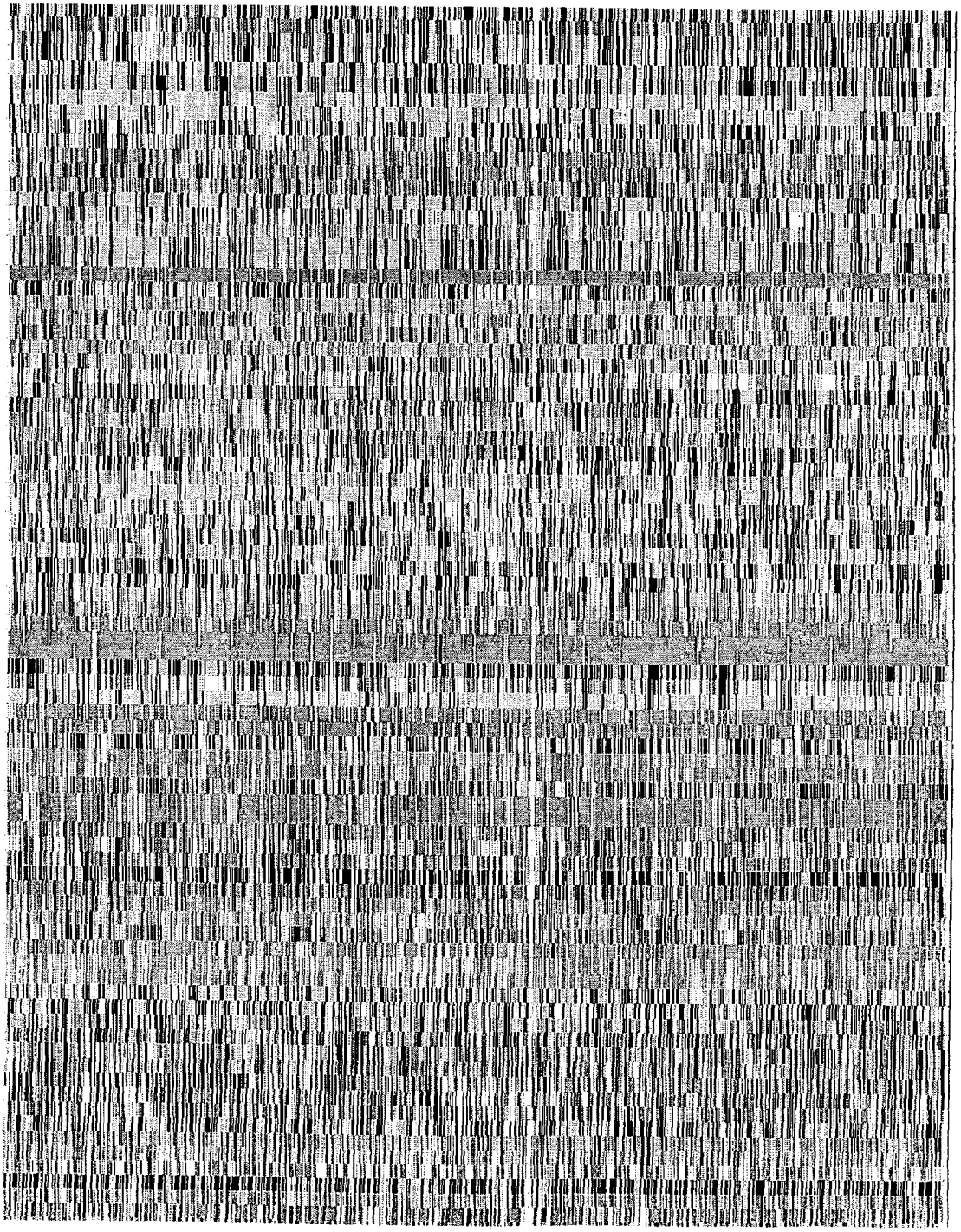

FIG. 17 shows the same genetic information of patients as FIG. 12, but with u scores for each of the intervals between marker loci instead of linear scores for each of the marker loci. Columns of marker intervals are numbered consecutively from 1 to 83. The u scores are mapped onto the maximum color coding allowed for by this version of MS Excel (2000 SR-1), which is 4: <−0.5: white, −0.5–0.0: light grey, 0.0–0.5: dark grey, >0.5: black.

Figure 18:
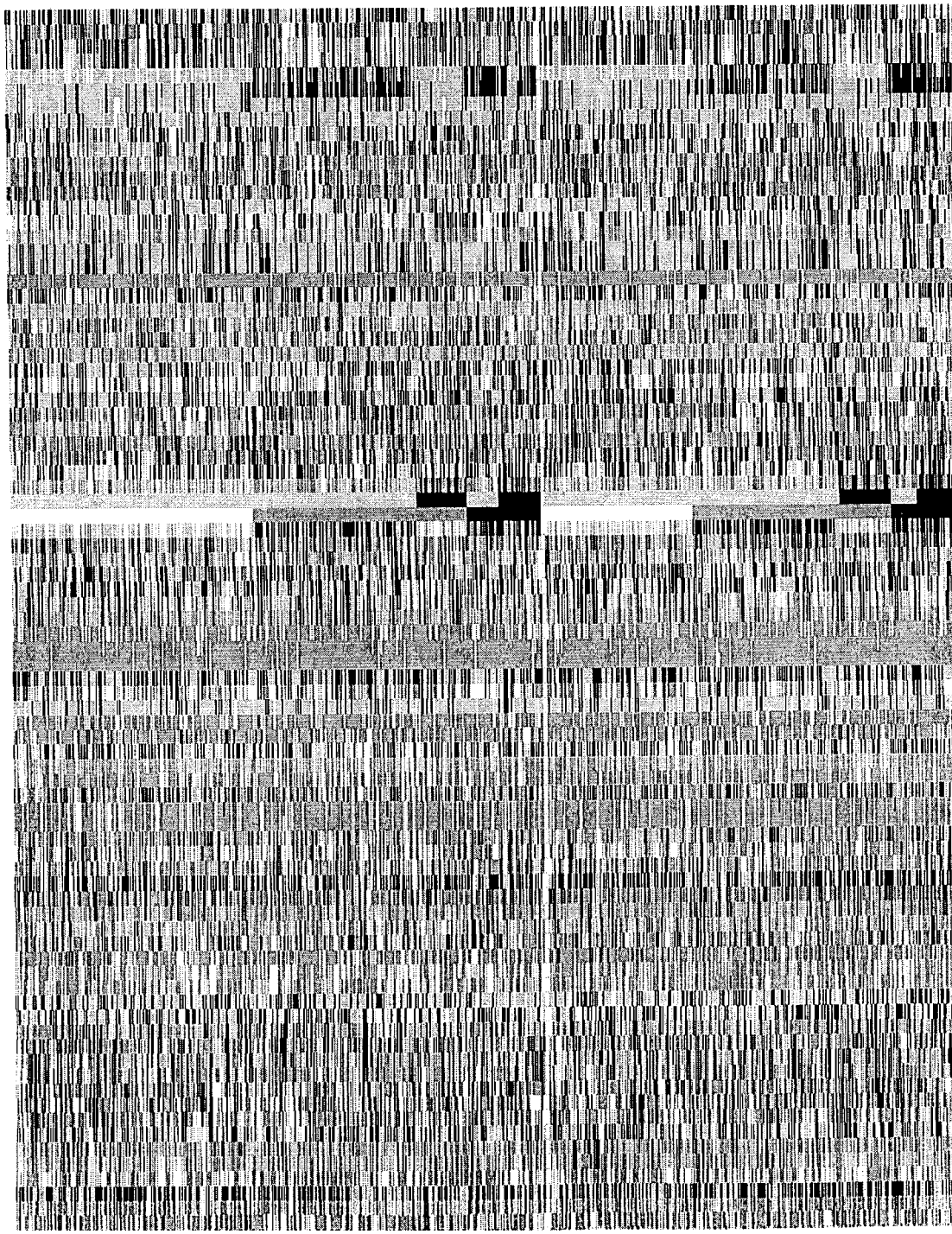

FIG. 18 shows the same u scores as FIG. 17, this time sorted by ordinal evidence from interval 49–50, the interval with highest difference in average weighted u score.

Figure 19:
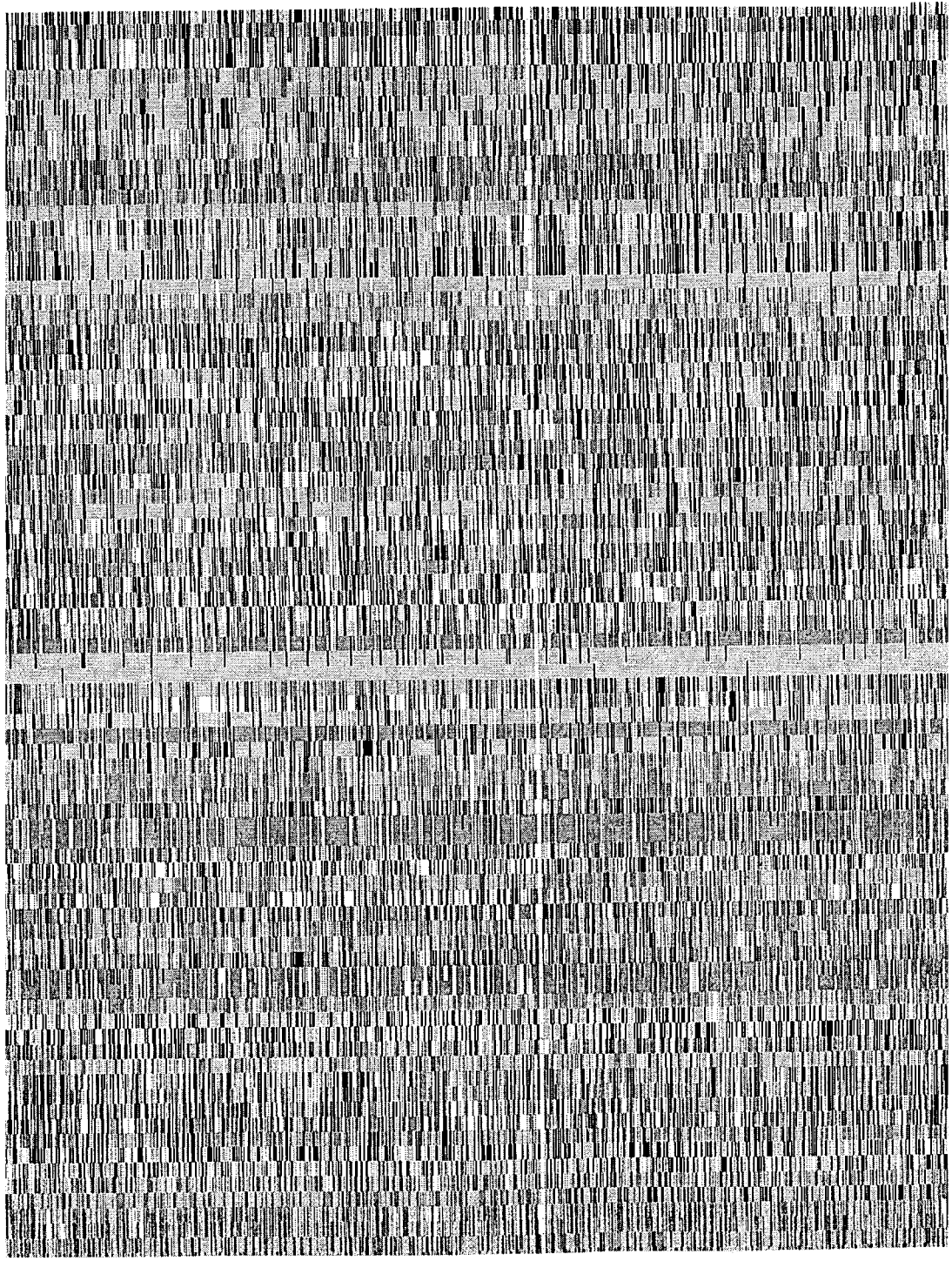

FIG. 19 shows yet another representation of the genetic information of patients (same data as in FIG. 12 and FIG. 17). This time, however, the u scores are multiplied by information content weight. Again, as in FIG. 17 numerical values are mapped onto four categories, 4: <−0.5: white, −0.5–0.0: light grey, 0.0–0.5: dark grey, >0.5: black.

Figure 20:
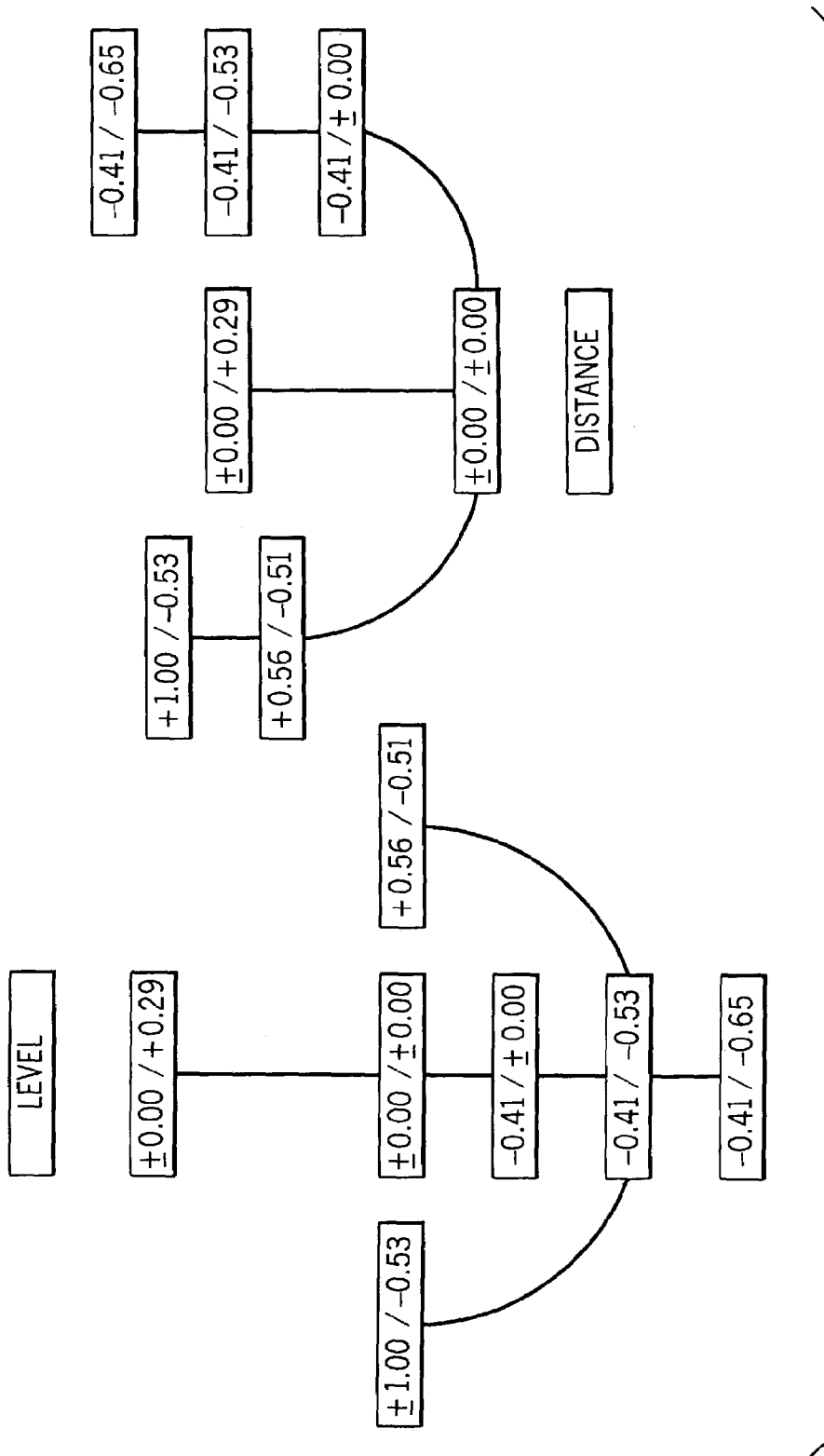

FIG. 20 compares two lattice structures for partially ordering the data on Age and BMI of the subjects listed in Table 11, the different structures resulting from different metrics chosen. In either case, numbers within the boxes are univariate differences between subjects with disease 1 or 2 and the reference subject. On the left side (a) the multivariate differences are ordered according to their ordinal level among each other. Clearly, this ordering is not appropriate in this context. For instance, for ordinal data, a difference of +1.00 is not necessarily more meaningful than a difference of −0.41 (left arm of the left diagram). On the right side (b), the data are ordered according to their ordinal distance from subject 1, using the approach provided for ordering ordinal data with respect to their distance from a reference.

DETAILED DESCRIPTION OF PREFERRED EMBODIMENTS

The preferred embodiments introduces a unifying concept for the statistical analysis of inexact ordinal data, solving shortcomings in dealing with multivariate ordinal data. Being "intrinsically valid", this approach overcomes a need for external validation. The method enables a decision support system providing: (1) automated decision support in a transparent fashion (2) being optionally capable of being controlled by a decision maker (3) providing for evidence acquisition concept, including automatically increasing the content of an underlying database, and (4) providing for an computationally efficient interactive distributed environment.

Statistical Method

The basic underlying MrgL methodology was introduced in 1973 for use in the analysis of censored data. The Gehan/Prentice/Savage test and the Kaplan-Meyer estimate for survival are widely used applications. In 1992, it was shown that this approach could be generalized to more than two variables and other metrics than those for interval censored data. Subsequently, early versions of the MrgL approach have been applied to assess side effects, to determine risk factors, to evaluate prevention strategies, and to measure immunogenicity.

A preferred embodiment of the invention described herein introduces a class of intrinsically valid methods for analyzing multivariate ordinal data based on a unifying concept for inexact ordinal data. It will also be appreciated that this conceptualization of the underlying problem provides for solutions to be applied to a wide class of statistical applications.

In view of the extensive use of a set of terminologies in describing various embodiments, where terms are utilized that have been used inconsistently in the literature, the following meanings will be adopted:

Population: A class of entities characterized by common characteristics, including, but not limited to human and animal populations such as patients with a particular risk factor or disease.

Subject: An entity already classified or to be classified as a member of a population.

Latent Factor: Every variable observed provides information about an unobservable (or unobserved) latent factor.

Dimension: Data can be points (dimension: 0) or intervals (dimension: 1).

Linear Model: The linear model is characterized by the assumption that the relationship between the observed variable and the latent factor is linear (after a suitable transformation, if necessary). Such variables are typically called "interval scaled", because intervals of a given length are comparable with respect to the latent factor. Examples can be found in physics, population dynamics, and economy.

Ordinal: A variable is termed "ordinal", whenever the relationship between its observations and the latent factor is not necessarily linear, but a larger value of the observed variable merely indicates a larger value of the latent factor. For example, in biological, psychological, and genomic applications the relationship between the measurement (body temperature, IQ, gene expression) and its meaning (fever, social status, immunity) are usually ordinal, but not linear. An increase in body temperature (observed variable) by two degrees from 35° C. to 37° C., for instance, is usually an irrelevant change in fever (latent factor), while an increase from 41° C. to 43° C. means that a person dies.

Precision: For ordinal data, where the size of a difference has no direct interpretation, data that are "similar" need to be treated differently from data that are "identical". Exact (discrete) differ from approximate (discretized continuous) data in that the same observed values represent identical and similar values of the latent factor, respectively. The distinction of precision (precise vs. approximate) from the scale level (ordinal vs. interval) allows ordinal variables to be "discrete" or "continuous".

Partial order: When some entities in a set (or population) can be ordered, but others cannot, any two entities A and B fall into either of four categories: A<B, A>B, A=B, A<0>B. Such a "partial order" can be depicted as a HESSE diagram (see, for instance, FIGS. 3a, 3b and 4b), where profiles that can be ordered are connected by lines. (If A<B and B<C, it suffices to connect A with B and B with C.)

Tuple: A set of observations, each belonging to a specific variable is called a tuple. Thus, each multivariate datum is a tuple, Induced multivariate partial order: A set of tuples can be partially ordered in many ways, even if the partial order used for each variable is held constant. One particular partial order for multivariate data can be obtained from a set of ordinal variables, by defining for each pair of tuples the first tuple to be superior to the second, if for all variables the value of the first tuple is superior or equal to the corresponding value of the second tuple, and if for at least one variable the value of the first tuple is superior to the corresponding value of the second tuple.

Scoring: A linear scores (LComb) is computed as a linear combination (weighted average) of different variables' numerical value for a particular entity. The u-statistics (UStat) approach is based on counting for each tuple the number of tuples known to be superior, equal, or inferior, ignoring pairs where the order cannot be determined. The marginal likelihood (MrgL) scoring approach is based on compatible ranking of n profiles is a permutation of the numbers 1 . . . n, such that among all pairs of tuples that can be ordered, the superior tuple is assigned the higher rank.

Information content: Within the linear model, information content of an estimate is described by the Fisher information (1/variance). For MrgL scores, a similar concept of measuring information content has been introduced, albeit in a form that was valid only for very specific cases and, thus, not generally applicable. For u-statistics, measures for information content are lacking.

Integration: When computing linear combinations of variables in the linear model, variables of more importance can be given a larger numerical weight.

Aggregation: By choosing different methods of aggregation, scores can be utilized to rank individuals within a populations, to compare populations (analysis of variance), to identify predictors (regression), to separate known sub-populations (classification), and to identify new sub-populations (cluster analysis).

Decision: In the context of the invention, the term null hypothesis refers to the hypothesis that an entity belongs to the population represented by a "control" population. The hypotheses that the entity belongs to either of several "case" populations will be referred to as alternative hypotheses. Type-I error and type-II error refer to erroneously rejecting the null or an alternative hypothesis, respectively.

Specificity and sensitivity are the probabilities of not erring under the null or alternative hypothesis, respectively. In the context of data-driven decision making, we will use the term "sensitivity" for one minus the relative position of an entity among the cases and the term "specificity" for the relative position of a entity among the controls.

The preferred embodiment also includes the following concepts:

Orientation: An ordinal variable is said to have the same orientation as a latent factor if a difference between two values in the variable is assumed to indicate a difference in the same direction in the latent factor.

Level ordering: For an ordinal variable, the magnitude of a difference has no mean-ing, Nonetheless, two values A and B are from an oriented variable they can be or-dered with respect to their level. If several variables (each allowed to be point, inter-val, or replication) have the same orientation, the tuples are termed profiles to indicate the possibility of level ordering.

Distance ordering: In the linear model two values A and B can be ordered with respect to their distance from a reference X by assessing the absolute size of their difference from this reference. For ordinal variables, however, the magnitude of a difference has no meaning and, thus, "distance" cannot simply be defined in terms of the absolute size of a difference, as in the linear model. The inventive approach also introduces a novel concept in which values from unoriented variables can be ordered with respect to their distance from a specific baseline value. If at least some of the variables lack orientation, tuples are termed pattern. Pattern, in contrast to profiles, cannot be level ordered. The invention, therefore, propose a method for distance ordering pattern.

Points as Intervals: The preferred embodiment also introduces the treatment of approximate (discretized) points as intervals with the width determined by the smallest difference between two of the observed values. Exact (discrete) data, in contrast, are treated as degenerated intervals to be compared with intervals using a particular partial order.

Replications (of intervals) are introduced as a separate concept for interchangeable variables. For the sets of replications, a separate distribution metric, applicable to both orientations, is proposed.

Factorization: To deal with "exact ties" and "within-group ties", the instant approach provides for the first time for the modifying of information content estimates by "factorization", thus allowing information content to be estimated for inexact data in general. In addition, factorization reduces the computational effort (see below), thus, making the MrgL approach more feasible (also see below).

The preferred embodiment advances the analysis of inexact (multivariate) ordinal data by expanding the definition of information content for MrgL scores through factorization and by introducing the concept of information content to u-statistics, also with factorization.

Results based on u-statistics are more computationally efficient, but do not use the information contained in the data to the same extend as MrgL results, which are computationally intensive. The present invention provides several approaches (factorization, UStat scores as starting point for computation of MrgL scores, UStat scores and ICweight to assist in combining presults from subsamples) to increase the computational efficiency of the MrgL approach, thus, making it more usable.

In addition, the preferred embodiment resolves a set of specific problems associated with inexact ordinal data, such as how to deal with replications, how to determine the objects whose data pattern are most similar to a particular data pattern, and how to position an entity's data profile with respect to case and control profiles.

Figure 1:
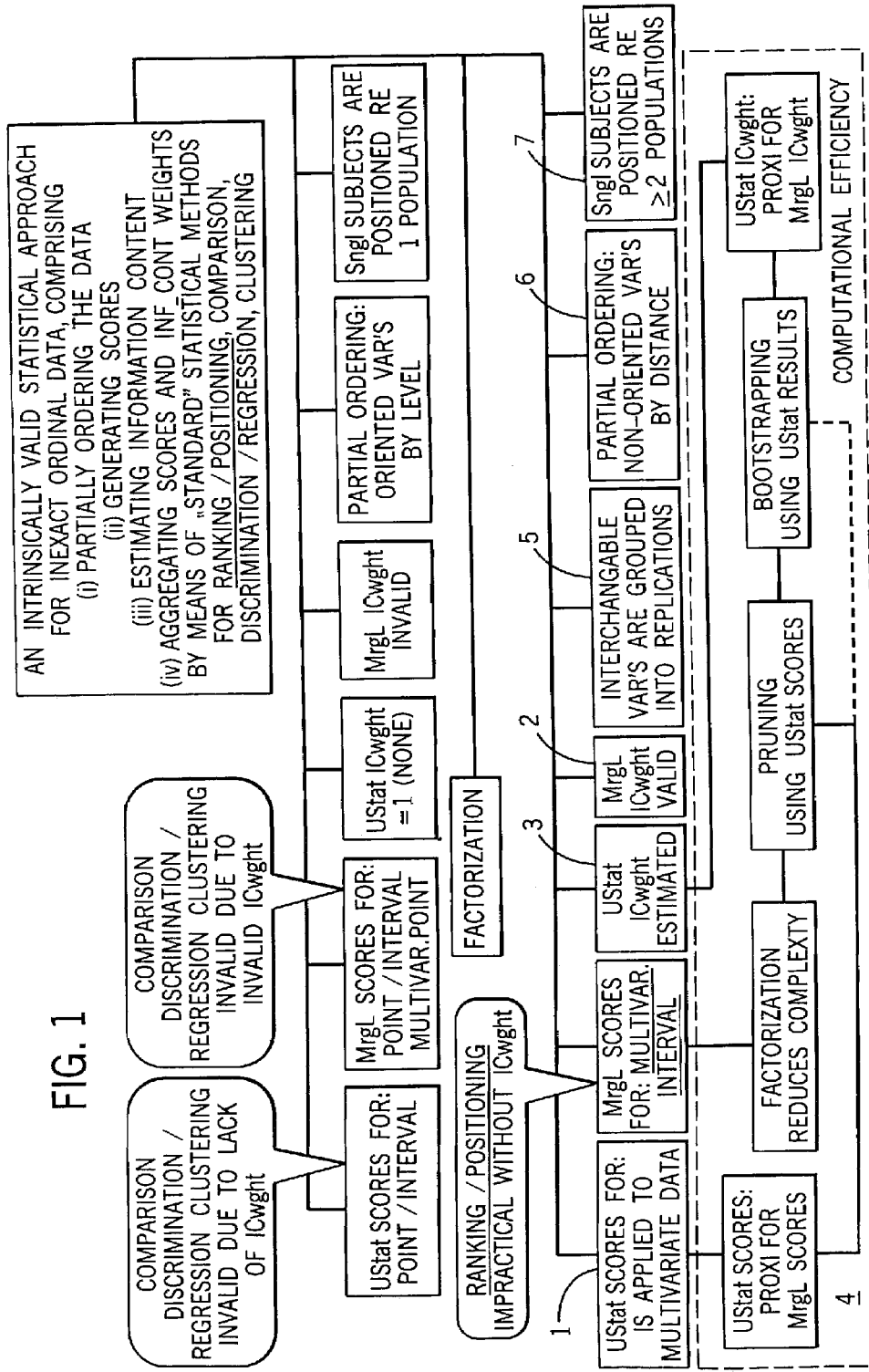
FIG. 1 illustrates process components of a preferred embodiment of the invention.

Referring to FIG. 1, various aspects of improvements are shown and include:

(1) UStat scores have been applied to points and intervals only. The invention proposes a method to compute UStat scores for data with arbitrary partial orderings, including multivariate ordinal data.

(2) The originally proposed MrgL IC weights were invalid except for irrelevant special cases, because they did not account for arbitrariness irrelevant for the intended aggregation (e.g, "exact ties" and "within-group" ties). The invention proposes a novel approach, termed "factorization" to overcome these shortcomings.

(3) Estimates for information content have been proposed based on the linear model (Fisher information) and the MrgL approach. The invention proposes estimates for information content based on the UStat approach. Moreover, the invention proposes a factorization approach, similar to that proposed of MrgL IC weights, when computing UStat IC weights.

(4) The numerical complexity for computing MrgL scores is so huge, that the current approach may not be practical, even for situations, where weighting for IC is not necessary, such as positioning an entity with respect to a single population of entities. Thus, strategies to increase computational efficiency are extremely important to provide a commercially useful system and method. The invention therefore proposes several strategies, comprising (a) factorizing—even if it doesn't change the numerical values of the scores. The invention proposes a method comprising of the same steps as for obtaining valid estimates for IC.

(b) pruning—stopping early if one can predict that continuing is futile. The invention proposes a method that utilizes intermediate results from computing UStat scores as proxi scores.

(c) bootstrapping—taking small random samples and averaging across these samples. The invention proposes a method, wherein the steps comprise of using UStat proxi weights to determine for each object, which samples contain the more relevant contributions to the overall scores. The invention also allows the bootstrapping done using parallel processing, allowing the stability of the results to increase without additional time to be spent. Thus, this invention proposes to compute UStat scores/ICweights first, and then using results from this first step to improve efficiency in computing MrgL scores and weights.

(5) Previously proposed methods for multivariate ordinal data have not addressed the specific problems that arise if some of the variables are interchangeable. The invention proposes grouping interchangeable variables by means of a metric for replications.

(6) Previously proposed methods to partially order inexact (multivariate) data generally fail when at least some of the variables lack orientation. The invention proposes a method to partially ordering objects with respect to their distance from a baseline object, even in cases where the variables lack orientation.

(7) When trying to categorize an entity based on exact (univariate) data, it is often sufficient to position the entity separately within each of the sets of reference entities (e.g., to determine the sensitivity with respect to the cases entities and the specificity with respect to the control entites). With inexact (multivariate) data, however, information from the other data set(s) could be used to refine the partial ordering and, thus, to reduce the level of "inexactness". The invention proposes an improved way to categorize entities by positioning each entity with respect to the combined data set and only then looking at the resulting relative position within each of the data sets individually.

Referring to FIG. 2, a preferred embodiment for computation of UStat Scores and UStat IC weights without and with factorization comprises several steps:

(1) The array of pairwise orderings depicts for each pair of bi-variate data the order of the left datum compared to the bottom datum as "1" superior, "−1" inferior, "0" equal, or "?" undecided.

(2) The rectangular borders within the array of pairwise orderings and the column uf UStat ICW indicate two possible factorizations: (a, double) entities E and F are "factorized" because they are considered "identical"; (b, bold) entities E and F are not factorized, because they are considered "similar" only.

(3) The scores are computed from the UStat boundaries, as the number of inferior entities (#<) divided by 2 minus the number of superior entities (#>). To improve readability, the scores can then optionally be standardized in several logically equivalent ways.

(4) Information content is estimated as the square root of the ratio of the number of decided pairs (and "normalized" by dividing by the total number of pairs).

(5) The different information content weights for entities E and F, reflect the effect of factorization on information content. If the tie is "exact", because the data is considered "identical" or the data are only "similar", but this arbitrariness is irrelevant given the intended method of aggregation ("within-group tie"), the ICW of both entiess would be 0.91. Otherwise, the two entities would be assigned an ICW of 0.82.

Figures 3B, 4B:
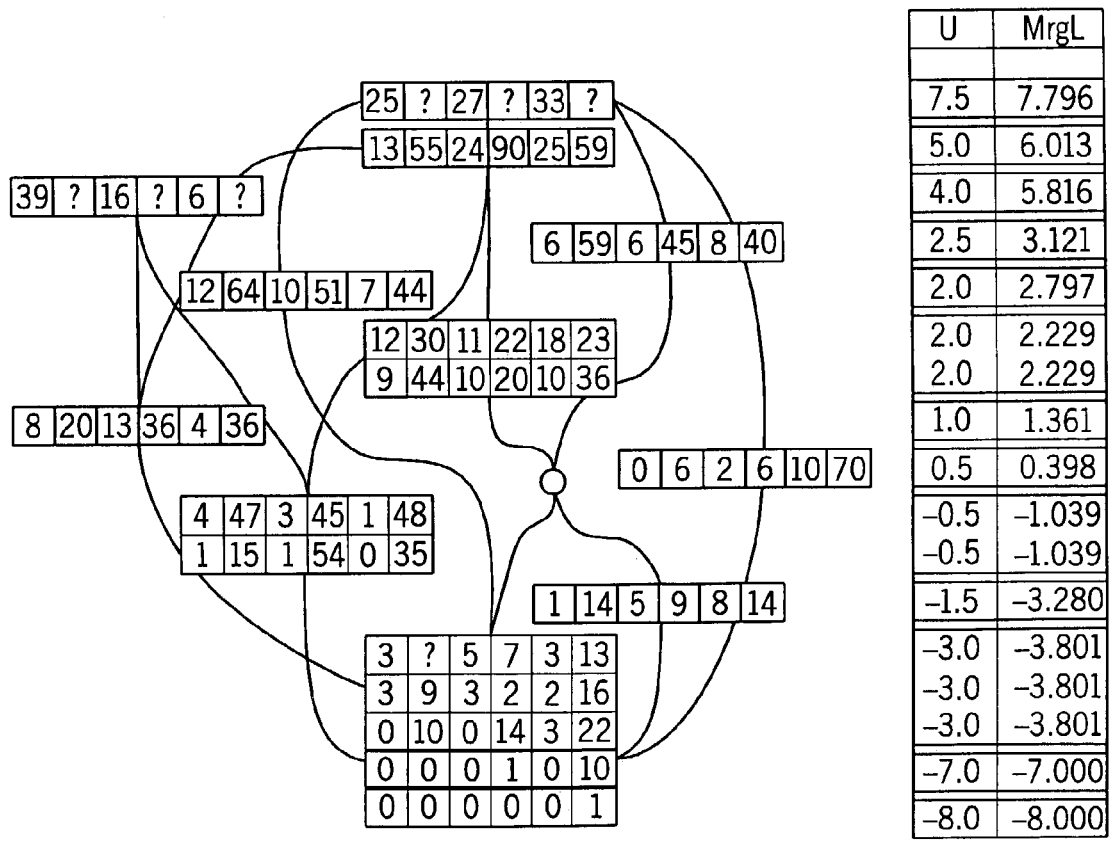

Referring to FIG. 3, (FIG. 3a: without factorization, FIG. 3b: with factorization) an envisioned preferred embodiment for computation of MrgL Scores and MrgL IC weights without and with factorization comprises several steps:

(1) The UStat boundaries #< and #> allow for early pruning when determining the set of compatible rankings.

(2) Each MrgL score is computed as the average across all compatible rankings (with normalizing by subtracting the expected score)

(3) Information content is estimated as (one minus) the variance across the compatible rankings divided by the highest possible variance.

(4) Comparing FIG. 3b with FIG. 3a demonstrates, how factorization (a) reduces the number of rankings to be computed (from 14 to 7) and (b) increases the IC weight (from 0.85 to 0.96).

The invention further provides for a method to augment the computation of MrgL scores and weights using a well-known approach such as the approach described in the Susser et al work mentioned before, the steps comprising (a) using the proposed method on a different set of multivariate data to obtain "external" scores and weights (b) weighing compatible rankings according to their correlation with these external scores when computing MrgL scores and MrgL IC weights.

A compact disc has been supplied as a computer program appendix entitled "The MrgLRank program" which sets forth the MrgL methodology. This computer program appendix is incorporated by reference herein. The calling conventions for the MrgLRank program are as follows. For compatibility with major statistical software programs, the first row reads proc MrgLRank The second row reads /Scaletypes=<scaletype_1> . . . <scaletype_n> where n is the number of variables, and <scaletype_n> is either "discrete" (same value indicates identical conditions) or "continuous" (same value indicates similar conditions). Eclipses ( . . . ) indicate that 1 to n variables can be entered (as specified in the module FM_Glbl).

The third row reads

Cards

Each of the following rows provides the data for a given entity. The format is

<blk> <grp> 11 <var_1> . . . <var_n>|<augment>;

where each variable can be a number or an interval

[<low>, <high>)

with <low> and <high> numbers and where <augment> is the variable used for augmentation. Everything entered after the semicolon is ignored.

Figure 4A:
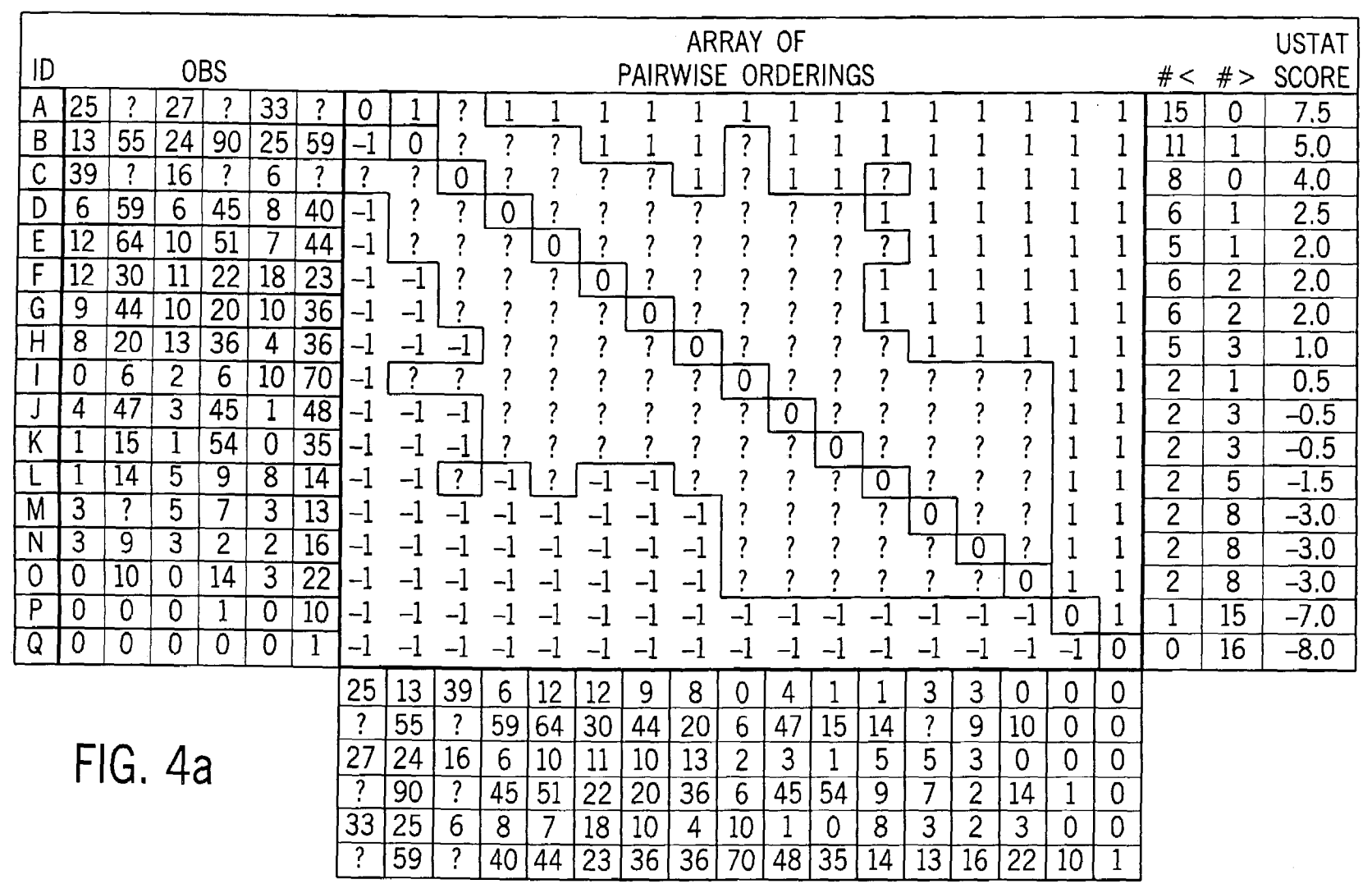

While the UStat and MrgL results are often similar, UStat results may ignore im-portant information. FIG. 4a and b depict the results for data set of 17 six-variate obser-vations, where the UStat method assigns identical scores to entities E, F, and G (FIG. 4a), while the MrgL method assigns a higher score to entity E (FIG. 4b). From FIG. 4a, the contributions of entities B and L, which affect entities F and G, but not entity E, cancel each other out (B:1, L; 1) with respect to the UStat scores. From the Hesse dia-gram in FIG. 4b, however, entity B has more influence on entities F and G than entity L. Thus the MrgL ranking is preferable, because it utilizes more information.

The price to be paid for utilizing more information is computational complexity wherein the computational complexity of the UStat algorithm increases with the square of the number of data only. Each additional datum adds one more row and one more column to the array of pairwise comparisons. Thus, an increase from 7 to 8 observations increases the number of cells in the array from 49 to 64. For 17 observations, UStat results can be obtained from an array of 17×17=289 cells.

The complexity of the MrgL algorithm, however, may increase much faster. Without pruning, a total of 7!=1×2×3×4×5×6×7=5040 rank permutations were to be considered to select the 14 compatible rankings in FIG. 3a and 17!=355687428096000 rankings for 17 observations as in in FIG. 4b. Pruning based on the UStat boundaries guarantees that not more than (7−7+1)×(6−5+1)×(6−4+1)×(5−2+1)×(4−2+1)×(4−2+1)×(1−1+1)=216 rankings need to be evaluated. Similarly, pruning reduces this maximum number of rankings to be considered by a factor of 7 in FIG. 4b. Factorization for within group ties among the blocks of similar observations may reduce the number of rankings by an additional factor of 2 in FIG. 3b, and by a factor up to 6×2×2=24 in FIG. 4b.

Fortunately, if a relatively high rank (while still within the limits of set by the UStat boundaries) has been assigned for an observation near the bottom of the Hesse diagram, the algorithm is likely to exhaust the ranks available within UStat boundaries in the middle of the Hesse diagram. Such "conditional pruning" based on UStat results further reduces the number of rankings that actually need to considered, so that the MrgL results of FIG. 4b can be obtained on a personal computer (Pentium III, 750 MHz) in 30 minutes. As computer technology is advancing, the number of objects that can be handled at the same time will increase and/or the time to handle a data set of a given size will decrease.

Still, the number of objects that can be processed within a single "chunk" of multivariate data is likely to be limited. To overcome this limitation, the invention proposes to use conventional "bootstrap" technology comprising the steps of (a) drawing samples of the data set, (b) performing the above method within each sample, (c) assign unfactorized UStat IC weights to the within-sample MrgL scores and IC weights, and (d) integrating results from several samples while giving more weight to within-sample MrgL scores/IC weights based on the unfactorized within sample UStat ICWeights.

Clearly, several chunks can be processed in parallel on different computers, so that the accuracy of the approximation is not limited by time, but rather by the number of parallel processors available. As array processing becomes increasingly common, the proposed approach to resolve the issues of computational complexity is commercially feasible.

Decision Process

Figure 5:
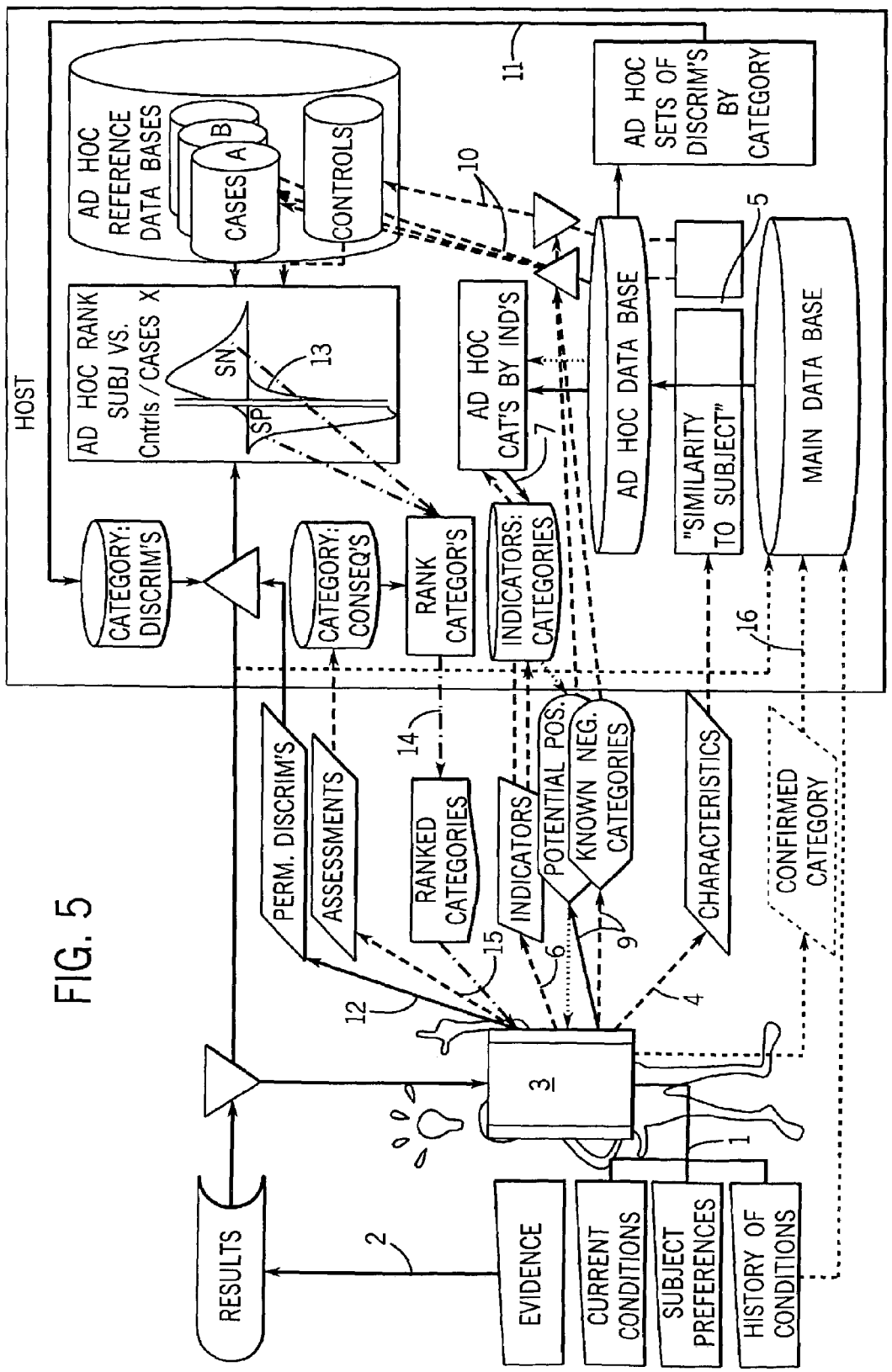
FIG. 5 shows a pictorial representation of an interactive decision support system.

A preferred embodiment of the envisioned interactive decision support process is shown in FIG. 5, the arrows indicating flow of information and the rectangles indicating the major steps where the above statistical method is utilized. The process comprises the steps of:

1. The decision maker collects information on the subject to be categorized, comprising variables describing a history of conditions, current conditions, and preferences to be considered in the decision process.

2. Some of this information can be in the form of evidence comprising material samples that needs to be processed into result variables.

3. The decision maker reviews all information obtained from the material samples.
4. The decision maker determines which of the variables are to be considered "characteristics".
5. Based on these characteristics, the system restricts the "main data base" to an "ad hoc data base" of objects "similar" to the entity to be categorized, the method comprising an intrinsically valid method for ranking objects from a single population, the main data base, with respect to their distance to the entity based on oriented and non-oriented multivariate ordinal data described herein (see FIG. 1 item number 6).
6. The decision maker determines which of the variables are to be considered "indicators"
7. Based on these indicators and the "ad hoc data base", the system then updates an "Indicators:Categories" knowledge base by screening the ad hoc data base for categories related to these indicators, the method used comprising for each case category an intrinsically valid data based method for comparing the specific case category and the common control categories in the ad-hoc data base with respect to a different oriented indicator variable, the method described herein.
8. Based on the updated "Indicators:Categories" knowledge base, the system then determines a set of (pos.) categories the entity might belong, the method used comprising conventional rule based methods and feeds back these categories to the decision maker.
9. The decision maker determines the set of (pos.) categories to be considered by revising the suggested list of potential positive categories and determines a set of (neg.) categories the entity is believed not to belong to.
10. For each of the positive categories (cases) and for the union of the negative categories (controls) the system extracts a separate ad-hoc reference data base.
11. Based on the ad-hoc data base, the system then updates for each case category the "category:discriminators" knowledge base by screening the ad hoc data base for ad-hoc set of discriminator variables, the method used comprising for each case category an intrinsically valid data based method for discriminating the specific case category and the common control categories in the ad-hoc data base with respect to different subsets of oriented ordinal indicator variables, the method described herein (see FIG. 1 items numbered 2 and 3).
12. If requested by the decision maker, some indicators can be included as discriminators for all case categories.
13. For each case category and its specific ad hoc set of discriminators, the ad hoc rank of the entity with respect to the cases (sn: sensitivity) and controls (sp: specificity) is determined, the method comprising an intrinsically valid method for positioning an entity with respect to objects from two populations based on the case-specific set of discriminator variables determined above, the method described herein (see FIG. 1 item numbered 7).
14. From the results of the ad-hoc ranking of the entity vs. each of the case categories (sn: sensitivity, sp: specificity) and the permanent rules contained in the "category:consequences" knowledge base, categories are then ranked according to assessment criteria, the criteria comprising of sensitivity and specificity, entity independent consequences of type-I and type-II errors, and consequences of type-I decisions, the method comprising an intrinsically valid method described herein (see FIG. 1).
15. For the categories ranked most relevant by entity independent criteria, the decision maker may then add assessments of entity specific preferences to be added temporarily to the "category:consequences" knowledge base. These assessments will enable the system to modify the ranking of the categories to reflect entity preferences, the method comprising the same method as used in the previous step.
16. Once the categorization is confirmed, which may require additional time and or evaluations, the entity record in the main data base is updated and the main data base is screened for evidence of new rules that might be utilized to update the conventional rule bases mentioned in steps 7 (indicators:categories) and 11 (category:discriminators), above, the method used comprising the intrinsically valid methods described in the aforementioned steps.

The decision process of the preferred form of the invention includes a variety of protocols which resolve many of the problems that render the traditional decision process invalid.

For multivariate variables, a mechanism is provided for several variables being comprehensively assessed. Also provided is a mechanism by which reference data records are selected from a larger database, so that each data record is similar in a well-defined sense to the characteristics of a test entity's data record. Also provided is a mechanism to automatically select the discriminating variables for every individual decision depending on the desired specifics, and the characteristics of a test entity. While traditional norm ranges address specificity only, the invention provides a mechanism that allows each case category to be assigned also a sensitivity estimate. Once an entity's data recored has been assigned sensitivity and specificity with respect to a control category and one or more case case categories the invention provides a mechanism by which decisions on how to categorize the test entity can be prioritized.

The major problems of conventional expert systems were lack of transparency, difficulty of direct control, and problems with knowledge acquisition.

Lack of transparency resulted mainly from reliance of these systems on certainty factors during the iterative use of "heuristics". The proposed system, in contrast, uses deterministic rules, and even them only in few steps (7: If <indicators(s)> are present then consider <category>; 11: when testing for <category > then use <discriminators>). Since the rule based decisions are not applied iteratively with "certainty" determined by BAYES' law, there is little need to assign subjective "certainty factors" to each rule. Moreover, since the consequences of rule based decisions are subject to subsequent data based confirmation, there is no need to be overly restrictive with respect to the rules.

Since the "restriction" of this set is driven by actual data, rather than "heuristics", the process is both transparent and valid.

Since the system is more transparent, it is easier for the decision maker to control it. The decision maker controls the decision process by deciding which categories to include as case categories and which categories to include among the controls category. Starting from a basic set of potential categories determined, based on the set of indicators initially selected by the decision maker, the decision maker can change the set of indicators and/or edit the list of case categories. The decision maker can also control the system by changing the list of characteristics, discriminators, and assessment variables. Since the decision maker can compare the ranking of the categories returned for different sets of variables chosen in a "sensitivity analysis", the consequences of these choices become immediately apparent.

In previous expert systems, knowledge acquisition was problematic, because it was impracticable to find, agree upon, and enter a workable set of "heuristics". To address this problem, the preferred approach proposes a system where only data is entered, while "knowledge" is generated by using conventional statistical methods, optionally incorporating some of the proposed statistical methodology, albeit from subsets of the database that are restricted to entities with the same characteristics as query entity. Historical data on the entity (including the results of previously performed categorizations) add immediately to the database. Once the categorization is confirmed, this data set can also be added to the database. Based on the increased main data base, the rule base comprising the rule bases mentioned in steps 7 (indicators:categories) and 11 (category:discriminators), above, can then be updated. Thus a key obstacle of previously proposed decision support systems (expert systems) has been overcome.

The identification of such rules can be extremely computationally extensive. To find the "best" sets of discriminators among 100 potential discriminators, for instance, there are 10,000 possible subsets of two and 1,000,000 subsets of three variables, which leads to a long-standing problem in the field. Usually, focus is on those variables which are at least somewhat predictive univariately. For a restricted set of 20 variables, the number of three parameter subsets reduces to $20^3$=8000. Thus, the proposed separation of an ad-hoc data base from the main data base increases the feasibility of the approach. This number is further reduced if some of these variables overlap with the indicators requested by the decision maker, as is to be expected. If three of these symptoms are preselected, the number of three parameter subsets reduces to $17^3$=4900, which is large, though manageable, especially when computationally efficient variants of the method are used that do not require bootstrapping, so that the array of computers otherwise used for bootstrapping may now be used to process many sets of variables in parallel.

Assisted & Interactive Diagnostic Support Embodiment

The preferred embodiment is exemplified in the application for assisted and interactive diagnostic support to a physician in diagnosing a patient. In a traditional diagnostic process until recently, in diagnosing a patient, a physician would carry out a physical examination, collect the patient's disease history, discuss the patient's preferences with regard to pain tolerance, occupation, religious believes, social status, family history, and such like, and view the patient's laboratory results. The physician would then view the available information, sort those deemed relevant information into symptoms and patient characteristics, and compare them with a putative set of potential diseases. Finally, the physician would form an opinion of the most likely diagnoses, and prioritize them by their likelihood in that instance, their likely urgency, the patient's preferences, and the relevant medical facilities' allowance for cost. The therapy would then be decided based on the diagnosis with the highest priority.

Recently, laboratories have begun to assist the physician in making sense of the increasing number of parameters tested (herein subsequently termed "symptoms") by flagging those symptoms that are outside a "normal range", usually given as $x \pm 2 \times SD$ of the published distribution among a "standard" normal population. Clearly, this has not been enough to fully support the physician in diagnosis.

1. Ad-hoc database: Published "standard" populations may not be representative for the particular patient. Thus, a physician clearly would find ranges based on an "ad hoc" population with characteristics similar to the characteristics of this patient more informative.
2. Multivariate data: Looking at individual parameters may not be sufficient to determine how indicative the clinical "picture" is for a specific disease. Thus, a physician would like to comprehensively assess the multivariate distribution of several parameters.
3. Ordinal variables: Most biological variables are merely ordinal, i.e. the relationship between the differences in measurement and differences in clinical relevance are not known. Thus, mean (x) and standard deviation (SD) may have no simple interpretation so that a physician would clearly rather have ranges be determined based on the actual shape of each parameter's empirical distribution in the particular population.
4. Pattern: While symptoms can usually be assumed to have the same orientation as the underlying latent factor "disease severity", patient characteristics can usually not be assumed to have a common orientation. Thus, the physician would need specific methods to deal with "pattern" of non-oriented variables.
5. Sensitivity/specificity: A large deviation of a symptom from the normal (specificity) is not necessarily indicative of a disease, and even if it should be, it does not necessarily hint to a specific disease. Thus, the physician clearly would like to know for which disease(s) the patient's variables are likely.
6. Control: A data base driven system for diagnostic support will never be able to fully automate the decision process. Thus, the physician must be able to control the system.
7. Transparency: To be able to trust the systems decisions and to exert control, the physician must understand he underlying principle.
8. Availability: Of course, for the system to be useful, results must be presented in a timely fashion. This requires (a) that algorithms are employed that are sufficiently efficient and (b) that the physician can interact with the system from the bedside or from his office.

9. Expandability: One of the most daunting problems with expert systems in the past has been knowledge acquisition. For the proposed system to be useful, it must provide efficient means for knowledge acquisition.

Ideally, a physician would select the symptoms judged most relevant for the particular patient and compare them not only to normal individuals, but also to cases known to have different diseases. From the patient's score with respect to a comparable controls (healthy individuals), giving a specificity index, and from the patient's score with respect to comparable cases (patients known to have one of several disease), giving a list of sensitivity indices, the physician would be provided an objective decision criterion.

Thus, an approach in which such information relevant to a particular patient could be made available to a physician to assist in diagnosis for the patient would be highly desirable. It would be even more desirable if the physician could interact with the database, especially if a portable technology such as a Palm Pilot™, or the like, provide such a capability at the patient's bedside or at a doctor's office. The description hereinafter illustrate the way in which the inventive method is used to achieve this embodiment.

Given the desire for diagnostic support, it is not surprising that many of the first "expert systems" developed in the late 1970s and early 1980s aimed at assisting medical diagnoses: MYCIN for bacterial infections, PUFF for lung function tests, INTERNIST and CADUCEUS for internal medicine, CASNET and GLAUCOMA for glaucoma. These systems tried to rely on "knowledge" stored in form of "heuristics", such as IF <symptom> THEN <disease> WITH <certainty factor>.

These heuristics were then iteratively combined using BAYES' theorem. None of these systems, however, has gained widespread acceptance, primarily because they merely tried to mimic the human decision process, rather than striving at overcoming its shortcomings by utilizing advances in technology to go beyond the "heuristic" nature of human decision making. In the first place, the iterative use of BAYES' theorem lacks transparency (problem 7). Moreover, it turned out to be difficult to acquire a sufficiently large set of rules and to have different "experts" agree on the "certainty factors" (problem 9, expandability).

The preferred embodiment differs from this approach fundamentally, in that the decision process is not driven by a set of "heuristics", describing the experience accumulated by some physicians with patients of different characteristics presenting with various symptoms and later confirmed as having a specific disease. Instead, individual records of characteristics, symptoms, and confirmed disease are entered directly into a data base and the relevant rules are created "ad hoc" by accumulating evidence from relevant records. Thus, subjective historical "certainty factor" are replaced by objective empirical "sensitivity", guaranteeing both transparency and accountability.

In a first step, the invention addresses problem 1 by providing a mechanism for assembling an ad-hoc database, by which ad-hoc reference subjects are selected from a larger database of reference subjects, so that the ad-hoc reference subjects are similar to the patient with respect to a set of characteristics determined by the physician. Since these characteristics need to be considered in a comprehensive fashion (problem 2), the invention provides for methods that can handle multivariate data. Because the majority of these characteristics are expected to be ordinal variables (problem 3), conventional statistical methods based on the linear model would require external validation. To overcome this problem, the invention provides an intrinsically valid statistical method to rank subjects in the reference population with respect to several ordinal characteristics. Moreover, because patient characteristics are not necessarily related to a common latent factor, the invention provides a variant of such methods that allow for patients to be ranked according to the distance of their pattern of characteristics from the characteristics of the test patient. Finally, because the main data base is potentially large and the requirements regarding accuracy are lower when selecting "similar" reference patients than, for instance, when positioning a patient within these reference patients, the invention provides an approximate variant of such method with guaranteed availability (problem 8).

In a second step, the invention addresses problem 3 by providing a mechanism to determine "normal ranges" for (ordinal variables). Assuming that the main data base consists of healthy individuals only, conventional statistical methods could then be used to determine the specificity of the patients outcome for each symptom.

Clearly, when assembling data for a reference data base, not all individuals will be "healthy" in every regard. It would be difficult, for instance, to find elderly individuals, who have neither cardiovascular disease, rheumatic disease, diabetes, nor depression. Thus, elderly patients with diabetes might still be considered as "controls" for elderly patients with depression, and vice versa. Thus, it would be desirable, even necessary, to allow the physician to describe the meaning of "healthy" (when aiming at a diagnosis for a particular patient) more precisely. If one acknowledges that many of the records in the main data base represent individuals with some sort of disease, however, one can use the same data base to address problem 5 (sensitivity). The preferred embodiment provides a mechanism by which the physician selects the diseases to be considered as case categories, and the diseases to be allowed into the control category (the specifics of which are described below). The preferred embodiment then provides a mechanism, by which for each disease category, and for the union of categories of "healthy" subjects, reference subjects are selected from the ad-hoc data base of subjects similar to the patient, the mechanism comprising conventional selection based on the subjects confirmed disease.

Clearly, for different symptoms, different sets of diseases need to be considered. Thus, the invention provides a mechanism by which deterministic "rules" (without the need to employ certainty factors) are used:

"IF <symptom> THEN CONSIDER <disease>".

As these rules are not applied iteratively, no "certainty factors" need to be assigned and, consequently, the process is both transparent and objective. Initially, such rules can be based on textbook knowledge. As the main data base grows, however, the system itself will be able to update these rules, including adding new rules. The process by which the system is able to perform this task is described below. Finally, the invention provides a mechanism by which the physician can exert modify the list of symptoms to be used, either globally or for specific diseases.

Once the patient- and the disease-specific ad hoc reference populations have been selected, each patient is compared both with the patient-specific population of controls (specificity) and with patient-/disease-specific cases (sensitivity). For this purpose, conventional statistical methods for univariate ordinal data could be used, as long as symptoms are analyzed individually.

Clearly, however, looking at one symptom at a time is not sufficient (see problem 2). Moreover, when dealing with multivariate data where at least some variables are ordinal, looking at one population (either cases or controls) at a time does not utilize all relevant information available. To resolve this problem (5), the preferred embodiment provides a mechanism, by which, for each disease, information from both the disease-specific and the healthy ad-hoc reference population are combined when determining the position of the patient among the disease population (sensitivity) and among the "healthy" population (specificity), the mechanism being essentially same as for selecting the patients, except that a larger data set is used for determining the order within each population that for the relative position of the test patient, and that the common orientation of the symptoms with disease severity allows for a level metric to be employed. Finally, because the ad-hoc reference populations are relatively small and the requirements regarding accuracy are higher when positioning a patient within these reference patients, than when selecting these reference populations in the first place, the invention provides a variant of such method with maximal validity. Finally, the invention provides a mechanism by which computational efficiency can be increased through bootstrapping, potentially using arrays of computers for parallel processing.

Clearly, for different diseases, different subsets of symptoms need to be used. In fact, using irrelevant symptoms, which may not have the same orientation with disease severity as the relevant symptoms, may be counterproductive. For this purpose, the invention provides a mechanism by which deterministic "rules" (without the need to employ certainty factors) are used:

"IF <disease> THEN USE <symptoms>".

As these rules are not applied iteratively, no "certainty factors" need to be assigned and, consequently, the process is both transparent and objective. Initially, such rules can be based on textbook knowledge. As the main data base grows, however, the system itself will be able to update these rules, including adding new rules. The process by which the system is able to perform this task is described below. Finally, the invention provides a mechanism by which the physician can exert modify the list of diseases to be used, either globally or for specific ad-hoc populations.

Once sensitivity and specificity for each disease category have been determined, the diseases can be prioritized. The invention provides for the physician to enter the consequences of type-I errors (false positive decisions) and type-II errors (false negative decisions) for each disease, so that the final prioritizing of the diseases can reflect urgency of treatment, the patient's preferences, and cost can also be reflected together with sensitivity and specificity as obtained from the data base, mechanism being based on the intrinsically valid method for multivariate ordinal data with augmentation for cost.

The preferred application of the subject statistical method to multivariate ordinal data is not restricted to the context of diagnostic support. It is potentially very useful for the analysis of genetic and genomic data of all kinds, currently proposed methods for which are either based on the linear model or on models for categorical (nominal) data.

While preferred embodiments of the invention have been shown and described, it will be clear to those skilled in the art that various changes and modifications can be made without departing from the invention in its broader aspects as set forth in the claims provided hereinafter.

The following non-limiting examples illustrate various applications of the invention.

EXAMPLE 1

Ranking Countries by Gold, Silver, and Bronze Medals

In order to illustrate the general applicability of the invention we provide an evaluation of computing UStat scores for data with arbitrary partial orderings for a reanalyzation of the medal counts from the 2002 Winter Olympics in Salt Lake City.

A total of n=25 countries $C_i$ won at least one medal at the 2002 Winter Olympics. Let $g_i$, $s_i$, and $b_i$ denote the number of gold, silver, and bronze medals won by country $C_i$. Four different linear model weighting schemes are commonly used to rank countries.

| | |
|---|---|
| Identical: | $IScr = g + s + b$ |
| Linear: | $LScr = 3g + 2s + 1b$ |
| Exponential: | $EScr = 2^2 g + 2^1 s + 2^0 b$ |
| Hierarchical: | $HScr = \lceil max_i b_i \rceil \lceil max_i s_i \rceil g + \lceil max_i b_i \rceil s + b$ | where a ceiling $\lceil x \rceil$ is any integer larger than x. Since no country had more than 100 medals in any category, 100 can be used as the ceiling for both bronze and silver medals.

Table 1 gives the medal counts and the different rankings for three commonly used weighting schemes (uniform, linear, exponential, hierarchical) based on the linear model.

Note that there are only three countries where the rankings based on the four different linear models agree, and these countries are Germany, Slovenia, and Belarus.

TABLE 1

Medals won at the 2002 winter olympics in Salt Lake City by country with scores and ranks for different linear model weighting schemes.

| Country | G | S | B | IScr | IRg | LScr | LRg | EScr | ERg | HScr | HRg |
|---|---|---|---|---|---|---|---|---|---|---|---|
| Germany | 12 | 16 | 7 | 35 | 1.0 | 75 | 1.0 | 87 | 1.0 | 121607 | 1.0 |
| Norway | 11 | 7 | 6 | 24 | 3.0 | 53 | 3.0 | 64 | 3.0 | 110706 | 2.0 |
| U.S.A. | 10 | 13 | 11 | 34 | 2.0 | 67 | 2.0 | 77 | 2.0 | 101311 | 3.0 |
| Canada | 6 | 3 | 8 | 17 | 4.0 | 32 | 5.0 | 38 | 5.0 | 60308 | 5.0 |
| Russia | 6 | 6 | 4 | 16 | 5.5 | 34 | 4.0 | 40 | 4.0 | 60604 | 4.0 |
| Italy | 4 | 4 | 4 | 12 | 7.0 | 24 | 7.0 | 28 | 6.5 | 40404 | 7.0 |
| France | 4 | 5 | 2 | 11 | 8.5 | 24 | 7.0 | 28 | 6.5 | 40502 | 6.0 |
| Austria | 2 | 4 | 10 | 16 | 5.5 | 24 | 7.0 | 26 | 8.0 | 20410 | 12.0 |
| Switzerland | 3 | 2 | 6 | 11 | 8.5 | 19 | 9.5 | 22 | 9.5 | 30206 | 10.0 |
| Netherlands | 3 | 5 | 0 | 8 | 10.5 | 19 | 9.5 | 22 | 9.5 | 30500 | 9.0 |
| Finland | 4 | 2 | 1 | 7 | 12.0 | 17 | 11.0 | 21 | 11.0 | 40201 | 8.0 |
| China | 2 | 2 | 4 | 8 | 10.5 | 14 | 12.0 | 16 | 12.0 | 20204 | 13.0 |
| Croatia | 3 | 1 | 0 | 4 | 14.5 | 11 | 13.0 | 14 | 13.0 | 30100 | 11.0 |
| Korea | 2 | 2 | 0 | 4 | 14.5 | 10 | 14.0 | 12 | 14.0 | 20200 | 14.0 |
| Estonia | 1 | 1 | 1 | 3 | 17.0 | 6 | 17.0 | 7 | 18.0 | 10101 | 17.0 |
| Sweden | 0 | 2 | 4 | 6 | 13.0 | 8 | 15.0 | 8 | 16.0 | 204 | 20.0 |
| Australia | 2 | 0 | 0 | 2 | 21.0 | 6 | 17.0 | 8 | 16.0 | 20000 | 15.5 |
| Spain | 2 | 0 | 0 | 2 | 21.0 | 6 | 17.0 | 8 | 16.0 | 20000 | 15.5 |
| Great Britain | 1 | 0 | 2 | 3 | 17.0 | 5 | 19.0 | 6 | 19.0 | 10002 | 18.0 |
| Bulgaria | 0 | 1 | 2 | 3 | 17.0 | 4 | 20.5 | 4 | 21.0 | 102 | 21.0 |
| Czech Rep. | 1 | 0 | 1 | 2 | 21.0 | 4 | 20.5 | 5 | 20.0 | 10001 | 19.0 |
| Poland | 0 | 1 | 1 | 2 | 21.0 | 3 | 22.5 | 3 | 22.5 | 101 | 22.5 |
| Japan | 0 | 1 | 1 | 2 | 21.0 | 3 | 22.5 | 3 | 22.5 | 101 | 22.5 |
| Slovenia | 0 | 0 | 1 | 1 | 24.5 | 1 | 24.5 | 1 | 24.5 | 1 | 24.5 |
| Belarus | 0 | 0 | 1 | 1 | 24.5 | 1 | 24.5 | 1 | 24.5 | 1 | 24.5 |

Column Headings:
G/S/B: Number of gold, silver, and bronze medals, respectively.
IScr/IRg: Scores and ranks for identical (1:1:1) weighting.
LScr/LRg: Scores and ranks for linear (3:2:1) weighting.
EScr/ERg: Scores and ranks for exponential (4:2:1) weighting.
HScr/HRg: Scores and ranks for hierarchical (10000:100:1) weighting.

The UStat method differs from methods based on the linear model in that it does not require specific weights to be assigned to the different medal categories. Instead, a partial ordering can be defined that reflects the specific circumstances. Here, it is reasonable to assume that gold medals are more valuable than silver medals and that silver medals are more valuable than bronze medals, although the relative value of the medals cannot be reasonably specified. Thus, one can describe the success of a county by three derived variables, the total number of medals ($\geq B$), the total number of silver and gold medals ($\geq S$), and the total number of gold medals (G). Countries can then be partially ordered as follows. Country $C_i$ is considered more successful than county $C_{i'}$, if it has at least as many medals in each of the categories "G", "$\geq S$", and "$\geq B$" and more medals in at least one of these categories.

$$\begin{aligned} &C_i >_{medals} C_{i'} \\ &\Leftrightarrow \\ &(g_i, s_i, b_i) >_{medals} (g_{i'}, s_{i'}, b_{i'}) \end{aligned} \Leftrightarrow \begin{cases} [\{g_i + s_i + b_i \geq g_{i'} + s_{i'} + b_{i'}\} \wedge \{g_i + s_i \geq g_{i'} + s_{i'}\} \wedge \{g_i \geq g_{i'}\}] \\ \wedge \\ [\{g_i + s_i + b_i > g_{i'} + s_{i'} + b_{i'}\} \vee \{g_i + s_i > g_{i'} + s_{i'}\} \vee \{g_i \geq g_{i'}\}] \end{cases}$$

This ordering is only "partial", because there may exist pairs of countries that cannot be ordered. Austria and Switzerland, for instance, cannot be ordered. The (mid) rankings URg based on the u statistic scores UScr for the data in Table 1 are given in Table 2.

TABLE 2

Ranking of Countries based on UStat based on the data in Table 1.

| Country | G | ≥S | ≥B | G N U C R I F AS NF C C KE S AS G B C P J S B | #< | #> | UScr | URg |
|---|---|---|---|---|---|---|---|---|
| Germany | 1 | 28 | 35 | | 24 | 0 | 12.0 | 1.0 |
| Norway | 1 | 18 | 24 | | 22 | 1 | 10.5 | 2.5 |
| U.S.A. | 1 | 23 | 34 | | 22 | 1 | 10.5 | 2.5 |
| Canada | | 9 | 17 | | 20 | 3 | 8.5 | 4.5 |
| Russia | | 12 | 16 | | 20 | 3 | 8.5 | 4.5 |
| Italy | | 8 | 12 | | 17 | 5 | 6.0 | 6.5 |
| France | | 9 | 11 | | 17 | 5 | 6.0 | 6.5 |
| Austria | | 6 | 16 | | 13 | 5 | 4.0 | 8.0 |
| Switzerland | | 5 | 11 | | 14 | 7 | 3.5 | 9.5 |
| Netherlands | | 8 | 8 | | 14 | 7 | 3.5 | 9.5 |
| Finland | | 6 | 7 | | 13 | 7 | 3.0 | 11.0 |
| China | | 4 | 8 | | 12 | 10 | 1.0 | 12.0 |
| Croatia | | 4 | 4 | | 11 | 10 | 0.5 | 13.0 |
| Korea | | 4 | 4 | | 10 | 13 | -1.5 | 14.0 |
| Estonia | | 2 | 3 | | 7 | 14 | -3.5 | 15.5 |
| Sweden | | 2 | 6 | | 5 | 12 | -3.5 | 15.5 |
| Australia | | 2 | 2 | | 5 | 14 | -4.5 | 18.0 |
| Spain | | 2 | 2 | | 5 | 14 | -4.5 | 18.0 |
| Great Britain | | 1 | 3 | | 6 | 15 | -4.5 | 18.0 |
| Bulgaria | | 1 | 3 | | 4 | 17 | -6.5 | 20.0 |
| Czech Rep. | | 1 | 2 | | 4 | 18 | -7.0 | 21.0 |
| Poland | | 1 | 2 | | 2 | 21 | -9.5 | 22.5 |
| Japan | | 1 | 2 | | 2 | 21 | -9.5 | 22.5 |
| Slovenia | | 0 | 1 | | 0 | 23 | -11.5 | 24.5 |
| Belarus | | 0 | 1 | | 0 | 23 | -11.5 | 24.5 |

Column Headings:

G/≧S/≧B: Number of gold, gold or silver, and total medals, respectively.
G/N/U/ . . . : Matrix of pairwise orderings.
</#>: Number of less/more successful countries.
UScr/URg: Scores and ranks by U statistics.

Figure 6:
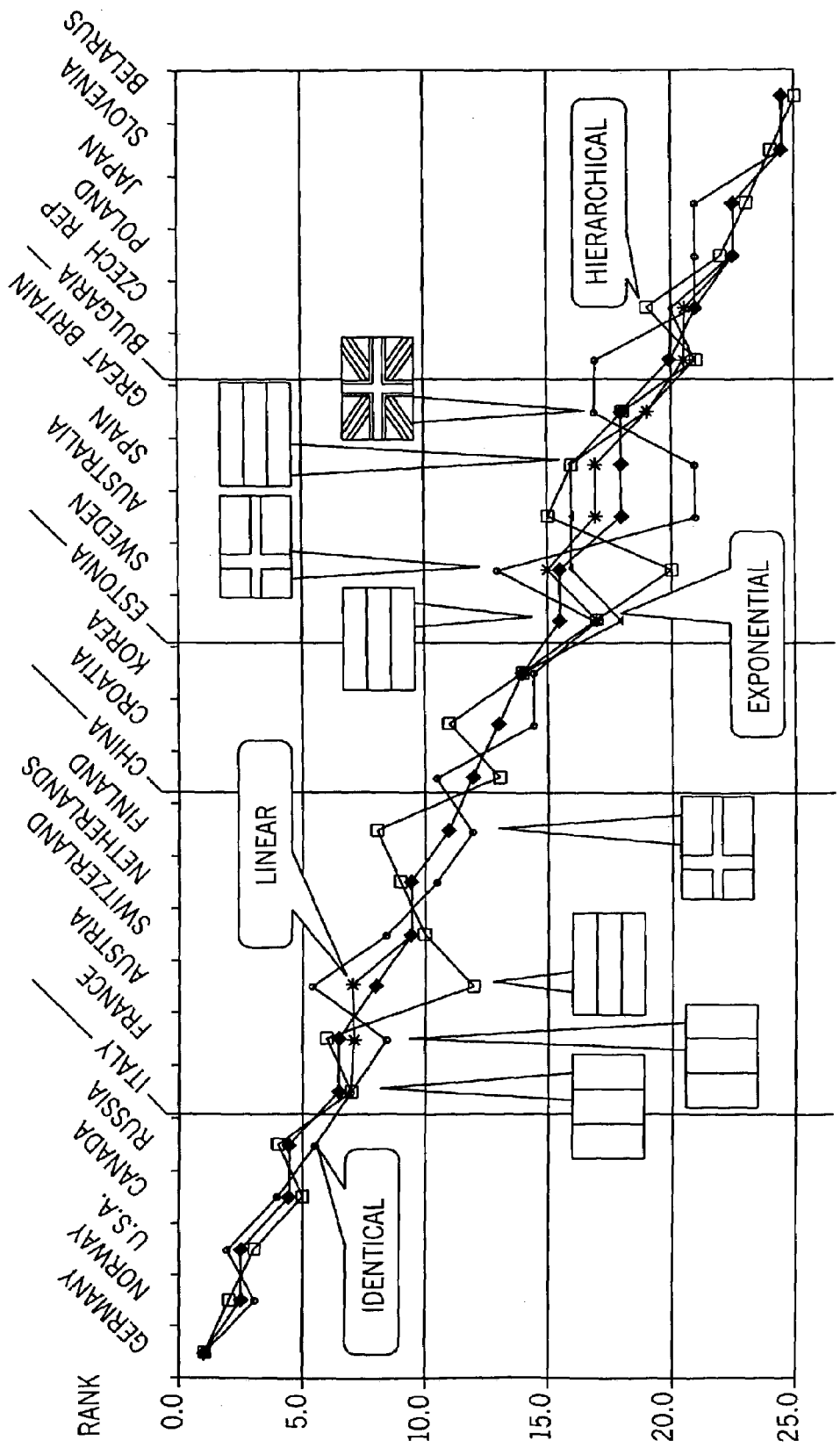
FIG. 6 shows a comparison of the four rankings of countries by medal profiles based on the linear model (Table 1) with the ranking based on UStat scores (Table 2)

From Table 2, ties (countries having the same rank) can be classified into two categories. Australia and Spain form "exact" ties, because they have the same pairwise orderings with respect to all other countries. Great Britain, however, though having the same score, can be ordered with respect to Bulgaria and Estonia, while Australia and Spain cannot. FIG. 6 shows how the different scoring methods affect the ranking of the countries. Austria and Finland, for instance, are ranked 6:12 with identical weighting or 12:8 with hierarchical weighting.

While both UStat and MrgL scores are valid, MrgL scores utilize more information than UStat scores. Therefore, it would be desirable to compute MrgL scores instead. Computation of MrgL scores, however, is computationally intensive. 25 ranks, for instance, can be arranged in 25!=1×2× 3×4× . . . ×25=15 511 210 043 331 000 000 000 000 permutations. Even with testing 1 000 000 permutations per second, this would require 500 billion years.

The u statistics results provided in Table 2 can be utilized to reduce the computational complexity through both factorization and pruning. Norway/U.S., Canada/Russia, Switzerland/Netherlands, Austria/Spain, Poland/Japan, and Slovenia/Belarus, for instance, are tied. In addition, UStat results can be used for pruning, i.e., the range of ranks to be considered can be restricted a priori. The lowest rank to be considered for country C can be determined by means of u statistics as $$RL = \Sigma_i I\{(g_i, s_i, b_i) <_{medals} (g,s,b)\} + 1$$

while the highest rank can be determined as $$RH = n - \Sigma_i I\{(g_i, s_i, b_i) >_{medals} (g,s,b)\}$$

where the partial ordering is defined as described above. Factorization and pruning reduces the number of rank permutations to be considered from $1.55 \times 10^{25}$ to $1 \times \ldots \times 1 \times 2 \times 2 \times 7 \times 3 \times \ldots \times 4 \times 3 \times 1 \times \ldots \times 1 = 1\ 161\ 216\ 000$ (see column #R of Table 3). The MrgL scores are given in column MScr of Table 3.

Figure 7:
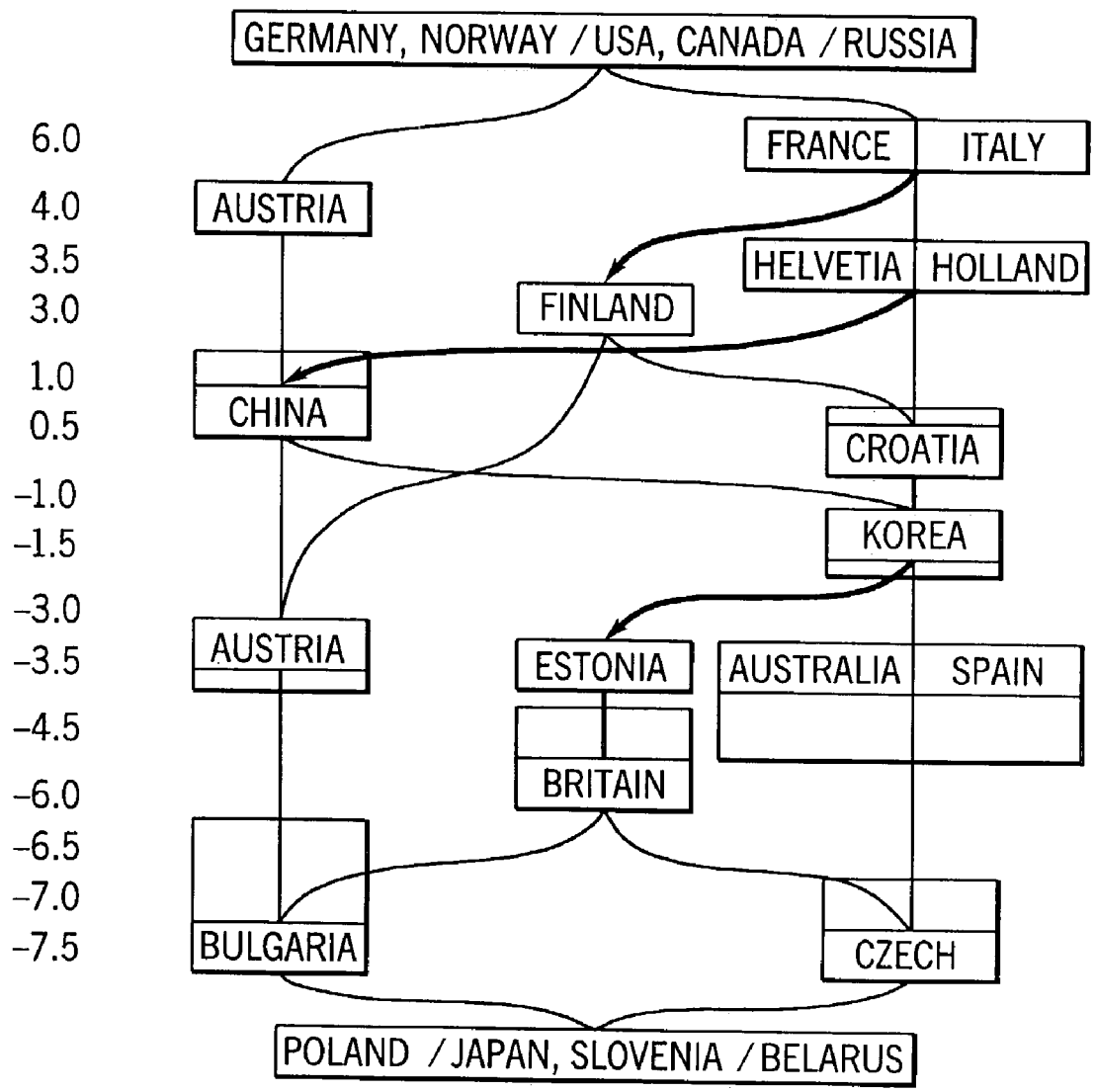
FIG. 7 shows the lattice structure of countries by Salt Lake City medal profiles, UStat scores (dark) vs MrgL scores (light) for the data as in FIG. 6 (see text for explanations).

The UStat and MrgL rankings are similar, as is to be expected. Further in the manner that UStat and MrgL scores are constructed, the lattice structures (FIG. 7) are topologically equivalent, i.e., the nodes, the edges, and their direction are the same. In particular, the same pairs of countries are considered exact ties (Norway/USA, Canada/Russia, Italy/France, Switzerland/Netherlands, Australia/Spain, Poland/Japan, Slovenia/Belarus) and, thus, given identical ranks. Under the different linear models, however, the rank ratio for countries within an exact tie may differ. In the above example, the Switzerland:Netherlands rank ratio ranges from 8.5:10.5 to 10:9. Inexact ties, however, may be affected. Replacing UStat scores by MrgL scores gives Sweden an advantage over Estonia, while eliminating the difference between Bulgaria and Czech.

TABLE 3

Ranking of Countries based on MrgL scores based on the data in Table 1 and the u statistic results in Table 2.

| Country | #> | #< | RL | RH | FB | #R | MScr | MRg |
|---|---|---|---|---|---|---|---|---|
| Germany | 0 | 24 | 1 | 1 | | 1 | 12.00 | 1.0 |
| Norway | 1 | 22 | 2 | 3 | -1 | 1 | 10.50 | 2.5 |
| U.S.A | 1 | 22 | 2 | 3 | -1 | 1 | 10.50 | 2.5 |
| Canada | 3 | 20 | 4 | 5 | -1 | 1 | 8.50 | 4.5 |
| Russia | 3 | 20 | 4 | 5 | -1 | 1 | 8.50 | 4.5 |
| Italy | 5 | 17 | 6 | 8 | -1 | 2 | 6.26 | 6.5 |
| France | 5 | 17 | 6 | 8 | -1 | 2 | 6.26 | 6.5 |
| Austria | 5 | 13 | 6 | 12 | | 7 | 4.34 | 8.0 |
| Switzerland | 7 | 14 | 8 | 11 | -1 | 3 | 3.43 | 9.5 |
| Netherlands | 7 | 14 | 8 | 11 | -1 | 3 | 3.43 | 9.5 |
| Finland | 7 | 13 | 8 | 12 | | 5 | 3.09 | 11.0 |
| China | 10 | 12 | 11 | 13 | | 3 | 0.68 | 12.0 |
| Croatia | 10 | 11 | 11 | 14 | | 4 | 0.42 | 13.0 |
| Korea | 13 | 10 | 14 | 15 | | 2 | -1.23 | 14.0 |
| Estonia | 14 | 7 | 15 | 18 | | 4 | -3.54 | 17.0 |
| Sweden | 12 | 5 | 13 | 20 | | 8 | -3.22 | 15.0 |
| Australia | 14 | 5 | 15 | 20 | -1 | 5 | -3.54 | 17.0 |
| Spain | 14 | 5 | 15 | 20 | -1 | 5 | -3.54 | 17.0 |
| Great Britain | 15 | 6 | 16 | 19 | | 4 | -5.85 | 19.0 |
| Bulgaria | 17 | 4 | 18 | 21 | | 4 | -7.50 | 20.5 |
| Czech Rep. | 18 | 4 | 19 | 21 | | 3 | -7.50 | 20.5 |
| Poland | 21 | 2 | 22 | 23 | -1 | 1 | -9.50 | 22.5 |
| Japan | 21 | 2 | 22 | 23 | -1 | 1 | -9.50 | 22.5 |
| Slovenia | 23 | 0 | 24 | 25 | -1 | 1 | -11.50 | 24.5 |
| Belarus | 23 | 0 | 24 | 25 | -1 | 1 | -11.50 | 24.5 |

Column Headings (see also Table 2):

UL/UH: Lowest (highest possible rank based on r statistics)
FB: Factorization benefit.
R: Number of ranks to be considered
UScr/URg: Scores and ranks by U statistics.

The reason for MrgL scores to differ from UStat scores can be explained by comparing Bulgaria and the Czech republic. Bulgaria has only one country (Sweden) as an exclusive member among the more successful countries, while the Czech Republic has two (Australia and Spain). Therefore, Bulgaria ranks higher in UStat scores. MrgL scores also account for the relative contribution of the common more successful countries. While Britain and Estonia contribute evenly, the majority of the other countries contributes more to Bulgaria than to the Czech Republic due to the unbalanced structure of the lattice, as indicated by the bold edges in FIG. 7.

EXAMPLE 2

Quantitative Trait Loci for Atherosclerosis Susceptibility in Apolipoprotein E-Deficient Mice ApoE-deficient mice on 6 inbred genetic backgrounds were compared for atherosclerosis lesion size in the aortic root in two independent studies. Data was normalized to to the C57BL/6 strain, which was used in both studies. A mouse SNP database was then used to correlate lesion size with SNP pattern on chromosome 1, where atherosclerosis QTL had been previously identified through analyses of an $F_2$ cohort derived from apoE-deficient mice on the C57BL/6 and FVB/N strains. The in silice QTL are candidates for further study to confirm the presence of, and identify, atherosclerosis susceptibility genes.

Coronary heart disease (CHD) is the most common cause of death in the United States. Most cases of CHD can be attributed to or associated with atherosclerosis, a complex disease often initiated by hypercholesterolemia involving both environmental and genetic factors. Large epidemiological studies have shown that approximately half of those who develop CHD have only moderate total plasma cholesterol levels of <250 mg/dl. Thus, elucidating genetic risk factors involved in atherosclerosis susceptibility could lead to better therapeutic intervention for those most likely to develop atherosclerosis who do not have obvious plasma lipid risk factors.

Mouse models have emerged as one of the most useful tools for experimental atherosclerosis research. Mice made deficient in apoE by gene targeting have elevated plasma cholesterol levels and spontaneously develop severe atherosclerosis on low-fat chow diets. These lesions are similar in many aspects to human lesions and are thus are a valuable paradigm for studying atherosclerosis in humans. ApoE-deficient mice on the C57BL/6 background have lesions ~8-fold larger than apoE-deficient mice on the FVB/N background, with intermediate levels in $F_1$ hybrids, and a broad distribution overlapping both parental strain values in the $F_2$ generation. Atherosclerosis susceptibility loci have been previously described in wildtype mice using high-cholesterol cholic acid-containing diets to induce lesions. Ath1, initially described using two sets of recombinant inbred (RI) strains derived from the atherosclerosis susceptible C57BL/6 and atherosclerosis resistant C3H strains, and the C57BL/6 and BALB/c strains, maps to chromosome 1.

A computational approach, termed "in silico" QTL mapping, has recently been proposed to accelerate the mapping of atherosclerosis susceptibility genes. We have modified this method to eliminate some inconsistencies and then compared this improved method based on the linear model to a novel approach based on a more general theory of for multivariate ordinal data. Genetic differences along the mouse genome between strains based on a SNP database were correlated to phenotypic differences, allowing us to identify chromosomal regions that may contain atherosclerosis susceptibility genes.

ApoE-deficient mice created at Rockefeller University (RU) using J1 129/SV-ter embryonic stem cells were bred back 10 generations onto the DBA/2J (DBA), and AKR/J (AKR) backgrounds at RU. ApoE-deficient mice bred 10 generations onto the C57BL/6 (C57) background were obtained from The Jackson Laboratory (Bar Harbor, Me.). At Millennium Pharmaceuticals Incorporated (MPI), the RU mice were maintained on an inbred 129/SV-ter (129) background, and subsequently bred onto the C57BL/6 (C57), BALB/cByJ (BLB), and C3H/HeJ (C3H) backgrounds method. All strains of mice were assayed using polymorphic markers at ~10 cM intervals, and found to be >99% inbred.

Two atherosclerosis studies were performed, one at RU and one at MPI. Lesions in the aortic root were quantified in male and female mice from each of the strains. The RU study was performed with 16 week old apoE-deficient mice on the C57, DBA, and AKR strains maintained on a semi-synthetic diet containing 4.5% fat and 0.02% cholesterol (w:w). The MPI study was performed with 20 week old apoE deficient mice on the C57, 129, BALB, and C3H strains maintained on a breeder chow diet containing 9% fat. A wide distribution of lesion areas sizes among the strains implied significant genetic differences among the strains with respect to atherosclerosis susceptibility.

To be able to combine data from the two studies, mean log lesion areas from each study were age standardized and normalized to the common C57 strain. From each strain, three representative observations were used for analysis: mean−SD, mean, and mean+SD of the log lesion area.

TABLE 4

Representative lesion area sizes after standardization

| DBA | C57 | 129 | AKR | BLB | C3H |
|-----|-----|-----|-----|-----|-----|
| 306 | 146 | 90  | 32  | 24  | 19  |
| 237 | 84  | 27  | 18  | 13  | 6   |
| 183 | 53  | 8   | 10  | 7   | 2   |

Inbred strains are always homozygous at all marker loci. Marker loci were considered informative, if (a) the marker was available for all six strains, (b) the markers were not all identical, and (c) the marker pattern was not the same as on both of the adjacent loci. Of the 237 markers available on chromosome 1, 49 were informative.

TABLE 5

Alleles at the first 21 informative marker loci on chromosome 1 by strain.

| Mrk# | 2 | 14 | 18 | 25 | 27 | 55 | 57 | 59 | 74 | 77 | 84 | 86 | 107 | 108 | 121 | 122 | 123 | 125 | 126 | 132 | 136 |
|------|---|----|----|----|----|----|----|----|----|----|----|----|----|----|----|----|----|----|----|----|----|
| cM   | 4.4 | 5.5 | 8.7 | 15.3 | 17.5 | 25.1 | 25.1 | 25.1 | 31.7 | 32.8 | 33.9 | 34.2 | 37.2 | 38.4 | 49.2 | 49.2 | 49.2 | 51.4 | 51.4 | 54.6 | 57.9 |
| DBA  | t | c | t | g | g | g | c | t | g | g | c | c | t | t | c | c | a | g | g | g | g |
| C57  | c | t | c | t | g | g | t | t | g | t | a | t | t | t | c | c | a | g | g | g | g |
| 129  | c | t | t | t | g | g | c | c | g | g | c | c | c | t | g | c | g | a | c | g | g |
| AKR  | c | t | t | t | t | c | c | t | a | g | c | c | t | a | c | a | a | a | c | g | g |
| BLB  | c | t | t | g | g | g | t | c | a | t | c | t | t | t | c | a | a | a | c | g | g |
| C3H  | c | t | t | t | g | g | c | t | g | g | c | c | c | a | g | c | g | g | c | a | a |

To identify chromosomal regions that may contain atherosclerosis susceptibility genes, we correlated genetic differences to phenotypic differences by two statistical methods.

The first method is a variant of the recently proposed "in silico" method. This method requires counting strain-pair allele differences for each pair of strains. For six strains (see Table 4), the number of strains pairs is 5+4+3+2+1=14. For the "in silico" method, it was originally proposed to aggregate allele differences within of 30 cM width and move these bins in steps of 10 cM across the genome. For better comparability with the method proposed below, we propose a modification, where bins of n markers (n=1 . . . 10) are moved in single marker steps. Also, we compute the correlation coefficient not on the difference in lesion sizes but on the rank of the ratios (see Table 6).

TABLE 6

Computation of "in silico" correlation (standardized as (r + 1)/2) between phenotypic differences (rank of ratios, column PRg) and genotypic differences (markers 2–121) for bins of 1–10 adjacent informative markers.

| Mrk# | PRg | 2 | 14 | 18 | 25 | 27 | 55 | 57 | 59 | 74 | 77 | 84 | 86 | 107 | 108 | 121 |
|---|---|---|---|---|---|---|---|---|---|---|---|---|---|---|---|---|
| DBA | | t | c | t | g | g | g | c | t | g | g | c | c | t | t | c |
| C57 | | c | t | c | t | g | g | t | t | g | t | a | t | t | t | c |
| 129 | | c | t | t | t | g | g | c | c | g | g | c | c | c | t | g |
| AKR | | c | t | t | t | t | c | c | t | a | g | c | c | t | a | c |
| BLB | | c | t | t | g | g | g | t | c | a | t | c | t | t | t | c |
| C3H | | c | t | t | t | g | g | c | t | g | g | c | c | c | a | g |
| DBA: | | | | | | | | | | | | | | | | |
| C57 | 4 | 1 | 1 | 1 | 1 | 0 | 0 | 1 | 0 | 0 | 1 | 1 | 1 | 0 | 0 | 0 |
| 129 | 8 | 1 | 1 | 0 | 1 | 0 | 0 | 0 | 1 | 0 | 0 | 0 | 0 | 1 | 0 | 1 |
| AKR | 13 | 1 | 1 | 0 | 1 | 1 | 1 | 0 | 0 | 1 | 0 | 0 | 0 | 0 | 1 | 0 |
| BLB | 14 | 1 | 1 | 0 | 0 | 0 | 0 | 1 | 1 | 1 | 1 | 0 | 1 | 0 | 0 | 0 |
| C3H | 15 | 1 | 1 | 0 | 1 | 0 | 0 | 0 | 0 | 0 | 0 | 0 | 0 | 1 | 1 | 1 |
| C57: | | | | | | | | | | | | | | | | |
| 129 | 3 | 0 | 0 | 1 | 0 | 0 | 0 | 1 | 1 | 0 | 1 | 1 | 1 | 1 | 0 | 1 |
| AKR | 7 | 0 | 0 | 1 | 0 | 1 | 1 | 1 | 0 | 1 | 1 | 1 | 1 | 0 | 1 | 0 |
| BLB | 9 | 0 | 0 | 1 | 1 | 0 | 0 | 0 | 1 | 1 | 0 | 1 | 0 | 0 | 0 | 0 |
| C3H | 10 | 0 | 0 | 1 | 0 | 0 | 0 | 1 | 0 | 0 | 1 | 1 | 1 | 1 | 1 | 1 |
| 129: | | | | | | | | | | | | | | | | |
| AKR | 2 | 0 | 0 | 0 | 0 | 1 | 1 | 0 | 1 | 1 | 0 | 0 | 0 | 1 | 1 | 1 |
| BLB | 5 | 0 | 0 | 0 | 1 | 0 | 0 | 1 | 0 | 1 | 1 | 0 | 1 | 1 | 0 | 1 |
| C3H | 6 | 0 | 0 | 0 | 0 | 0 | 0 | 0 | 1 | 0 | 0 | 0 | 0 | 0 | 1 | 0 |
| AKR: | | | | | | | | | | | | | | | | |
| BLB | 11 | 0 | 0 | 0 | 1 | 1 | 1 | 1 | 1 | 0 | 1 | 0 | 1 | 0 | 1 | 0 |
| C3H | 12 | 0 | 0 | 0 | 0 | 1 | 1 | 0 | 0 | 1 | 0 | 0 | 0 | 1 | 0 | 1 |
| BLB | | | | | | | | | | | | | | | | |
| C3H | 1 | 0 | 0 | 0 | 1 | 0 | 0 | 1 | 1 | 1 | 1 | 0 | 1 | 1 | 1 | 1 |
| 1 | | 0.73 | 0.73 | 0.39 | 0.53 | 0.58 | 0.58 | 0.36 | 0.35 | 0.48 | 0.36 | 0.39 | 0.36 | 0.38 | 0.52 | 0.38 |
| 2 | | | 0.73 | 0.59 | 0.44 | 0.59 | 0.58 | 0.45 | 0.28 | 0.38 | 0.39 | 0.35 | 0.35 | 0.31 | 0.42 | 0.42 |
| 3 | | 0.73 | 0.67 | 0.58 | 0.50 | 0.59 | 0.51 | 0.35 | 0.31 | 0.31 | 0.35 | 0.35 | 0.29 | 0.35 | 0.39 | 0.42 |
| 4 | | | 0.67 | 0.65 | 0.63 | 0.54 | 0.52 | 0.43 | 0.38 | 0.30 | 0.28 | 0.34 | 0.30 | 0.31 | 0.34 | 0.39 |
| 5 | | 0.67 | 0.65 | 0.69 | 0.64 | 0.47 | 0.45 | 0.44 | 0.35 | 0.29 | 0.29 | 0.30 | 0.31 | 0.30 | 0.34 | 0.39 |
| 6 | | | 0.65 | 0.69 | 0.70 | 0.57 | 0.39 | 0.45 | 0.40 | 0.32 | 0.30 | 0.27 | 0.31 | 0.30 | 0.30 | 0.34 |
| 7 | | 0.65 | 0.69 | 0.70 | 0.64 | 0.50 | 0.40 | 0.41 | 0.37 | 0.32 | 0.27 | 0.25 | 0.29 | 0.29 | 0.31 | 0.34 |
| 8 | | | 0.69 | 0.70 | 0.64 | 0.59 | 0.49 | 0.37 | 0.37 | 0.35 | 0.28 | 0.27 | 0.23 | 0.30 | 0.29 | 0.31 |
| 9 | | 0.69 | 0.70 | 0.64 | 0.59 | 0.58 | 0.44 | 0.35 | 0.36 | 0.32 | 0.29 | 0.25 | 0.25 | 0.30 | 0.29 | 0.39 |
| 10 | | | 0.70 | 0.64 | 0.59 | 0.58 | 0.52 | 0.41 | 0.35 | 0.32 | 0.33 | 0.27 | 0.26 | 0.26 | 0.30 | 0.36 |

The proposed method, termed in silice, from the ablative of the Latin word for stone, silex, silicis, is based on u statistics. For each bin of width w, one first determines all possible $2^w$ pairs of a putative high risk and a corresponding low risk haplotype. For markers 77–121 (Table 5), for instance, g-a-c-t-t-g and the converse t-c-t-c-a-c are such a pair of putative haplotypes (see FIG. 9).

One then determines how likely the interval between two marker loci is to contain a disease gene under the assumption of co-dominance, i.e., if being homozygous for the high risk allele at a given locus confers a higher risk, although not necessarily a two-fold risk, than being heterozygous. In general, genetic evidence for a disease gene D to be located between markers L and R can only be partially ordered making this an ideal situation for the application for scores based on the ordinal model. For inbred strains, where all markers are homozygous, the partial ordering (FIG. 8b) reduces to a complete ordering (FIG. 8a), so that, without loss of generality, intervals can be scored 1.0, 0.5, and 0.0, respectively. However, even with inbred strains the information content among the different classes of observations differs. Only the observations within the top and bottom node, respectively, form exact ties.

Once marker intervals have been scored, u-statistics can again be used, this time to score the observed haplotypes with respect to the above putative extreme haplotypes, which serves as a reference to define the orientation of the pairwise orderings (see FIG. 9).

FIG. 10 demonstrates how these techniques can be combined to correlated a haplotype to the observed phenotype. For computational simplicity, the alleles of the putative high and low risk haplotype are assigned the values "1" and "0", respectively.

Clearly, if the assignment of the alleles to the putative high and low risk haplotype, respectively, should be true, the highest lesion size strain (DBA) is the only strain having two intervals with high risk alleles at both ends, while the lowest atherosclerosis strain C3H is the only strain having none. On the other hand, intervals with low risk alleles at both ends are only found among the low lesion size strains AKR, BLB, and C3H.

Moving bins of various width across the genome, one marker at a time, scans the genome for areas of interest, i.e., where genes might be located that might have a causal relationship with the phenotype. For the current prototype the implementation was realized in MS Excel using the script displayed in working mainly on the worksheet "current", an excerpt of which is displayed in FIG. 10.

The proposed UStat method suggests the area between 30 and 50 cM as the most promising area for a gene associated with atherosclerosis (see Table 7). The results for the scan of the full chromosome 1 are given in FIG. 11.

method accounts for the orientation of the phenotypic and genotypic differences. This can easily be seen by comparing the intervals 84–86 and 86–107. Clearly, both intervals together provide more evidence for an interaction between phenotype and genotype than each of the intervals alone, which is reflected in a higher ordinal correlation (0.43 vs.

TABLE 7

In silice correlation between phenotype and genotype scores (markers 2–121) for bins of 1–10 adjacent informative markers.

| Mrk# | 2 | 14 | 18 | 25 | 27 | 55 | 57 | 59 | 74 | 77 | 84 | 86 | 107 | 108 | 121 |
|---|---|---|---|---|---|---|---|---|---|---|---|---|---|---|---|
| DBA | t | c | t | g | g | g | c | t | g | g | c | c | t | t | c |
| C57 | c | t | c | t | g | g | t | t | g | t | a | t | t | t | c |
| 129 | c | t | t | t | g | g | c | c | g | g | c | c | c | t | g |
| AKR | c | t | t | t | t | c | c | t | a | g | c | c | t | a | c |
| BLB | c | t | t | g | g | g | t | c | a | t | c | t | t | t | c |
| C3H | c | t | t | t | g | g | c | t | g | g | c | c | c | a | g |
| 1 | 0.65 | 0.65 | 0.33 | 0.27 | 0.16 | 0.16 | 0.02 | 0.25 | 0.36 | 0.02 | 0.33 | 0.02 | 0.41 | 0.52 | 0.41 |
| 2 | | 0.65 | 0.77 | 0.50 | 0.28 | 0.16 | 0.10 | 0.22 | 0.39 | 0.32 | 0.30 | 0.30 | 0.39 | 0.58 | 0.58 |
| 3 | 0.65 | 0.80 | 0.66 | 0.40 | 0.28 | 0.13 | 0.16 | 0.38 | 0.43 | 0.18 | 0.33 | 0.43 | 0.66 | 0.58 | 0.73 |
| 4 | | 0.80 | 0.69 | 0.58 | 0.40 | 0.26 | 0.18 | 0.35 | 0.40 | 0.36 | 0.36 | 0.58 | 0.79 | 0.74 | 0.73 |
| 5 | 0.80 | 0.69 | 0.58 | 0.58 | 0.48 | 0.28 | 0.35 | 0.35 | 0.36 | 0.36 | 0.76 | 0.79 | 0.83 | 0.73 | 0.73 |
| 6 | | 0.69 | 0.58 | 0.58 | 0.63 | 0.55 | 0.62 | 0.35 | 0.35 | 0.36 | 0.80 | 0.82 | 0.83 | 0.79 | 0.73 |
| 7 | 0.69 | 0.58 | 0.58 | 0.63 | 0.66 | 0.62 | 0.75 | 0.35 | 0.35 | 0.75 | 0.81 | 0.82 | 0.79 | 0.79 | 0.67 |
| 8 | | 0.58 | 0.58 | 0.63 | 0.66 | 0.66 | 0.75 | 0.71 | 0.35 | 0.75 | 0.79 | 0.83 | 0.82 | 0.79 | 0.75 |
| 9 | 0.58 | 058 | 0.63 | 0.66 | 0.66 | 0.75 | 0.71 | 0.75 | 0.75 | 0.79 | 0.83 | 0.81 | 0.82 | 0.75 | 0.75 |
| 10 | | 0.58 | 0.63 | 0.66 | 0.66 | 0.75 | 0.71 | 0.75 | 0.75 | 0.79 | 0.83 | 0.79 | 0.81 | 0.76 | 0.75 |

Mining chromosome 1 for genetic factors associated with atherosclerosis indicates several candidate areas. Interestingly, the two statistical methods agree only on two of these areas, one below 10 cM and the other around 55 cM. Two other areas, around 85 and above 110 cM are suggested by the "in silico" linear model method. The in silice ordinal model method indicates the same for areas when restricted to very narrow bins. When one allows for wider bins, the in silice method suggests three other areas, around 35 cM, around 75 cM, and between 90 and 100 cM.

As demonstrated in the detailed analysis of FIG. 10, the area with the highest in silice evidence (~35 cM, #74–#121, r=0.83) clearly is of interest, because of the obvious potential for a straightforward biological interpretation. That the "in silico" method, which is based on the linear model, is overlooking this evidence has two reasons.

First, the "in silico" method is based on the linear model, i.e., on linear combinations of evidence across adjacent markers. Thus, if one sub-region has many known markers in the data base, this sub-region gets more weight than other sub-regions, even if it's relevance for atherosclerosis is low. In particular, the linear model is more likely to be affected by sub-regions not coding for proteins (introns). The above interesting area contains two markers (#77 and #86), where the univariate correlation is extremely low (r=0.02). Thus, the "in silico" method's lack of sensitivity can be explained by introns "diluting" the evidence of the markers #74, #36, and #107 where coding for proteins relevant to atherosclerotic risk may occur. The in silice method is less sensitive to dilution effects. Eliminating the 77–84 interval to the 77–121 range, for instance, would not change the correlation in FIG. 10, because the intervals 77–84 and 84–86 have the same interval scores.

The second reason for the in silice method to be superior to the "in silico" method lies in the fact that only the former 0.30 and 0.39). With the "in silico" method, however, the linear correlation is lower (0.29 vs. 0.35 and 0.31).

Another advantage of the in silice method is, that it not restricted to binary data. Thus, the method can be extended in two ways. First, it can also be used for outbred species in general and humans in particular, because UStat interval scores can be computed in either case (FIG. 8) and because the next step, the computation of UStat haplotype scores, is not restricted to any specific scoring mechanism used for the interval scores.

In fact, the second (multivariate) scoring algorithm is not restricted to haplotypes, but can be applied to other data as well. In particular, one can replace the interval scores by micro-array expression levels. Thus the same algorithm and, in fact, the same program can be used to mine microarray data. If a biological hypothesis suggests that specific genes should be involved, the multivariate scoring mechanism generates pathway scores from gene expression data, instead of haplotype scores from interval u scores. If a more general question is asked, it generates epistatic interaction scores that allow to generate hypothesis about pathways through multivariate screening of microarray data.

EXAMPLE 3

Identifying Genetic Risk Factors for Relapse

Even after successful treatment, relapse is a problem with many diseases. In our studies with melanoma patients (see EXAMPLE 4), for instance, some patients had a lasting clinical response, while others relaped even though their response seemed initially favorable. The genetic risk factors predisposing patients for recurrence are unknown.

Among a population of 800 patients who initially responded favorably to initial treatment, almost 50% developed a recidiv. About 80 genetic markers were informative and evaluated to identify locations for genes that might be involved in putting patients at risk for a recidiv. For each of the loci with genetic variation, one allele was randomly called as "A" and the other as "B". Patients homozygous for one of allele were then coded as "1", heterozygous patients as "2", and patients homozygous for the other allele as "3".

The data is displayed in FIG. 12.

First a traditional analysis based on the linear model was performed. The arithmetic average of the codes "1", "2", and "3" was computed at each locus for both groups and the loci were ranked by the magnitude of the difference between these averages. If columns were considered replications (several independent measurements taken under identical experimental conditions), one would compute the within subject average as the mean of these measurements and the within group averages as the mean of the within subject averages weighted by the Fisher information, the inverse of the within subject variance (FIG. 13). In this case, however, the information content of the individual observation is not known when the linear model is used and, thus, the Fisher information is constant.

By computing arithmetic averages of the above codes one assumes implicitly that there exists a linear relationship between the numerical value of the coding (1, 2, and 3) for the marker locus and the contribution of a neighboring, genetically linked disease locus to the risk of developing recidiv. Obviously, this assumption cannot be justified on biological grounds. On the one hand (with recessive diseases), a heterozygous person has (ideally) as low a risk as a non-affected person. Thus, the heterozygous allele should be assigned the score 0. The converse is true for a dominant disease. Most diseases, however, are believed to be influenced by several genes, so that each gene's contribution can vary between 0.0 and 1.0.

The UStat approach differs from traditional approaches in that one does not assume such a linear relationship. Instead, the approach is capable of dealing with the more realistic, but also more complicated partial ordering depicted in FIG. 8b. To demonstrate the computational efficiency of the proposed Ustat algorithm even when dealing with more realistic assumptions and to take advantage of interactive graphics and visual debugging features, a protoype application was implemented in a spreadsheet (MS Excel).

Of course, writing applications for handling 11 Worksheets containing 70,000 active cells each, is not a trivial task for MS Excel. In fact, it was necessary to parallelize the execution in two separate paths to overcome memory constraints. The same technique could be used, if one were to aim at increasing the speed of performing the computation of U or MrgL scores. Luckily, as demonstrated in this example, the proposed algorithm allows for different set of variables to be scored in parallel with different processors, if necessary.

The organization of the data and how the data flows between worksheets within a file is described in FIG. 14. From FIG. 14, it is obvious, how easy it is to replace the standard algorithms based on the linear model (FIG. 13) by the more appropriate algorithms based on the ordinal model. In general, no conceptual changes are needed for existing software application. Instead, one merely replaces the computation of scores based on the linear model (arithmetic means) by the computation of scores based on the ordinal model. Thus, existing applications can be easily modified, while novel applications become feasible.

The methodology is straightforward and can be fully described with a few Excel formulae only (see FIG. 15). In a first step, the data is entered with subjects as rows and marker loci as columns. Each subject is then compared with all subjects in either group one marker interval at a time, using the partial ordering for the nine possible intervals (FIG. 8b). In seven separate worksheets, these counts are accumulated in the same row and column as the original data.

By the traditional analysis based on the linear model, the loci with the highest differences were 19, 53, 6, and 48. Sorting the patients within each group by one of these loci generates the pattern given in FIG. 16. There is obvious correlation between adjacent markers, as is to be expected from linkage, but no other conclusion is imminent from the analysis based on the linear model.

Scoring intervals between marker loci by u statistics, increases the possible outcome categories from thee to nine (FIG. 8) one obtains a similar picture of the data set, although the number of columns is reduced by one, while the number of possible scores is increased from 3 to 9, although the number of score outcomes for a given interval may be smaller (FIG. 17).

The analysis based on UStat scores identifies the similar areas on the genome as possibly related. Displaying the data graphically, however, provides novel insight, as shown in FIG. 18. While marker 48 was included by the linear model analysis among the more significant locations, there was no indication based on the linear model (FIG. 16) for other areas being related, when patients were sorted by the marker 48 score. In the ordinal model, however, the interval 49–55 is the most significant and sorting by the corresponding u score yields a picture that shows a surprisingly high correlation between a central and region at the end of the spectrum. Sorting for other locations with high UStat or linear scores, however, gave results similar between the models. In particular, there was no sign of correlation with distant regions.

While the ability to identify this region as important at least indirectly, shows the advantage that a method based on the more appropriate ordinal model can have over methods based on the commonly used linear model, it is not fully satisfactory that the obviously interesting region 79–80 was not among the first 20 largest differences. Thus, to explore the full potential of the UStat methodology in identifying genetic regions of diagnostic significance, the UStat method was applied again, this time with weighing each interval by its information content estimate.

The data displayed in FIG. 17, each interval score multiplied by its information content weight is displayed in FIG. 19. The trend from FIG. 12 over FIG. 17 to FIG. 19 is striking. With the introduction of U scores in FIG. 17, columns in which most of the intervals were homozygous where "standardized", in effect reserving extreme colors (black and white, as compared to shades of gray) to rare observations. With the introduction of information content weights, more attention is given to rare observations that are also highly accurate, as compared to extreme scores that are more likely to be subject to random errors. Weighing observations both by how unusual they are and by how confident one can be that this observation is accurate, one can effectively separate the wheat from the chaff. As a consequence, everything "normal" or "inexact" is dimmed, while highly informative unusual observations are highlighted.

Unfortunately, MS Excel provides conditional formatting only for up to four levels, so that the advantage of this approach may not be fully visible. Nonetheless, one can now identify intervals of potential interest by visual inspection only. Examples are 4–5, 19–20, and 78–81. The reason for differences to become visually detectable is that increasing contrast (by using standardized interval scores) and reducing noise (by using information content weights) amplifies the differences between the groups. The largest differences are now almost twice as high as before. Of course, subjects still need to be sorted based on their (unweighted) scores. Thus, the visual impression after sorting is typically very similar between weighted and unweighted scores. For automated decision support, however, the difference is crucial. Since only with this approach both the areas 48–55 and 78–79 are included among the areas identified automatically, the ordinal model with information content weights is the only model suitable for automatic detection of genetic information relevant for diagnostic support.

Replacing the traditional approach for data mining, which is based on the conceptually unsatisfactory linear model through a novel approach that more closely reflects underlying knowledge, is likely to provide deeper insight in genetic risk factors and a better understanding of genetic pathways and epistatic interaction. The UStat approach to multivariate ordinal data is not only more appealing from a conceptual perspective, but also has the advantage of being of surprising computational simplicity and elegance. Having such a tool available for data mining will finally allow physicians to utilize genetic information when looking for the right diagnosis, choosing the most effective drug, and identifying risk factors for treatment failure or susceptibility to side effects.

When searching for areas where genetic information best discriminates between cases and controls, the orientation of the alleles is not known a-priori. As was demonstrated in in EXAMPLE 2, it is therefore necessary to assign combinations of signs to the markers to reflect their putative orientation. In understanding, how the approach presented in EXAMPLE 2 for the special case of inbread strains (FIG. 8a) generalizes to outbread strains (FIG. 8b), it helps to look at three different levels of complexity: univariate, interval, and multivariate.

Univariate: At the first level, when investigating one marker allele at a time, the orientation A vs. B can be positive (A>B) or negative (A<B). While this does not affect the actual computations, it is helpful to present univariate results in a fashion where the alleles are uniformly ordered, i.e., to adjust the sign of the scores so that higher scores are seen among the cases, as in FIG. 12.

Interval: At the second level, we are investigating one interval at a time. Unfortunately, the univariate orientation of the alleles at locations i and i+1 does not necessarily predict the combination of orientations of alleles at locations i and i+1 which provides for the best discrimination between cases and controls. It suffices to consider (a) the case where the two alleles are assigned the same orientation as in the univariate case and (b) the case where the two alleles are assigned alternating orientations. Of these two cases, one then selects the better discriminating case. As in the univariate case, the sign of the scores is adjusted for display so that higher scores are seen among the cases, as was done in FIG. 17.

Combining evidence from the first two levels yields additional insight into the data from the three possible settings around any give marker location:

a) . . . -A A A- . . . . . . . -B B B- . . . ,
b) . . . -A B A- . . . . . . . -B A B- . . . ,
and c) . . . -A A B- . . . . . . . -B B A- . . . .

Note that, without loss of generality, the allele (or combination of alleles) displayed in the top row is assumed to be associated with a higher risk. Setting (a) is to be expected in areas, where genes affecting risk are located. Setting (b) may be due to the fact that individual markers do not utilize the same amount of information as intervals. Setting (c) suggests that genes affecting the phenotype are present on one side of the marker at best. Multivariate: At the third level, we are interested in assessing several adjacent intervals at a time. Without loss of generality, we have, again, two settings:

a) . . . -A A- . . . . . . . -B B- . . .
and b) . . . -A B- . . . . . . . -B A- . . .

Of course, data from adjacent intervals from the same individual can only be combined, when the allele at the connecting marker has been assigned the same role in both intervals. For computational efficiency, one can employ the same strategy as above, consider (a) the case where the two interval scores are assigned the same orientation and (b) the case where they are assigned alternating orientations. Of the two cases, one then selects the case that results from assigning the alleles at the joint marker location the same role. As in the univariate and the interval case, the sign of the scores is then adjusted for display so that higher scores are seen among the cases.

EXAMPLE 4

Immune and Clinical Responses After Vaccination of Patients with Metastatic Melanoma with CD34+ Hematopoietic Progenitor-Derived Dendritic Cells Molecular identification of human cancer antigens in the last decade has led to a new era of antigen specific cancer immunotherapy specifically targeting these antigens. However, several such approaches (e.g. peptides, DNA vaccines and viral vectors) had thus far little or no success in the clinic. In particular, it has proven difficult to immunize humans simultaneously with multiple tumor antigens. In the case of melanoma, the immune system may be tolerized to these "self" antigens, because they are also expressed on normal tissues (e.g. melanocytes). Additional obstacles may include tumor-induced tolerance and global immunosuppression in advanced cancer. Unfortunately, most human tumor vaccine studies have not included control CD8+ T cell antigens (e.g. viral CD8+ epitopes), making it difficult to distinguish between these possibilities.

Dendritic cells (DCs) are antigen-presenting cells specialized to initiate and regulate immune responses. Their clinical use as adjuvants has been aided by the development of methodologies to generate large numbers of these cells in culture from blood monocytes or CD34+ progenitors. In contrast to monocyte derived DCs, DCs derived from CD34+ cells consist of two phenotypically and functionally distinct populations. One subset is similar to the epidermal Langerhans cells (LCs), while the other termed "interstitial/dermal DCs" is similar to those derived from blood monocytes. Immune responses to these unique LC containing preparations need to be evaluated in humans. Here we describe the safety and immunogenicity of antigen bearing CD34+ derived DCs (CD34-DCs) in patients with stage IV melanoma.

Eighteeen HLA-A201$^+$ patients with metastatic melanoma were injected with CD34-DCs. All patients gave a written informed consent and the study was approved by the Food and Drug Administration, the National Cancer Institute and the Institutional Review Board. Patients received a 6-week outpatient vaccination course with antigen-loaded CD34DC given subcutaneously (s.c.) every 14 days for a total of four vaccinations. DCs were administered in a dose escalation design at the dose level per cohort of 0.1, 0.25, 0.5, and 1×10$^6$ DC/kg/injection.

Two essays were performed, termed "direct" and "recall". Direct ELISPOT assay was performed for the detection of antigen specific IFN-γ producing T cells. PBMCs were added to plates precoated with a primary anti-IFN-γ mab in the presence or absence of 10 μg/ml peptide antigens. The antigens were the same HLA A*0201 restricted peptides (4 melanoma peptides and Flu-MP) used in the DC vaccine. Antigen specific SFCs were calculated after subtracting the background with control peptide.

To evaluate the "recall" ability of antigen specific T cells to proliferate and differentiate in culture, pre and post immunization PBMC were thawed together and co-cultured (2×105 cells/well) for 7 days with autologous mature DCs pulsed with peptides. After 7 days, cells were transferred to an ELISPOT plate and cultured overnight with irradiated T2 cells with or without specific antigen. Antigen specific SFCs were calculated after subtracting the background with unpulsed T2 cells.

As the role of different melanoma antigens with regard to protective immunity is not known, we integrated post-vaccination responses to all 4 melanoma antigens, as measured by both direct and recall assays, into an immunity score using a non-parametric method based on the marginal likelihood approach.

To score n individuals according to their immune response profiles, one computes all rankings (permutations of numbers 1 . . . n) that are compatible with all pairwise orderings. An immune response is considered higher, if it is at least as high for each of the variables considered and higher for at least one variable. A patient's immunity score is the average of the corresponding ranks among the compatible rankings minus the expected score. All immunized patients were included in the analysis in an "intent to treat" approach. One patient was non-evaluable for clinical outcome and, thus, excluded from the analysis.

To correlate immune response profiles with clinical outcomes, patients were categorized as responders and non-responders, based on clinical outcomes. Different subsets of immunological responses were then selected to compute immunological response scores based on the marginal likelihood principle.

Computation of MrgL scores can be extremely time consuming, even for sets with 17 subjects only, unless the correlation between the variables is either extremely high, in which case pruning can be used to reduce the number of permutations that actually need to be considered, or is extremely low, in which case factorization can be used.

When exact computations are not feasible, bootstrapping can be used to increase computational efficiency. Here a bootstrap strategy was chosen, where the sample was split randomly into two subsamples.

For each of the 17 patients, clinical and immunological responses are listed in Table 1.

TABLE 8

Clinical and immunological responses after dendritic cell vaccination in patients with melanoma

| | | MAGE | | | | MART | | | | Tyr | | | | gp100 | | | |
|---|---|---|---|---|---|---|---|---|---|---|---|---|---|---|---|---|---|
| | | direct | | recall | | direct | | recall | | direct | | recall | | direct | | recall | |
| ID | CR | abs | rel | abs | rel | abs | rel | abs | rel | abs | rel | abs | rel | abs | rel | abs | rel |
| 1 | 1 | 8.0 | 1.07 | 40.0 | 1.13 | 3.0 | 0.0 | 59.0 | 1.07 | 6.0 | 1.03 | 45.0 | 0.91 | 8.0 | 0.83 | 40.5 | 0.83 |
| 2 | 0 | 4.0 | 0.56 | 2.5 | −0.15 | 0.5 | −0.4 | 14.5 | 1.86 | 2.5 | 0.92 | 9.0 | 0.78 | 8.0 | 1.60 | 14.0 | 0.75 |
| 3 | 1 | 36.0 | 2.26? | ? | ? | 25.0 | 0.9 | ? | ? | 27.0 | 1.00? | ? | ? | 33.0 | 2.05? | ? | ? |
| 4 | 0 | 2.5 | 0.56 | 3.0 | 0.48 | 1.5 | 0.8 | ? | ? | 2.5 | 1.10 | 7.5 | 0.70 | 2.0 | 1.00 | 13.0 | 0.42 |
| 5 | 0 | 0.2 | 0.00 | 0.2 | 0.00 | 0.2 | −0.1 | 0.2 | 0.00 | 0.2 | −0.16 | 0.2 | 0.00 | 0.2 | 0.00 | 0.2 | 0.00 |
| 6 | 1 | 23.0 | 1.42 | 178.0 | 1.60 | 13.0 | 0.0 | 55.0 | 0.61 | 24.0 | 0.65 | 110.0 | 1.39 | 25.0 | 1.24 | 59.0 | 1.60 |
| 7 | 1 | 12.5 | 1.80 | 20.0 | 1.13 | 12.0 | 1.7 | 29.5 | 0.43 | 10.5 | 1.72 | 21.5 | 0.93 | 18.0 | 1.95 | 23.5 | 1.20 |
| 8 | 0 | 1.0 | −0.19 | 38.0 | 0.74 | 2.0 | 0.7 | 47.0 | 2.37 | 1.5 | 0.88 | 45.0 | 1.65 | 1.0 | 0.70 | 48.0 | 0.57 |
| 9 | 1 | 20.0 | 0.44? | ? | ? | 39.0 | 0.5 | ? | ? | 15.5 | 0.48? | ? | ? | 5.5 | 0.13? | ? | ? |
| 10 | 1 | 4.5 | 0.72 | 0.2 | 0.00 | 0.5 | −0.8 | 15.0 | 1.88 | 0.5 | −0.58 | 54.5 | 2.44 | 0.2 | −0.16 | 35.5 | 2.25 |
| 11 | 0 | 0.2 | 0.00 | 1.0 | −0.48 | 0.2 | −0.4 | 0.2 | −0.88 | 0.2 | −0.30 | 0.5 | −0.30 | 0.2 | 0.00 | 10.0 | 0.35 |
| 12 | 1 | 9.0 | 1.05 | 37.0 | 1.02 | 12.0 | 1.0 | 64.5 | 0.70 | 10.0 | 1.00 | 51.0 | 1.11 | 7.0 | 0.85 | 44.0 | 0.55 |
| 13 | 1 | 3.0 | 1.18 | 0.2 | 0.00 | 8.0 | 0.4 | 20.0 | 0.52 | 13.0 | 1.49 | 36.0 | 1.56 | 4.0 | 0.78 | 36.0 | 2.26 |
| 14 | 0 | 0.2 | −0.40 | 4.5 | 0.65 | 0.2 | −0.6 | 6.0 | 0.08 | 1.0 | 0.70 | 6.0 | 1.48 | 10.0 | 1.30 | 70.0 | 1.07 |
| 15 | 1 | 2.0 | 0.79 | 18.0 | 0.52 | 1.5 | 0.8 | 9.5 | −0.14 | 1.5 | 0.48 | 2.0 | 1.00 | 1.5 | 0.48 | 16.5 | 1.92 |
| 16 | 0 | 0.2 | 0.00 | 5.0 | −0.28 | 0.2 | −0.2 | 10.5 | −0.06 | 0.2 | −0.88 | 14.5 | 0.86 | 2.0 | 0.36 | 22.0 | 0.23 |
| 17 | 1 | 15.5 | 1.03 | 37.0 | 0.25 | 9.0 | 0.9 | 44.0 | 0.17 | 10.0 | 0.88 | 20.0 | −0.06 | 10.0 | 1.05 | 36.0 | 0.35 |

Within each subsample, MrgL scores were computed and the results were then standardized and combined. The simulation results demonstrated, that bootstrapping marginal likelihood scores converges fast. As is to be expected when some higher-order relations cannot be assessed, bootstrapping results are generally conservative.

Among the 17 patients with evaluable disease, tumor immunity was lower among the 7 patients with progressive disease (p=0.043). The tumor immunity score was associated to the clinical outcome. Six of 8 patients with a negative tumor immunity score had progressive disease. On the other hand, only 1 of the 9 patients with a positive tumor immunity score progressed. Therefore, early clinical outcome after DC vaccination correlates to the elicited immune response.

When faced with a plethora of outcomes (genetic, genomic, laboratory, . . . ), it is crucial to separate the wheat from the chaff, i.e., to determine the optimal combination of outcomes. Clearly, looking at these outcomes individually is not appropriate, because many clinically relevant features can only be identified by a combination of variables. The current statistical methods are based on the linear model, i.e., it is implicitly assumed that there is a linear relationship between the numerical value of the outcome and the clinical relevance, that the relative importance of the outcomes is constant across the whole range of the predicted variable (clinical response). The marginal likelihood approach is the first to overcome these obstacles. With this intrinsically valid approach available, it is now possible to reliably identify which assay outcomes, gene expressions, or SNP pattern are most relevant for differential diagnosis and then to use this optimal set of parameters to find the correct diagnosis for a patient.

EXAMPLE 5

Ranking Adverse Event Profiles in a Clinical Trial on the Thalidomide in the Treatment on Scleroderma When monitoring clinical trials, one of the most relevant concerns regards safety of the experimental drug. If the experimental drug should cause more side effects than the conventional drug or the placebo, one would like to stop the study as early as possible to prevent the patients from becoming exposed to unjustifiable risk. Because the type of side effects that could be associated with an experimental drug is typically not known, one needs to monitor a large set of potential side effects, termed adverse experiences (AE), each, and AEs can differ by relevance, even within each severity category (minimal, . . . , severe) and causality (unrelated<unlikely<possible<probable<definite) category.

A particular problem arises when decisions have to be made, whether or not to allow a double-blinded study to continue, because unblinding the study, even for the analysis of AEs carries the risk that the principal investigator may draw conclusions from the result of an unblinded safety analysis as to the assignment of the patients to the study drugs. Therefore, the first step would be to ascertain whether there is a need to unblind the study, i.e. whether the study may be stopped if the patients with the worst side effect profiles all received the experimental drug.

In an ongoing double-blinded, placebo controlled study of thalidomide in scleroderma patients, the AE profiles listed in Table 9 were observed among the first seven patients. If one were to analyze the data univariately, the variables with three or four reported AEs, e.g., Lightheadedness and dry skin/pruritus would yield the most significant results, with an p-value of 0.020 (Fisher's exact test, one-sided). For any given group assignment, however, only one of these variables would be "significant". With only one of 15 variables "significant", the data and safety monitoring board would most likely still argue that this is likely to be a false-positive result and recommend the study to continue. Such a decision, however, would be highly subjective.

TABLE 9

Adverse experiences among scleroderma patients in a randomized double-blinded study. Numbers indicate severity/causality. The most severe AEs are indicated in bold, the most likely related are underlined.

| Patient No. | Lightheadedness | Daytime sedation | Tinnitus | Dry skin Pruritus | Constipation | Edema | Difficulty concentrating | Paresthesias | Visual Accomodation | Hirstutism | Skin pigmentation | Changes in TFTs | Bradycardia | Palpitations | Other |
|---|---|---|---|---|---|---|---|---|---|---|---|---|---|---|---|
| 12 | | | 2/3 | 1/4 | | | 1/4 | 1/4 | | 1/3 | 1/4 | 1/4 | | | |
| 13 | 1/2 | | 2/3 | 1/3 | | | | | | | 1/3 | | | | |
| 14 | 1/2 | 1/3 | | 1/3 | 1/4 | | | 1/4 | | | | | | | |
| 15 | | 1/3 | 2/3 | | | 1/3 | | | | | | | 1/3 | 1/2 | 2/3 |
| 17 | | 1/3 | | | 1/4 | 1/3 | | | 1/3 | | | 1/3 | | | 3/3 |
| 18 | | 1/3 | | | | | | | | | 1/3 | | 1/3 | | |
| 19 | | 1/3 | | | | | | 1/2 | | | | | | | | even though each patient will experience only a few and different patients will often experience different combinations of AEs.

The problem with analyzing this type of data lies in the fact that it is not trivial to combine evidence from so diverse AE profiles in a way that would allow for two (or more) groups to be compared. The prevailing approaches to assessing treatment related risks pose dilemmas.

Focusing on a specific AE (e.g., headache) evades the most critical question, that is, whether overall risk was affected. Moreover, using independent statistical tests for each AE generates a multiplicity problem. With 20 AEs monitored, the probability of finding at least one "significant" result at the 5% level even if the experimental drug were no different from the control is 64%. In the presence of so many false positive results to be expected, the true positive results are likely to be overlooked, either because of statistical adjustment of the p-values (e.g., by Bonferroni correction) or by other, more subjective reasoning.

Simply counting the AEs per group doesn't help either, because AEs can be correlated (nausea often comes with headache), having the same AE three times may mean something else than having three different AEs one time In this data set, the number of variables (AEs) is too high compared to the number of individuals. As a consequence, the only pairs of patients that can be ordered are #19<#14 and #19<#12. Thus, neither the u-stat approach nor the MrgL approach can be applied without reducing the dimensionality of the problem first. Simply counting the number of AEs, on the other hand, might be considered a too crude approach. An alternative approach is therefore suggested, which covers the middle ground.

The approach is similar to the analysis of Olympic medal data (EXAMPLE 1) in that one first generates cumulative variables. First, one determines for each patient the highest attribution among the AEs with highest, high, moderate, and low severity. In a second step, one computes the maximum attribution among those with at highest, at least high, at least moderate, and any severity. These four variables are then used to compute UStat scores. An equivalent approach is to first determines for each patient the highest severity among the AEs with definite, probable, possible, unlikely, and unrelated attribution. In a second step, one computes the maximum severity among those with definite, at least probable, at least, and any severity. These four variables are then used to compute UStat scores.

TABLE 10

Computation of UStat scores for the AE data in Table 9.

| | Highest Attribution among... | | | | | | | | | Highest Severity among... | | | | | | | | | |
|---|---|---|---|---|---|---|---|---|---|---|---|---|---|---|---|---|---|---|---|
| Patient No. | 4/x most severe | 3/x... | 2/x... | 1/x least severe | 4/x | 3/x... | 2/x... | 1/x... | UScr | x/5 Definite | x/4 Pro-bable | x/3 Poss-ible | x/2 Un-likely | x/1 Un-related | x/5 Def-inite | x/4.:5 Pro-bable | x/3.:5 Pos-sible | x/2.:5 Un-likely | x/1.:5 Un-related | UScr |
| 17 | 0 | 3 | 3 | 4 | 0 | 3 | 3 | 4 | 3.0 | 0 | 1 | 3 | 0 | 0 | 0 | 1 | 3 | 3 | 3 | 3.0 |
| 12 | 0 | 0 | 3 | 4 | 0 | 0 | 3 | 4 | 2.0 | 0 | 1 | 2 | 0 | 0 | 0 | 1 | 2 | 2 | 2 | 2.0 |
| 14 | 0 | 0 | 0 | 4 | 0 | 0 | 0 | 4 | 0.0 | 0 | 1 | 1 | 1 | 0 | 0 | 1 | 1 | 1 | 1 | 0.0 |
| 13 | 0 | 0 | 3 | 3 | 0 | 0 | 3 | 3 | 0.0 | 0 | 0 | 2 | 1 | 0 | 0 | 0 | 2 | 2 | 2 | 0.0 |
| 15 | 0 | 0 | 3 | 3 | 0 | 0 | 3 | 3 | 0.0 | 0 | 0 | 2 | 0 | 0 | 0 | 0 | 2 | 2 | 2 | 0.0 |
| 18 | 0 | 0 | 0 | 3 | 0 | 0 | 0 | 3 | 2.5 | 0 | 0 | 1 | 0 | 0 | 0 | 0 | 1 | 1 | 1 | 2.5 |
| 19 | 0 | 0 | 0 | 2 | 0 | 0 | 0 | 2 | 3.0 | 0 | 0 | 0 | 1 | 0 | 0 | 0 | 0 | 1 | 1 | 3.0 |

From these results, one can again compute the worst case statistic, this time using the Wilcoxon-Mann-Whitney or u test. For the worst case that patients 17, 12, and 14 are in the thalidomide group, the exact version of this test yields a p-value of 0.086. Given that this is the worst case, the result suggests that the trial can be continued.

The comprehensive assessment of adverse events or side effects is a necessity not only for the continuation of clinical trials, but also for diagnostic decisions determining the overall benefit (safety and efficacy) of therapeutic interventions. With genetic and genomic data (see the following examples), the assumption that only a small number of variables are relevant for the decision is often justified, because it is reasonable to assume that a small number of genes is accountable for most of the variation in the outcomes. With side effects, however, this assumption cannot reasonably be made, so that a large number of variables may need to be considered. The results from this small sample demonstrate that scores based on u statistics can reasonably be used to ascertain the clinical relevance of side effects as part of a data base driven decision support system for diagnostic and therapeutic decisions, even if the number of variables is large compared to the number of subjects.

EXAMPLE 6

Distance Ordering as a Method to Enable Data Base Driven Diagnostic Support and Hand-Held Devices as an Interface for the Decision Maker In the above examples, the statistical methodology of the present invention was demonstrated to be allow for assisting decision making in general and medical diagnoses in particular by providing a more valid method of analyzing multivariate ordinal data.

A diagnostic support system that does not draw on the physicians experience would be neither flexible enough nor acceptable. On the other hand, acceptability would also be low if the interaction would interfere with the diagnostic process.

To illustrate the general applicability of the invention, it will now be demonstrated how the decision maker can influence the decision process. At the same time, the it will be demonstrated that the size of the data base though substantial, does not impede practicability, due to the methodology provided as part of the invention.

The main data base of the demonstration of the decision support system is derived from the SNP data set from EXAMPLE 3, this time, however, some of the variables are assigned other roles. For simplicity of the discussion, it will be assumed that the data base contains only former patients with two diseases and patients who presented with similar symptoms, but were then found to have neither of these two diseases.

One previous genetic outcome, coded as 1, 2, or three is assumed to be the confirmed diagnosis for patients in the data base. One marker in the original data set was binary. This variable is assigned the role of a sex indicator.

Three variables each will be considered discrete nominal variables, the term "nominal" indicating that the ordering of the categories is arbitrary:
  race (1: white, 2: Hispanic, 3: black)
  marital status (1: single, 2: married, 3: divorced/widowed)
  county of residence (1: Manhattan, 2: Bronx, 3: Brooklyn/Queens)

Three other tertiary variables will be assigned the role of discrete ordinal variables (1: low, 2: intermediate, 3: high):
  Children (1: none, 2: one or two, 3: more than two)
  Education (1: high school, 2: college, 3: university)
  Alcohol consumption (1: none, 2: moderate, 3: high)

Finally, three pairs of variables, are used to generate classified ordinal characteristics with up to nine outcome categories (for simplicity, by means of u statistics):
  age
  body weight
  blood pressure Some genetic variables will kept their role as SNPs, while others will, again, be combined using u statistics to generate genomic information (expression levels).

Moreover, the patients in this data base are assumed to have been treated with three levels of two drugs (systemic, topical) and that a binary clinical effectiveness outcome (success, failure) is included.

Finally, it will be assumed that possible side effects of these drugs are reported in five categories of severe AEs (cardiovascular, kidney, liver, psychological, allergic) and three levels of less severe AEs (pain, gastrointestinal complaings, sleeping difficulties), each with three levels of reported causality (unlikely, possible, likely), which will allow for the methodology presented in EXAMPLE 5 to be applied in the analysis.

For a decision support system to adjust to the needs of the particular patient, the decisions have to be based on a data base of sufficiently "similar" cases. For the system to determine "similarity" appropriately, however, three situations to be considered and, as demonstrated in this application, to be treated differently.

For nominal variables (sex, . . . ) the database is simply restricted to those cases that simultaneously fulfill all criteria.

For ordinal variables, however, to require that all criteria are met exactly may be impractical, especially if the number of outcome categories is high. Thus, the system now needs to determine for each subject, which subjects in the data base are "closest" to the subject hchosen. For ordinal variables of known orientation, the system can use either of the proposed intrinsically valid methods (UStat or MrgL) to score subjects in the data base (with the patient to be diagnosed included) and then select the patients whose scores are closest to the patient's score.

Often, however, the orientation is not known, or may not be isotonic (monotonically). People with higher education, for instance, may have a higher risk for some diseases (heart attacks) and a lower risk for others (obesity), and the orientation of education as a risk factor for the diseases to be considered may be unknown. Also, moderate amounts of alcohol consumption has been suggested as being protective of heart diseases, but this does not guarantee that more alcohol consumption lowers the risk of heart diseases even more. The problem is illustrated in detail in FIG. 20, based on the data of the first eight control patients in the hypothetical data base generated above.

For these situations, where subjects have to be ranked with respect to their multivariate distance to a reference (i.e., the patient to be diagnosed), this invention provides for strategies that can be employed. In particular, a method is presented that is based on two interim variables for each characteristic, the sign of the difference, and the magnitude of the difference. The standard Ustat algorithm is then applied to the tuple tupel of these interim variables.

For these situations, where subjects have to be ranked with respect to their multivariate distance to a reference (i.e., the patient to be diagnosed), this invention provides for strategies that can be employed. In particular, a method is presented that is based on two interim variables for each characteristic, the sign of the difference, and the magnitude of the difference. The standard Ustat algorithm is then applied to the tupel of these interim variables.

In FIG. 20, it is demonstrated, how the different assumptions regarding the orientation affect the partial orderings.

Distance ordering is done in two steps. First, one determines univariate absolute differences between the subjects in the data set and the reference subject. One then determines, which subjects in the data set can be level ordered based on these absolute differences, this time, however, under the restriction that the difference in signs for each variable must not exceed 1. In other words, if for one subject, the original difference (before taking the absolute value) in one variable had a positive sign and for the other subject, the orignal difference in the same variable had a negative sign, these two subjects cannot be ordered. The practical application was again implemented in MS Excel, this time replacing the summands in FIG. 15 by array formula terms of the form $LE:\{=SUM((Abs!G\$7:G\$785<=Abs!G7)*(ABS(Sgn!G\$7:G\$785-Sgn!G7)<2)* \ldots)\}$ $GE:\{=SUM((Abs!G\$7:G\$785<=Abs!G7)*(ABS(Sgn!G\$7:G\$785-Sgn!G7)<2)* \ldots)\}$ By using the standard terms for variables with level metric and terms with the above modification for variables with distance metric, records in the data base can now be ranked according to their overall similarity with the patients to be diagnosed.

During the first interaction with the decision support system the physician uses clinical judgement to determine which of the demographic/anamnestic characteristics (sex, race, marital status, area of residence, children, education, alcohol consumption, age, body weight, blood pressure) are to be considered relevant, i.e., how the most "similar" patients from the data base should be selected. For instance, the physician might choose sex, county, alcohol consumption, age, and BMI as the most relevant characteristics for the patient to be diagnosed. The current invention proposes that this interaction is optionally done via a hand-held device. In Table 11 it is demonstrated, how this information, namely variables selected and their metric can be entered in such a fashion.

From this input, the system then selects the ad hoc data base of patients similar to the candidate.

TABLE 11

View of the data base from the screen of a hand held device. The relevant characteristics are chosen by tapping on the bold fields in the rows Metric and Select. Metrics are unique (U, default for nominal scale), level (L), and distance (D). Disease category 0 (zero) indicates the candidate patient to be diagnosed.

| ID Disease | Sex | Race | Marital | County | Child | Edu | Alcohol | Age | BMI | SBP |
|---|---|---|---|---|---|---|---|---|---|---|
| Scale | N | N | N | N | O | O | O | O | O | O |
| Metric | U | U | U | U | | | L | D | D | |
| Select | 1 | 0 | 0 | 1 | 0 | 0 | 1 | 1 | 1 | 0 |
| # 0 | M | B | S | Q | ... | ... | -0.2 | -0.0 | -0.15 | ... |
| # 1 | M | B | D | Q | ... | ... | -0.2 | -0.0 | 0.14 | ... |
| # 1 | M | W | M | Q | ... | ... | -0.2 | -0.4 | -0.15 | ... |
| # 2 | M | H | M | Q | ... | ... | 0.8 | 0.9 | -0.68 | ... |
| # 2 | M | B | S | Q | ... | ... | -0.2 | -0.4 | -0.80 | ... |
| # 2 | M | W | S | Q | ... | ... | -0.2 | 0.5 | -0.66 | ... |
| # 1 | M | H | D | Q | ... | ... | -0.2 | -0.4 | -0.68 | ... |
| # 1 | M | H | M | Q | ... | ... | -0.2 | -0.0 | -0.15 | ... |

Using the methodology described above (see EXAMPLE 2 and EXAMPLE 3), the genetic and genomic information most relevant for the diagnostic decision was sought by data mining these three populations of 50 patients each.

As is easily explained by the way the data set was generated, the same loci were identified as discriminating for both diseases, limiting the power of this feasibility study to fully demonstrate the usefulness of the proposed diagnostic support method. The next steps, however, are conceptually simple and follow straightforward from the above examples.

For each of the diseases, the patient is ranked simultaneously among the cases and controls. For this comparison, the system uses the discriminators that have been selected and assigned an orientation by the system as optimal for this disease in patients with similar characteristics. The proportion of cases having a higher Ustat or MrgL score then determines the sensitivity and the proportion of cases having a lower Ustat or MrgL score determines the specificity.

If the data base contains information about the treatment the previous patients received and the side effects that were reported, for each treatment option the expected benefit and the expected risk can easily be determined in this ad hoc population using standard methodology.

As a result, the physician is then presented by the system with a list of diseases and treatment options ranked by sensitivity and specificity of the diagnosis on the one side as well as effectiveness and side effects on the other side. The physician may then augment this list according to the preferences the patient may have as to which risks he/she might be more willing to take. In the case of cancer, for instance, some patients are more risk conscious and, thus, might prefer a surgical option, while others might be more concerned with physical appearance and, thus, might prefer a conservative treatment.

Again, the augmentation of the decision process might again be communicated via a hand held device and the system will use the same methodology for multivariate data as before, this time to weigh the therapeutic options according to the objective criteria derived from the data base driven analysis and the subjective criteria entered by the physician in consultation with the patient.

One reason for many previous attempts to "knowledge based" or "Expert" systems to fail was that the decision maker could not understand the decisions and, therefore, not control them. As was demonstrated in this example, this obstacle has been overcome by the proposed methodology.

In the above examples, especially in EXAMPLE 3 the statistical methodology has been demonstrated as sufficiently efficient to handle data of several hundred subjects. This example clearly demonstrates the imminent practical usefulness of the proposed methodology from the perspective of man-computer interaction. Even with a large data base, the amount of data to be entered, i.e., the choice of characteristics and their metrics on the one end and the augmentation of numerical results at the other end, is small enough to allow the decision maker to conveniently interact with the data base driven decision support system via a hand-held device.

Restricting the sample data base to male former patients from Queens yielded only 60 cases in one of the categories, of which not more than 50 could be selected without foregoing the benefit of basing decisions on evidence obtained in similar previously treated patients. Thus, while this example proves the methodology feasible, it also suggests a sample size of 50 confirmed similar subjects in each disease category as not sufficient for the system to be able to make assist in the diagnostic process with confidence. With humans, due to the large interpersonal variation, a data base should allow for more than 100 subjects per disease to be selected as sufficiently similar to the patient to be diagnosed. To make the selection of similar ad hoc populations effective and to have enough evidence to evaluate treatment options, this would mean a data base of several hundred patients with confirmed diagnoses per disease, rather than 60 as for disease B in this example.

This case study demonstrates that data base driven decision support is practical under two conditions, either if the area of application is such that the subjects to be classified are more homogeneous than humans or if large amounts of information are accessible to the system. The lack of an efficient means to acquire "knowledge" was another obstacle that prevented previous attempts in the field to become viable. The proposed methodology resolves this problem in a two-hit approach. First, knowledge acquisition is replaced by data acquisition. This lessens the need for highly qualified "experts" to spend substantial amounts of time to codify their knowledge and to enter it into the system. Second, even the data acquisition part is automated. As provided in this invention, every use of the system already provides the bulk of data that the system needs to grow. As soon as the confirmed diagnoses is entered, all the other genetic, genomic, or proteomic information that was made available as part of the diagnostic process now becomes part of the data base. Thus, the current invention provides for a mechanism, where the data base automatically grows with every use of the system.

VISUAL BASIC SCRIPT FOR MOVING A 10 MARKER BIN THROUGH THE GENOME AND FINDING THE PERMUTATIONS (LENGTH 1–10) OF MARKER ORIENTATIONS OF THE HIGHEST CORRELATION WITH THE PHENOTYPE (FROM THE BITMUSTER CODED AS THE INTEGER VARIABLE "COUNTER").

```
sub DoAllMrk( )
'
Do
'Get Data
    Windows ("U18x9.xls:1").Activate
    Worksheets ("Data").Activate
    Range("B1:K9").Select
    Selection.Copy
'
'Copy Data,
'Find Assignments With Highest Confidence
    Windows ("U18x9.xls:3").Activate
    Worksheets("Current").Activate
    Range ("D2").Select
    Selection.PasteSpecial _
        Paste:=xlValues,Operation:=xlNone, _
        SkipBlanks:=False, Transpose:=False
    Windows ("U18x9.xls:1").Activate
    Worksheets("Data").Activate
    Windows("U18x9.xls:3").Activate
    Worksheets("Current").Activate
    Application.CutCopyMode = False
    Application.Run "U18x9.xls!FindMax"
'
'Copy Results
    Windows("U18x9.xls:3").Activate
    Worksheets("Current").Activate
    Range("D2:D10").Select
    Selection.Copy Windows("U18x9.xls:2").Activate
    Worksheets("Result").Activate
    Range("A1").Select
    Selection.End(xlToRight).Select
    Selection.End(xlToRight).Select
    Selection.End(xlToLeft).Offset(0, 1).Select
    Selection.PasteSpecial _
        Paste:=xlValues, Operation:=xlNone, _
        SkipBlanks:=False, Transpose:=False Windows("U18x9.xls:3").Activate
    Worksheets("Current").Activate
    Range("AN12:AN31").Select
    Application.CutCopyMode = False
    Selection.Copy Windows("U18x9.xls:2").Activate
    Worksheets("Result").Activate
    Range("B11").Select
    Selection.End(xlToRight).Select
    Selection.End(xlToRight).Select
    Selection.End(xlToLeft).Offset(0, 1).Select
    Selection.PasteSpecial _
        Paste:=xlValues, Operation:=xlNone, _
        SkipBlanks:=False, Transpose:=False
'
'Delete Data Column
    Windows("U18x9.xls:1").Activate
    Worksheets("Data").Activate
    Range("B1").Select
    Application.CutCopyMode = False
    Selection.EntireColumn.Delete
'
    Range("B1").Select
    NextMrk = ActiveCell.Value
Loop While NextMrk > 0
End Sub
```

```
Sub FindMax( )
' Loop
    Dim Counter, _
        MaxCorr1, NewCorr1, _
        MaxCorr2, NewCorr2, _
        MaxCorr3, NewCorr3, _
        MaxCorr4, NewCorr4, _
        MaxCorr5, NewCorr5, _
        MaxCorr6, NewCorr6, _
        MaxCorr7, NewCorr7, _
        MaxCorr8, NewCorr8, _
        MaxCorr9, NewCorr9
    Counter = −1
    MaxCorr1 = −1
    MaxCorr2 = −1
    MaxCorr3 = −1
    MaxCorr4 = −1
    MaxCorr5 = −1
    MaxCorr6 = −1
    MaxCorr7 = −1
    MaxCorr8 = −1
    MaxCorr9 = −1
    Do
        Counter = Counter + 1
        Range("C24").Select
        ActiveCell.FormulaR1C1 = Counter
        'Calculates new correlation
        If Counter < 1024 Then
            Range("AJ21").Select
            NewCorr9 = ActiveCell.Value
            If NewCorr9 > MaxCorr9 Then
                MaxCorr9 = NewCorr9
                Range("A21").Select
                ActiveCell.FormulaR1C1 = MaxCorr9
                Range("C21").Select
                ActiveCell.FormulaR1C1 = Counter
            End If
        End If
        If Counter < 512 Then
            Range("AJ20").Select
            NewCorr8 = ActiveCell.Value
            If NewCorr8 > MaxCorr8 Then
                MaxCorr8 = NewCorr8
                Range("A20").Select
                ActiveCell.FormulaR1C1 = MaxCorr8
                Range("C20").Select
                ActiveCell.FormulaR1C1 = Counter
            End If
        End If
        If Counter < 256 Then
            Range("AJ19").Select
            NewCorr7 = ActiveCell.Value
            If NewCorr7 > MaxCorr7 Then
                MaxCorr7 = NewCorr7
                Range("A19").Select
                ActiveCell.FormulaR1C1 = MaxCorr7
                Range("C19").Select
                ActiveCell.FormulaR1C1 = Counter
            End If
        End If
        If Counter < 128 Then
            Range("AJ18").Select
            NewCorr6 = ActiveCell.Value
            If NewCorr6 > MaxCorr6 Then
                MaxCorr6 = NewCorr6
                Range("A18").Select
                ActiveCell.FormulaR1C1 = MaxCorr6
                Range("C18").Select
                ActiveCell.FormulaR1C1 = Counter
            End If
        End If
        If Counter < 64 Then
            Range("AJ17").Select
            NewCorr5 = ActiveCell.Value
            If NewCorr5 > MaxCorr5 Then
            MaxCorr5 = NewCorr5
            Range("A17") Select
            ActiveCell.FormulaR1C1 = MaxCorr5
            Range("C17").Select
                ActiveCell.FormulaR1C1 = Counter
            End If
        End If
        If Counter < 32 Then
            Range("AJ16").Select
            NewCorr4 = ActiveCell.Value
            If NewCorr4 > MaxCorr4 Then
                MaxCorr4 = NewCorr4
                Range("A16").Select
                ActiveCell.FormulaR1C1 = MaxCorr4
                Range("C16").Select
                ActiveCell.FormulaR1C1 = Counter
            End If
        End If
        If Counter < 16 Then
            Range("AJ15") Select
            NewCorr3 = ActiveCell.Value
            If NewCorr3 > MaxCorr3 Then
                MaxCorr3 = NewCorr3
                Range("A15").Select
                ActiveCell.FormulaR1C1 = MaxCorr3
                Range("C15").Select
                ActiveCell.FormulaR1C1 = Counter
            End If
        End If
        If Counter < 8 Then
            Range("AJ14").Select
            NewCorr2 = ActiveCell.Value
            If NewCorr2 > MaxCorr2 Then
                MaxCorr2 = NewCorr2
                Range("A14").Select
                ActiveCell.FormulaR1C1 = MaxCorr2
                Range("C14").Select
                ActiveCell.FormulaR1C1 = Counter
            End If
        End If
        If Counter < 4 Then
            Range("AJ13").Select
            NewCorr1 = ActiveCell.Value
            If NewCorr > MaxCorr1 Then
                MaxCorr = NewCorr1
                Range("A13").Select
                ActiveCell.FormulaR1C1 = MaxCorr1
                Range("C13").Select
                ActiveCell.FormulaR1C1 = Counter
            End If
        End If
    Loop Until Counter = 1024
End Sub
```

What is claimed is:

1. An intrinsically valid statistical method for the analysis by a decision maker of inexact ordinal data having one or more variables to compare populations comprised of at least one object, the method comprising the steps of:

(a) partially ordering data by determining for all pairs of data the order of a first datum compared to a second datum as (i) superior, (ii) inferior, (iii) equal, or (iv) undecided, wherein for tuples a partial ordering comprises the first datum to be superior if for each variable the first datum is superior or equal, and for at least one variable, the first datum is superior;

(b) factorizing the partially ordered data;

(c) generating a score for each datum based on the partial ordering;

(d) estimating an information content for each of the scores;

(e) generating a weight for each score based on the information content;

(f) aggregating the scores and weights of all data using statistical methods for weighted rank scores, wherein the statistical methods comprise ranking, positioning, comparing, discriminating/regressing, and clustering; and (g) deciding which category the inexact ordinal data should be assigned to, thereby allowing the decision maker to act on the assignment to the category.

2. The method of claim 1, wherein the first datum is considered superior to the second datum if the distance of the first datum from a baseline datum is larger than the distance of the second datum from the baseline datum and if for none of the variables the difference from the baseline has a different direction.

3. The method of claim 1, wherein interchangeable variables comprising of compatible characteristics in all relevant aspects, including at least one of orientation, observational units, and measurements units, are grouped into replications and the partial ordering comprises a first empirical distribution superior if at each point on the x-axis the value of a first distribution function is superior or equal, and for at least one point on the x-axis, the first distribution function is higher.

4. The method of claim 1, wherein the information content is estimated after factorization for exact ties and within-group ties.

5. The method of claim 1, wherein an individual tuple is compared with more than one reference set of tuples.

6. The method of claim 1, wherein the steps comprise for each reference tuple counting the number of tuples being superior; and, obtaining scores by subtracting the number of tuples being inferior.

7. The method of claim 1, wherein the scores are generated according to the Marginal Likelihood principle, the steps comprising: (a) for a data set of tuples computing all rankings compatible with all pairwise partial orderings, wherein among any two tuples the tuple being superior is assigned the higher rank; and (b) averaging across the rankings.

8. The method of claim 7, wherein each of the rankings is augmented.

9. The method of claim 1, wherein the information content is estimated using u-statistics.

10. The method of claim 1, wherein the information content is estimated using the marginal likelihood principle.

11. The method of claim 1 further including the step of evaluating the utility of decision alternatives.

12. The method of claim 1 wherein step (g) further includes (g) restricting a population of subjects to those that are similar to a given subject with respect to a given set of ordinal variables, thereby allowing the decision maker to focus on empirical data relevant for the given object, defining subpopulations that can be discriminated from a reference population using a subset of a given set of ordinal variables, thereby allowing the decision maker to identify decision alternatives relevant to the given object, identifying subsets of a given set of ordinal variables, that allow for discriminating two given populations of subjects, thereby allowing the decision maker to base the decision on decision criteria most relevant for the given object, positioning a subject relative to two characteristics with respect to a given set of ordinal variables, thereby allowing the decision maker to obtain evidence for the given object to belong either of two categories.

scoring decisions with respect to a given set of ordinal variables, thereby allowing the decision maker to base the decision on criteria comprising various benefits or risks of true or false positive and negative decisions.

13. A process based on an intrinsically valid statistical approach wherein a decision maker obtains an ordered list of categories to which an entity may be assigned by utilizing a database of reference data sets of known categories and a potentially large set of variables, the process comprising the steps of:

(a) restricting a database of reference entities of known categories to an ad-hoc database based on a first subset of variables, termed characteristics;

(b) selecting a set of control categories based on a second subset of variables, termed control indicators;

(c) selecting a set of case categories based on a third subset of variables, termed case indicators;

(d) selecting a reference population subset for each of the case categories and one reference population for a union of the control categories;

(e) selecting a set of variables, termed discriminators, specific to a selected case category and the entity's characteristics subset, wherein the entity is positioned with respect to the joint case population and control population;

(f) determining the entity's score relative to the control population, termed specificity, and the subject's score relative to the case population, termed sensitivity; and, (g) ordering the categories by utilizing information from all obtained relative positions and consequences of assuming the entity to belong to a particular category.

14. The process of claim 13, whereby a decision maker iteratively interacts with the database of reference data and the potentially large set of variables, further comprising the steps of:

(a) modifying the characteristics by which the ad-hoc database is selected;

(b) modifying the categories, and the indicators by which the categories are defined;

(c) modifying the indicators by which the categories are defined and modifying the categories; and (d) modifying the discriminators by which the position of the subject relative to the reference populations is determined.

15. The process of claim 13, whereby the decision maker determines the ad-hoc database, and the steps further comprising:

(a) choosing characteristics to be added by selecting from a list of characteristics; and (b) choosing characteristics to be added from a list of ordered variables.

16. The process of claim 13, comprising determining the categories to be considered interactively, the steps further comprising:

(a) choosing categories to be added by selecting from a list of categories; and (b) selecting a list of indicators and then choosing categories from an ordered list of categories to which a subject can be assigned by utilizing a database of reference subjects of known categories and a potentially large set of variables.

17. The process of claim 13, further comprising interactively modifying the discriminators to be considered, the steps further comprising:

(a) choosing discriminators to be added by selecting from a list of discriminators;

(b) choosing discriminator variables from a list of variables ordered by their specificity from a database of reference subjects of known categories and a potentially large set of variables.

18. The process of claim 13, further comprising modifying the final ordering of the categories by assigning a list assessment set of variables to each category, the list comprising:
(a) type-I/type-II error rate ratio; and
(b) cost/benefit ratio of a type-I decision
(c) cost/benefit ratio of a type-II decision.

19. The process of claim 13, whereby the system carries out a learning protocol.

20. The process of claim 13, providing a method for an assisted diagnosis of a patient.

21. The process of claim 20, providing a method for assisted diagnosis of a patient that is automated.

22. The process of claim 20, providing a method for interactive assisted diagnosis.

23. The process of claim 22, providing a method for assisted diagnosis automated via a remote portable device.

* * * * *